(12) United States Patent
Kato

(10) Patent No.: US 7,088,340 B2
(45) Date of Patent: Aug. 8, 2006

(54) TOUCH-TYPE KEY INPUT APPARATUS

(75) Inventor: Syunji Kato, Hachiohji (JP)

(73) Assignee: Misawa Homes Co., Ltd., Tokyo (JP)

( * ) Notice: Subject to any disclaimer, the term of this patent is extended or adjusted under 35 U.S.C. 154(b) by 236 days.

(21) Appl. No.: 10/476,166

(22) PCT Filed: Apr. 26, 2002

(86) PCT No.: PCT/JP02/04214

§ 371 (c)(1),
(2), (4) Date: Dec. 24, 2003

(87) PCT Pub. No.: WO02/088920

PCT Pub. Date: Nov. 7, 2002

(65) Prior Publication Data

US 2004/0108994 A1  Jun. 10, 2004

(51) Int. Cl.
*G09G 5/00* (2006.01)

(52) U.S. Cl. .................. 345/168; 345/171; 715/863

(58) Field of Classification Search ......... 361/679–687, 361/724–727; 312/208.1, 208.4; 341/22; 345/173, 179, 168–169, 171; 400/474, 472, 400/87; 715/863; 364/708.1
See application file for complete search history.

(56) References Cited

U.S. PATENT DOCUMENTS

| | | | | |
|---|---|---|---|---|
| 6,142,687 A | * | 11/2000 | Lisak | .......................... 400/472 |
| 6,292,179 B1 | | 9/2001 | Lee | ............................. 345/179 |
| 6,295,052 B1 | | 9/2001 | Kato et al. | ................... 345/173 |
| 6,337,918 B1 | * | 1/2002 | Holehan | ...................... 382/124 |
| 6,477,040 B1 | * | 11/2002 | Horiki | ......................... 361/683 |
| 6,788,527 B1 | * | 9/2004 | Doczy et al. | ............... 361/680 |

FOREIGN PATENT DOCUMENTS

| | | |
|---|---|---|
| JP | 4-127310 A | 4/1992 |
| JP | 10-177446 A | 6/1998 |
| JP | 11-272403 A | 10/1999 |
| JP | 2000-29630 A | 1/2000 |
| JP | 2000-35857 A | 2/2000 |
| JP | 2001-14085 A | 1/2001 |

* cited by examiner

*Primary Examiner*—Hung Van Duong
(74) *Attorney, Agent, or Firm*—Squire, Sanders & Dempsey L.L.P.

(57) ABSTRACT

A touch press key inputting device includes: a plurality of character keys 21~32 with at least 2 characters displayed on the surface of each key; an input judging means 72 for sensing the character keys touched and the first touched points in the area of the character keys, performing a movement longer than a specified length originally touched, and judging a moving direction in touch press inputting; a character selecting and outputting means 73 for selecting and outputting the characters displayed in the moving direction, corresponding to the moving direction judged by the input judging means, relative to the reference positions of the character keys. Since the characters on the positions are selected and output corresponding to the touch press inputting operations of the characters displayed on the key surfaces of respective character keys 21~32, the inputting operations can be directly sensed and easily assured, and the inputting operability is improved.

10 Claims, 50 Drawing Sheets kana mode configuration

English mode configuration

Number mode configuration

Symbol mode configuration

Instruction configuration

Fig. 20

Vowels press key input

| touch / key | Striking type • | Draw-line type ✓ | ↓ | ↘ | → |
|---|---|---|---|---|---|
| 21 — A | a | a | an | as | at |
| 22 — I | i | i | is | in | it |
| 23 — U | u | u | up | us | ul |
| 24 — E | e | e | ea | er | es |
| 25 — O | o | o | on | of | off |

Fig. 21

Consonant press key input

| touch / key | Striking type • | Draw-line type ✓ | ↓ | ↘ | → |
|---|---|---|---|---|---|
| 26 — Y | y | y | w | x | you |
| 27 — K | k | k | g | f | for |
| 28 — S | s | s | z | j | so |
| 29 — T | t | t | d | v | to |
| 30 — N | n | n | c | q | no |
| 31 — H | h | h | b | p | he |
| 32 — R | r | r | m | l | me |

Fig. 25
(A)
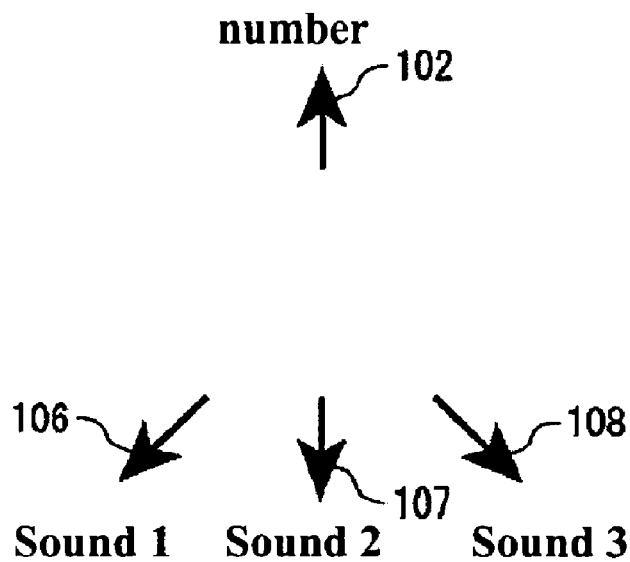
(B)
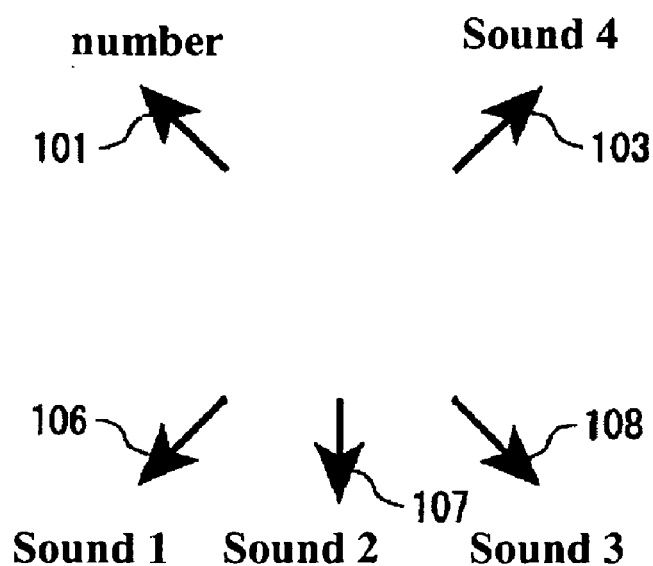

TOUCH-TYPE KEY INPUT APPARATUS

TECHNICAL FIELD

The present invention is directed to a touch press key device, and in particular, to a device which can input the characters shown on the press keys by directly touching the press keys configured in a portable telephone set or a personal digital assistant (PDA), a personal minicomputer and so on, with a pen or a finger.

BACKGROUND ART

In recent years, the portable personal minicomputers (movable computers) below the size of B5 or B6 and personal digital assistants (PDA) have gotten a rapid popularization. As a ⌈press key Input⌋ has become a handicap of machine miniaturization, a stroke input mode by touching a liquid crystal screen with a pen has been popular.

Generally, the stroke input mode has two types: a ⌈hand write input⌋ writing characters directly on a plate; and a ⌈soft keyboard input⌋ for inputting characters by touching a small virtual keyboard in a display screen with a pen.

Neither of the two types uses a physical (substantial) keyboard, and this facilitates the miniaturization of the machine for portability.

Yet, there are several problems for the input mode using a pen: the ⌈hand write input⌋ provides some advantages for people, who hate key-board input, but it is not fit for the occasion that requires rapid input and long-time input for the character inputting and character judging are exceedingly time-consuming.

In addition, the virtual keyboard for the ⌈soft keyboard input⌋ commonly is set with one character for each press key respectively, so the press keys are very fine, crowded, and difficult to touch. For example: there are 26 letters in English, so it needs 26 press keys correspondingly, and more press keys are required in Japanese, Chinese, Korean and other languages, such as in Japanese, 50 kana need corresponding 50 press keys.

If so many press keys are displayed in a limited area, the sizes of the press keys have to be reduced. Therefore, the ⌈soft keyboard input⌋ also has the problems such as inconvenient input operation, inapplicability for the occasion that requires rapid and long-time input and so on.

DISCLOSURE OF THE INVENTION

The purpose of this invention is to provide a touch press key input device that can be used to input characters efficiently in the case of assuring the portability of machines.

The touch press key input device of the invention is characterized in that it includes: many character keys, the surface of each of which is marked with at least 2 characters; an input judging means for detecting the action of the touch press key input device on the character keys and judging a moving direction of a draw-line touch input action which maintains the touch state to move longer than a specific length since the first touch point in a character key area; and a character selecting and outputting means for selecting and outputting characters displayed in the moving direction relative to a center position of the character key, corresponding to the moving direction judged by the input judging means.

The input judging means of this invention is mainly used to judge the moving direction of the draw-line touch action, and the character selecting and outputting means is mainly used to select and output the characters displayed in the moving directions of the character keys.

Therefore, the characters corresponding to the characters displayed on the surfaces of the character keys can be selected and input by use of the draw-line touch input method, which is distinct and easy to control, thereby improving the input efficiency. Further, the operation is easy and fast, because the characters displayed on the character keys can be accurately distinguished through watching.

In addition, at least 2 characters, generally 2 to 8 characters, are set on one character key, so even if there are only 12 or 15 character keys, the 26 English alphabets required in English input and the Japanese Roman letter input, the 10 numbers required in number input and all kinds of symbols such as the brackets are also set on these character keys.

For example, if 15 character keys are provided and each of them is appointed of 2 characters, 30 characters can be set at most and can meet the need of 26 English alphabets.

If there are 12 character keys and each of them is appointed of 4 characters, 48 characters can be set at most and can meet the need of total 36 characters of 26 English alphabets and 10 numbers.

It is obvious that since more characters can be set on one character key, the number of the character keys can be greatly decreased comparing with the original ⌈soft keyboard input⌋ so as to assure the portability. Further, the decrease of the number of characters facilitates to enlarge the size of character keys and shorten the moving distance on keyboard when operated, thereby improving the input speed.

In addition, comparing with the ⌈hand-write input⌋, the input speed can be improved and rapid and long time input can be performed.

The size increase of the character key facilitates the user to determine the moving direction of draw-line touch action, so the user can input the character he wants to exactly, and the input speed is improved. Further, the size increase of the character key also equivalently enlarges the distinguishing target of the input judging means, i.e. the judging scope of the moving directions so the moving direction can be distinguished more exactly.

In addition, the draw-line touch input needs to change the moving direction, but the character can be input only by needing one time of draw-line touch action, so the input efficiency is high and the operation is convenient.

The so-called ⌈specific length⌋ does not mean a particularly limited distance, but a length exceeding the striking touch point (·) in the character key area. The striking touch point means that there is no move after the character key has been touched (the moving distance is very short and less than a fixed value). Therefore, the first touch in the character key area can move across the area (exceeding a striking touch point, like drawing a line,).

The preceding input judging means can judge these eight moving directions in the preceding draw-line inputting, including left-down direction, down direction, right-down direction, left-up direction, up direction, right-up direction, left direction, and right direction (the positions corresponding to the reference positions of press keys). When the character is displayed in the moving directions (the positions corresponding to the reference positions of press keys) judged by the input judging means, the preceding character selecting and outputting means can select and output characters.

Thus, at most 8 characters can be set on one character key, for example, 96 characters can be set on 12 character keys. Therefore, the 26 letters for English input and Japanese Roman letter input and the 10 numbers of 0–9 for inputting all the numbers can be all set on the character keys.

To the languages in which many characters are used such as Japanese, if the Roman letter input mode is used, 26 press key positions are needed for English letters, and the remaining 70 positions can be used to set other symbols and characters.

The configure manner of many characters on one key needs to select the moving directions, but the character input can be realized only by needing one time of draw-line touch, so the input speed is high and the operation is convenient.

The preceding character keys had better to be 12 configured in 4 up and down rows and 3 up and down columns or 3 up and down rows and 4 up and down columns.

In the case of 12 character keys, the 10 numbers [0–9] should be set separately, that is, one number is set on one key. The 26 English alphabets should be set in the manner of 2–3 characters on one key, thus the numbers and English alphabets can be input. As for a mobile telephone set, 12 keys are enough to input the numbers and English alphabets (Roman letter input or English alphabets input), and this is extremely convenient.

If the interpretable moving directions are set to 8, then 96 characters at most can be set on 12 keys, and if set to 4, then 48 characters. If 26 alphabets are set on 12 character keys, 3 interpretable moving directions at least are set on one character key.

Then, the reference position of the preceding character key is the center position of the surface of the character key, and the preceding input judging means is to judge the relative moving directions based on this reference position, and the preceding character selecting and outputting means is to, in draw-line touch input, select and output the characters displayed in the moving directions judged by the preceding input judging means.

The reference position lies in the center of the surface of each press key, viz. the center in left to right direction and the center in up to down direction of the surface of the press key, then the left-up character of the key can be input through the draw-line touch action in the left-up direction, and the right-up character of the key can be input through the draw-line touch action in the right-up direction. The user can understand that intuitively, so the operation convenience will be improved.

That is to say, among the characters displayed on the surfaces of the character keys, the characters on the positions corresponding to the draw-line touch input can be selected and output, thus the input operation is intuitive, and easy to understand. Further, the characters on the character keys can be accurately distinguished through watching, and the character can be input simply and quickly.

At least two types of the three character types of numbers, English alphabets and symbols are set on each character key, and corresponding to the preceding moving directions judged by the preceding input judging means, the preceding character selecting and outputting means can select and output the characters displayed in the preceding moving directions (with respect to the reference positions of character keys).

By using this input mode, the input of English alphabets, even the numbers, symbols and so on, can be completed without shifting the input mode, and the articles including numbers and symbols also can be inputted easily.

At least two types of the four types characters of numbers, English alphabets, kana and symbols are set on each character key, and the characters displayed in the preceding moving directions (with respect to the reference positions of character keys) judged by the preceding input judging means also can be set.

By using this input mode, the input of English alphabets and kana, even the numbers, symbols and so on, can be completed without shifting the input mode, and the articles including various characters also can be inputted easily.

Commonly, the preceding English alphabets are marked on the left-down portion, the down portion or the right-down portion of the surfaces of the preceding character keys; the preceding symbols are marked on the left-up portion, the up portion or the right-up portion of the surfaces of the preceding character keys; and the preceding numbers are marked on the right portion or the left portion of the surfaces of the preceding character keys. The preceding input judging means can judge 8 moving directions of the draw-line touch actions, that is, left-down direction 106, down direction 107, right-down direction 108, left-up direction 101, up direction 102, right-up direction 103, left direction 104 and right direction 105. According to the moving directions judged by the preceding input judging means, the preceding character selecting and outputting means can select and output the characters in 8 moving directions 101–108 (relative to the center positions of character keys). Therefore, one character key can be set with 8 characters at most, and 12 character keys can be set with 96 characters. That is, the 26 English alphabets for inputting English and Japanese Roman letters, 10 numbers 0–9 for inputting numbers, and all kinds of symbols can be set on character keys, and can be input.

If the input of Japanese is set in accordance with Roman input manner, there are 70 positions left exempt for the 26 positions of English alphabets, and these left positions can be used to set other symbols and characters, thereby setting more symbols.

The draw-line touch input method needs to select the moving directions, but character input can be realized only by needing one time of draw-line touch action, thus the input speed and the operation convenience can be improved.

In addition, the preceding English characters can be marked on the left-down portion, the down portion or the right-down portion of the surfaces of the character keys, the preceding symbols can be marked on the left-up portion, the up portion or the right-up portion of the surfaces of the character keys, and the preceding numbers can be marked on the left portion of the surfaces of the character keys; the preceding input judging means should be set to judge the moving directions of these 3 draw-line touch actions in the up direction 102, the down direction 107 and the left direction 104; if the moving direction of the draw-line touch action is in the left direction, the preceding character selecting and outputting means will select and output the preceding numbers; if the moving direction of the draw-line touch action is in the up direction, the preceding character selecting and outputting means, corresponding to the times of the draw-line touch and in accordance with the order of the left-up portion, the up portion and the right-up portion, will select and output the characters on the preceding character keys successively; and if the moving direction of the draw-line touch action is in the down direction, the preceding character selecting and outputting means, corresponding to the times of the draw-line touch and in accordance with the order of the left-down portion, the down portion and the right-down portion, will select and output the characters on the preceding character keys successively.

In this way, if the interpretable moving directions are set in 3 directions of up, down and left, the surface area of the press keys can be divided into 3 parts, and comparing with the 8 parts of 8 directions, the interpretable range is wider to avoid the deviations occurred when the draw-line moving touch is used, further facilitate to select the moving directions correctly, and make the input operation more convenient.

As described above, the characters displayed on the character keys can be selected and output from left to right based on the times of draw-line touch. In fact, the selecting and outputting order is not limited particularly, and the order from right to left can be set, but the order from left to right conforms more to use habit and is more convenient for use.

The interpretable moving directions are not only limited to the three directions of up, down and left, and four directions of up, down, left and right can be also set. That is, the surface area of the press key is equally divided into four parts, and four directions can be judged, thus the input operation convenience is improved because the draw-line touches in the 4 directions can be distinguished easily.

When the interpretable moving directions are set to be 3 directions, comparing with the preceding 8 directions, the advantage is a wider judging scope, but more times of draw-line touches are needed.

The preferred way is that: at least 12 character keys are set, in which 5 vowel alphabets [A], [I], [U], [E] and [O] are set on 5 character keys 21–25 of the 12 character keys and the other 21 English alphabets are set on the other 7 character keys 26–32 with 3 alphabets on each key.

Since in this configure mode, the 5 most frequently-used vowel alphabets [A], [I], [U], [E] and [O] in Japanese and English are set on the different keys, these alphabets can be input easily with needing one time of press key touch (striking, beating input). Therefore, not only the Japanese Roman letters input and the English alphabets are taken into account, but also the convenience of the input operation and the input speed are improved.

If the number of character keys is set to be 9, 26 English alphabets can be assigned to these 9 character keys in a manner of [QWE], [RTY], [UIOP], [ASD], [FGH], [JKL], [ZXC], [VBN] and [M].

The arrangement manner of the press key inherits that of QWERTY, and this makes the people, who are accustomed to the arrangement manner of QWERTY, learn it easily and use it masterly at once.

If the number of character keys is set to be 9, 26 English alphabets can be assigned to these 9 character keys in a manner of [ABC], [DEF], [GHI], [JKL], [MNO], [PQRS], ]TUV] and [WXYZ].

This setting is to arrange the English alphabets used for the input of Roman letters in accordance with the order of the English alphabets [A, B, C, . . . Z], thus the character distribution can be grasped easily, and the operation is simple. Especially, the arrangement order of English characters is completely same as or similar to that of the current mobile telephone set, thus to the people who have been used to the mobile telephone set, the arrangement of the press keys can be easily grasped and the convenience of the input operation can be improved much more.

When the draw-line touch input is carried out, the preceding character selecting and outputting means can select and output the predetermined characters which are preset at a certain position and marked at the corresponding position of the surface of the key in future.

In the invention, the input judging means is to judge the moving directions of the draw-line touch action on each character key. The character selecting and outputting means is to select and output the characters displayed in the moving directions of the character keys (viz. the positions of the character keys), and when the draw-line touch input lies in a direction without displayed characters, the predetermined character in this direction can be selected and output.

That is, this setting manner can select and output the predetermined character in the direction without displayed characters by draw-line touch action, i.e. not only the characters marked on the surfaces of the press keys but also the more characters beyond the marked characters can be input. By use of this characteristic, the surfaces of the press keys of the keyboard can be made clearer and the generality can be remained. For example, when the characters are printed on the surface of the press keys, only the characters used commonly by Japanese and English need to be printed, and the particular characters belonging to either Japanese or English need not be printed, which are set as the hidden predetermined characters and input in the draw-line touch input manner. This assures that the keyboard can be used as the input keyboard of both Japanese and English, and that the production cost can be reduced. Because only the frequently used English characters, numbers and so on are actually shown on the press keys, the keyboard is not only clear but also the surface of each press key has enough space, and even if the press key is small, the size of characters can be comparatively big and the press keys can be touched more easily.

The invention can also perform a reciprocating draw-line touch input action (i.e. drawing a line to an end point and then moving in a direction toward the starting point, see the detailed contents below). When the reciprocating draw-line touch input is performed, the preceding input judging can judge the reciprocating draw-line touch actions and its moving directions, and the character selecting and outputting means, corresponding to the moving directions of the reciprocating draw-line touch actions, also can select and output the predetermined characters in such directions.

The invention can further perform a right-curved draw-line touch input (i.e. drawing a line to a certain point and then curving rightwards, see the detailed contents below) and a left-curved draw-line touch input (i.e. drawing a line to a certain point and then curving leftwards, see the detailed contents below). When the right-curved draw-line touch input and the left-curved draw-line touch input are performed, the preceding input judging can also judge the left-curved and right-curved draw-line touch actions and the moving directions from a touch point to a curved point. The character selecting and outputting means, corresponding to the moving directions of the left-curved and right-curved draw-line touch actions, also can select and output the predetermined characters in such directions.

The reciprocating draw-line touch input mode, the right-curved draw-line touch input mode and the left-curved draw-line touch input mode are different from the common draw-line touch input mode, and can be used to input the predetermined character strings besides common English alphabets, kana, numbers, symbols and so on.

For example, in Japanese articles, many common Kanji read in accordance with sounds are used frequently, and as long as these frequently used characters are set to be input only by one time of touch according to the pronunciation rules, the input efficiency of Japanese can be improved greatly.

If 12 press keys are provided and 8 moving directions can be judged, 96 characters can be set at most. But if a number and 3 symbols are set on each press key, the 48 characters (12 press keys×4 directions) can be set on remaining press keys, thereby the kana (Japanese character table) in Japanese and 26 English alphabets cannot be set at the same time.

Therefore, as described in the invention, many inter-convertible input modes can be set, and the kana of Japanese and English alphabets can be alternatively input through the conversion of input modes, that is, more characters can be input by use of the draw-line touch input mode so as to improve the input efficiency.

The touch press key input device of the invention is characterized in that it further includes an input region setting means, that is, many press keys can be collectively set to be an imaginary input region, and the input judging means, in the case that the imaginary input region is formed by many press keys and set by the input region setting means, can judge the moving directions of the draw-line touch actions performed in the input region, for example, according to said moving directions judged by the input judging means, said character selecting and outputting means can select and output the character set on the first character key in said moving directions (relative to the reference positions of the input region), and if the specified input operations are continually performed in the input region following said draw-line touch, from the character keys selected by the said draw-line touch actions, the characters corresponding to such input actions can be output.

If according to this setting mode, besides the common input mode of the draw-line touch input, a blind-bar-touch input mode can be set on each press key. That is, many character keys, such as 6 or 12 character keys, can be set into an input region to increase the area of the input region, thereby the blind-bar-touch draw-line touch input can be carried out. The draw-line touch input can be perform by the blind-bar-touch input mode without watching the keys, thus the input operation is more convenient.

The blind-bar-touch input mode, in case of a single character key, is to select and output the characters displayed in the moving direction of the draw-line touch input action on each key. Yet, due to the case that many characters form an input region, the input region can be regard as a press key, and a press key, i.e. a character, existing in the moving direction of the draw-line touch action is selected and input. Since many characters are usually set on each press key, the first character (such as English alphabets) is input by use of the draw-line touch input mode in the input region, and the second or the following characters (such as English alphabets, kana, numbers, symbols and so on) are input by use of the following two methods: (1) selecting based on the times of the touch (tab-input, i.e. directly striking or beating the press keys without performing the movement beyond a specific length) on the character keys selected by the preceding draw-line touch input mode; (2) selecting according to the draw-line touch performed at the predefined character positions on the key (for example, for numbers the draw-line touch in the left direction is performed, and for symbols the draw-line touch in the right direction is performed ) after the character keys are selected by use of said draw-line touch method.

The touch press key input device of the invention is characterized in that it further includes an input region setting means, by which said many press keys can be collectively set to be an imaginary input region; that the input judging means, in the case that the imaginary input region is formed by many press keys and set by said input region setting means, can judge the moving directions of the first and second draw-line touch actions performed continually in the input region; and that said character selecting and outputting means, according to the moving directions of the first draw-line touch action judged by the input judging means, can select and output the character configured in judged moving directions (relative to the reference positions of the input region), and according to the moving directions of the second draw-line touch action performed on the specified character keys, selects and outputs the corresponding characters.

That mode sets many press keys collectively into an input region to increase input area, and the blind-bar-touch draw-line touch input can be performed and the input operation is simpler.

The blind-bar-touch input mode of the invention is the first draw-line touch action, and the input region composed of many press keys is regard as a press key, and the character keys existing in the draw-line touch input direction are selected. Then, according to the second draw-line touch action, same as the preceding invention, the character keys in the second draw-line touch input directions of the selected character keys are selected and output. Thus the input operations can be learned easily because they are systematized; and the convenience of the input operations are improved.

The positions of the preceding character keys originate in a keyboard piece, and the keyboard piece is pasted onto the touch input detecting region, which can detect the touch actions of the touch input means. The preceding input judging means can judge the area of the character keys on the preceding keyboard piece, and at the same time, can judge the moving directions of the preceding draw-line touch input in the area corresponding to the character keys.

So-called touch input means is all the pens or fingers etc. used by pointing and touching, and characters can be inputted by touching the input detecting region with pens and so on.

So-called touch input detecting region is an area into which the characters can be written with pens or the like, and are generally detected by use of pressure sensing, optic sensing, electrostatic capacitance sensing and so on can be used to detect the touch actions of the pens or the like. Usually, the liquid crystal screen itself or other special sensitive pads different from the liquid crystal screen can be used as the touch input detecting region.

It can be set that the hand-write characters and figures in the touch input detecting region can be displayed completely as they were.

According to this construction, in the touch input device which has used the touch input mode, the characters can be input easily like the operation of a common keyboard if only the keyboard piece is pasted onto the touch input detecting region and the input judging means is set to a certain extent.

In addition, the keyboard piece can be removed conveniently, and as mentioned above, when inputting characters and figures by the hand-write mode is preferred to be used, the input methods can be converted into the hand-write input according requirements, that is, different input methods can be adopted at the same time.

After the keyboard is removed, the entire picture corresponds to a touch input detecting region so as to increase the useful picture. Especially, when web pages, figures and the like of Internet are browsed, the increased viewable scope facilitates to browse.

While the preceding character key is displayed in the picture, the preceding input judging means can judge the scope of the character keys, and can judge the moving directions of the draw-line touch input in the scopes corresponding to the character keys.

Under this setting mode, because the character keys are displayed on the picture, the characters can be input easily like the operation of a common keyboard if only the input judging means has been set to a certain extent.

Furthermore, if the entire picture needs to be changed into a touch input detecting region, the keyboard is removed so as to increase the useful picture, and this particularly facilitates the case where web pages, figures, tables and the like of Internet are browsed.

BRIEF DESCRIPTION OF THE DRAWINGS

FIG. 20 is a schematic diagram of the input action of the English input in the preceding fourth embodiment.

FIG. 21 is a schematic diagram of the input action of the English input in the preceding fourth embodiment.

FIG. 25(A) and (B) are a schematic diagram of the moving direction in the draw-line touch input in the preceding fifth embodiment.

BEST MODE FOR CARRYING OUT THE INVENTION

The preferred embodiments of the invention are illustrated in conjunction with the accompanying drawings.

[Embodiment 1]

Figure 1:
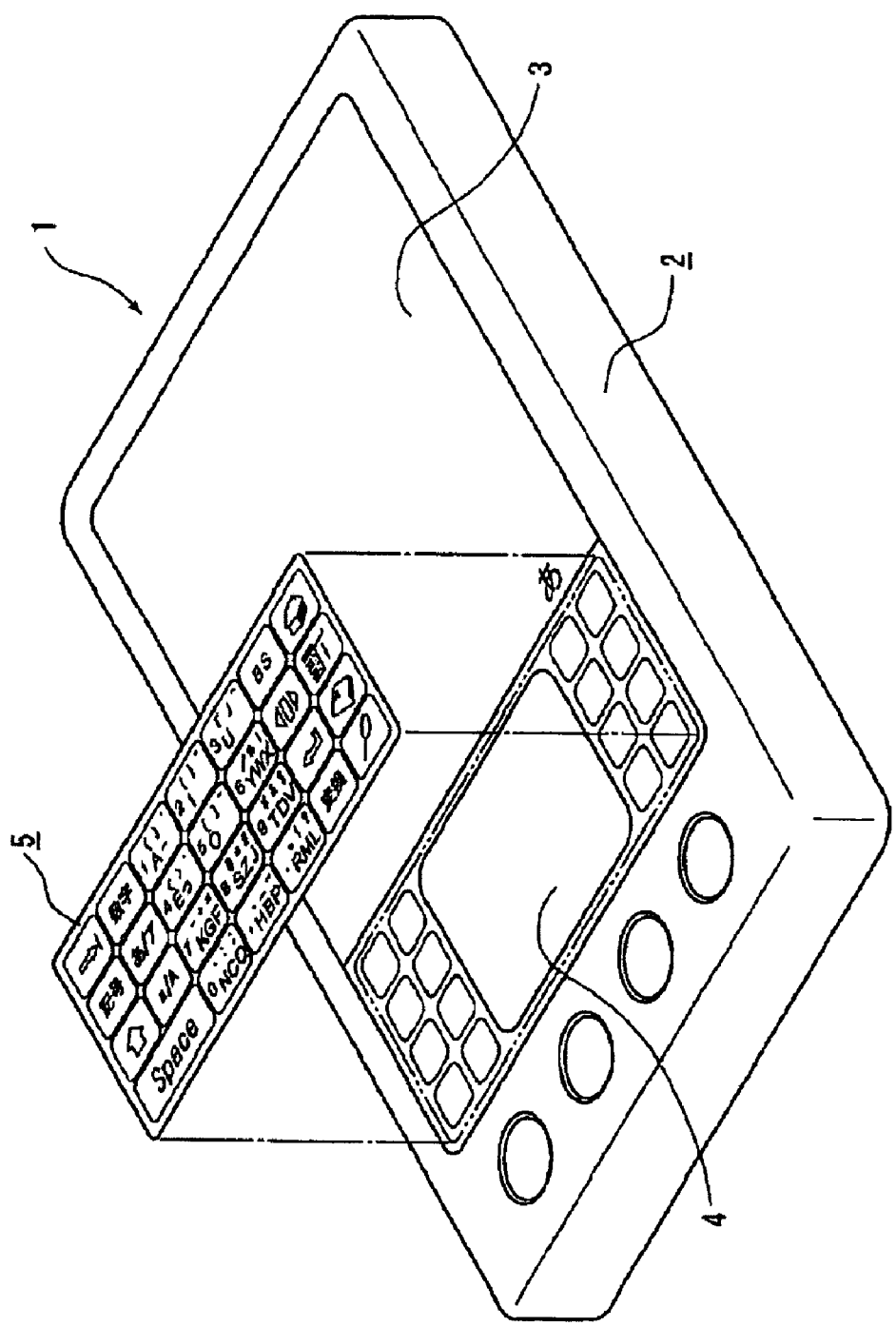
FIG. 1 is a perspective view of a touch press key input device in a first embodiment of the invention.

FIG. 1 shows the first embodiment of the invention, that is, a touch press key input device 1.

As shown in FIG. 1, a touch press key input device 1 of the invention is a personal digital assistant (PDA) which is composed of a body 2 including a liquid crystal screen 3 and a pad-like touch input detecting area 4, and a keyboard piece 5 pasted on the touch input detecting area 4.

The touch press key input device 1 is attached with a pen (not shown) for inputting and a pen hole set on the body 2, in which hole the pen is placed to avoid damaging or losing it.

When the touch press key input device 1 is used, the body 2 is generally grasped by right hand (or left hand) or placed on a desk surface, and then is operated with the pen grasped by right hand (or left hand).

Once touched by the pen and the like, the touch input detecting area 4 will detect a touching pressure. Therefore, if a character or a figure is written on the touch input detecting area 4, the written character or figure or the like will be input into the information terminal as it is, for example, a hand drawing map or the like can be input.

Figure 2:
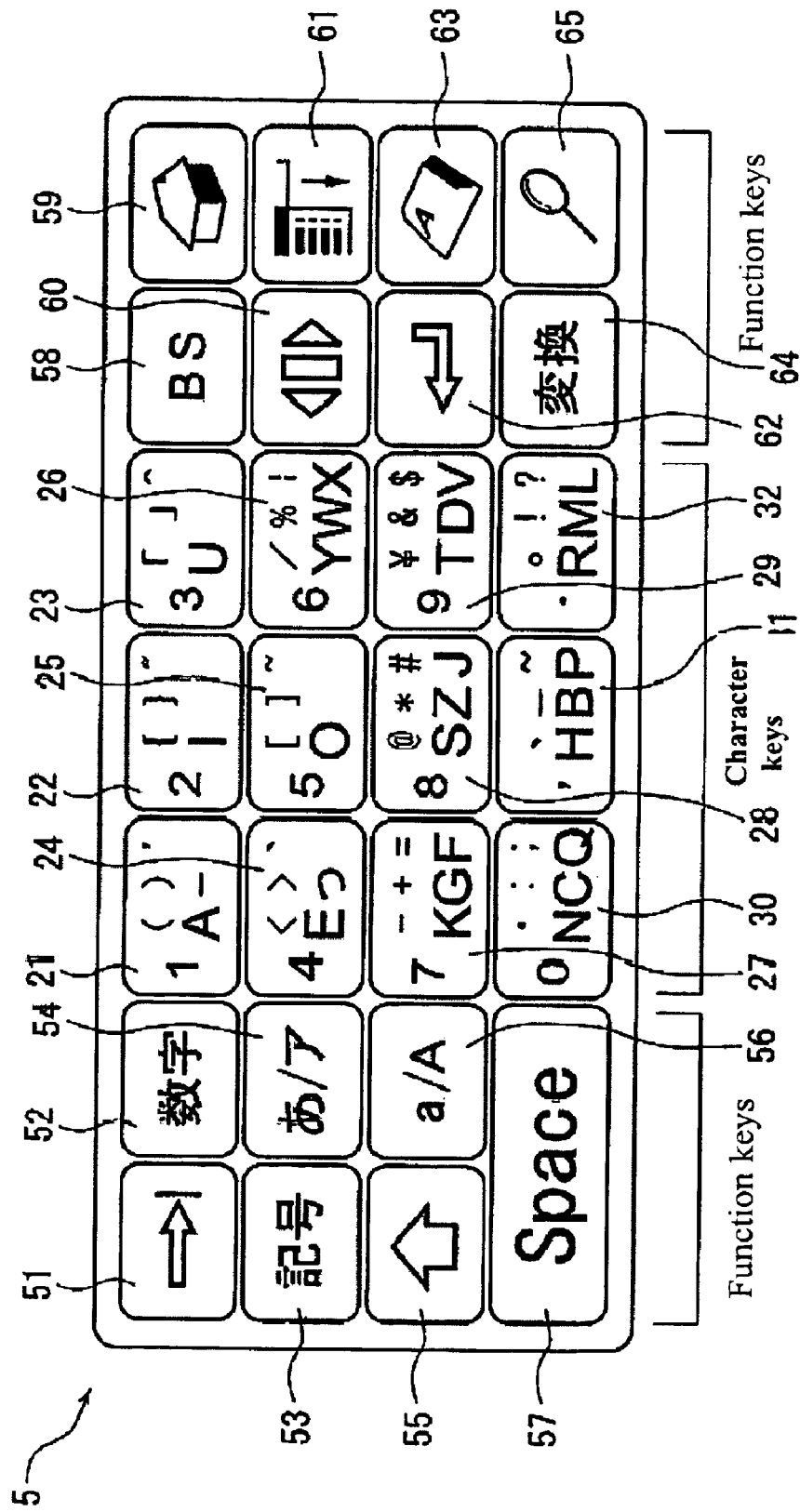
FIG. 2 is a plan view of a keyboard in the preceding embodiment.

As shown in FIG. 2, the keyboard piece 5 contains total 12 character keys 21–32 in 4 up and down rows and 3 right and left columns, and 15 function keys 51–65 set on both sides of the character keys 21–32.

The press keys 21–32 and 51–65 are all arranged in a standard configuration manner described below (commonly used by Japanese and English), and can realize the input of Roman letters of Japanese.

The keyboard piece 5 is pasted on the touch input detecting area 4. Once a function key 63 being touched, the respective functions of all press keys 21–32 and 51–65 are activated so as to start performing the character inputting.

In the left portions of the surfaces of character keys 21–32 (in the left portions with respect to the center positions of press key surfaces), three numbers of 1–3 are successively arranged on 3 character keys 21–23 from left to right in the first line of the keyboard, that is, number ⌈1⌋ is arranged on the character key 21, number ⌈2⌋ on the character key 22, and number ⌈3⌋ on the character key 23. Three numbers of 4–6 are successively arranged on 3 character keys 24–26 from left to right in the second line of the keyboard, that is, number ⌈4⌋ is arranged on the character key 24, number ⌈5⌋ on the character key 25, and number ⌈6⌋ on the character key 26. Three numbers of 7–9 are successively arranged on 3 character keys 27–29 from left to right in the third line of the keyboard, that is, number ⌈7⌋ is arranged on the character key 27, number ⌈8⌋ on the character key 28, and number ⌈9⌋ on the character key 29. Number 0, a punctuation mark ⌈,⌋ and a punctuation mark ⌈.⌋ are successively arranged on 3 character keys 30–32.

Each up portion of the surfaces of character keys 21–32 is divided into three portions from left to right, i.e. left portion (located in the left-up direction of the press key center), middle portion (located in the up direction of the press key center), and right portion (located in the right-up direction of the press key center), and the arrangements on these 3 positions are: ⌈( )'⌋ are arranged on the character key 21, ⌈{ }"⌋ on the character key 22, ⌈[ ] ^⌋ on the character key 23, ⌈<◇>'⌋ on the character key 24, ⌈[ ]?⌋ on the character key 25, ⌈/% |⌋ on the character key 26, ⌈−+=⌋ on the character key 28, ⌈@*#⌋ on the character 28, ⌈¥&$⌋ on the character key 29, ⌈•:;⌋ on the character key 30, ⌈-` ─ ∽⌋ on the character key 31, and ⌈.!?⌋ on the character key 32.

5 vowel alphabets ⌈A⌋, ⌈I⌋, ⌈U⌋, ⌈E⌋ and ⌈O⌋ are arranged on left-down portions (located in the left-down directions of the press key centers) of 5 character ⌈⌋ keys 21–25 in 12 character keys 21–32.

Other 21 consonant alphabets are arranged on other character keys 26–32 in a manner of each key with 3 alphabets. In particular, the down portions of the surfaces of character keys 26–32 are divided into three portions from left to right, i.e. left portion (located in the left-down direction of the press key center), middle portion (located in the down direction of the press key center), and right portion (located in the right-down direction of the press key center), and the arrangements on these 3 positions are: ⌈YWX'⌋ are arranged on the character key 26, ⌈KGF⌋ on the character key 27, ⌈SZJ⌋ on the character key 28, ⌈TDV⌋ on the character key 29, ⌈NCQ⌋ on the character key 30, ⌈HBP⌋ on the character key 31, and ⌈RML⌋ on the character key 32.

When Japanese Roman letters are input, the consonant alphabets ⌈K, S, T, N, H, R, Y⌋ used for inputting ⌈か line, さ line, た line, な line, は line, ら line, や line ⌋ are arranged on the left-down portions of the character keys 26–32. The consonants "K, S, T, N, H, R, Y" for inputting ⌈か line, さ line, た line, な line, は line, ら line, や line⌋ are displayed on the left-down portions of respective character keys 26–32, the consonants "G, Z, D, B" for inputting "が line, ざ line, だ line, ば line" or consonants "M, W"or "C" for inputting "ま line, わ line" are displayed on the down portions of respective character keys 26–32, and the consonant "P" for inputting "ぱ line" or "F, J, V, Q, L, X" are displayed on the right-down portions of respective character keys 26–32.

In addition, various functions, being used when the input modes are converted or characters are input, are set on the function keys 51–65. That is, the key heads of the function keys 51–65 indicate the marks or characters showing the functions input by these function keys 51–65 when pressed individually. In addition, as input modes, there are 4 input modes of "kana mode", "English mode", "number mode" and "symbol mode". At this time, in accordance with the mode selected, the characters corresponding to the modes are displayed on the right portion of the liquid crystal screen 3.

The function keys 51–56, 58–65 are set on the left portion and right portion of the character keys 26–32, with their shapes and sizes being the same as those of the character keys 26–32.

The function of the function key 52 is set, so that its surface shows "marks", and the characters of "numbers" are displayed on the right-down portion of the liquid crystal screen 3 while the input modes are converted into "number mode" used by the number inputting.

Further, the function of the function key 53 is set, so that its surface shows "marks", and the characters of "marks" are displayed on the right-down portion of the liquid crystal screen 3 while the input modes are converted into "symbol mode" used by the mark inputting.

The function of the function key 54 is also set, so that its surface shows "き/", and the "kana mode" are converted into "hiragana mode" or "katakana mode" (Japanese kana has hiragana and katakana) while the input modes are converted into "kana mode" used peculiarly in Japanese. In addition, the function of the function key 54 is also set, so that the character of a hiragana "か" is displayed on the right-down portion of the liquid crystal screen 3 when the input mode is converted into "hiragana mode", and the character of a katakana "カ" is displayed on the right-down portion of the liquid crystal screen 3 when the input mode is converted into "katakana mode".

The surface of the function key 56 is marked with [a/A] to show that the input mode is converted into [English mode] which includes inter-convertible [English small character mode] and [English capital character mode]. When the input mode is converted into [English small character mode], [a] is displayed on the right-down portion of the liquid crystal screen 3, and When the input mode is converted into [English capital character mode], [A] is displayed on the right-down portion of the liquid crystal screen 3.

The function key 56 is an auxiliary key for word editing or the like, its surface is marked with a rightward arrow, and its function is same as that of Tab key to move cursor rightwards in a certain interval.

The surface of the function key 55 is marked with an upward arrow, and is used for converting capital characters and small characters in English mode. It is again used for converting capital characters and small characters in [hiragana mode] and [katakana mode]. The function of the function key 55 is same as that of a general Shift key.

The surface of the function key 58 is marked with characters [BS], and its function is same as that of Back Space key to delete a character before the cursor.

The surface of the function key 60 is marked with leftward and rightward arrows, and its function is same as that of Pause key. When character keys of 3 English alphabets and symbols in parallel are touched consecutively, this press key is used for stopping the touching actions described below, and 2 consecutive touches of the key can repeatedly input the character input before.

The surface of the function key 62 is marked with a curved arrow mark, and its function is same as that of Enter key to determine the uncertain character and exchange line after its determination.

The surface of the function key 64 is marked with a [convert] mark, and can convert inputting characters into Chinese characters, or displays alternative characters by consecutive touching, and equals to a converting key.

After the touch press key input device 1 is activated in the embodiment, an initial picture is displayed on the liquid crystal screen 3. A user can select a desirable function (software) in various function tables in the initial picture, for example selecting schedule management or address contents, to carry out various functions.

In order to convert the picture into a picture (such as initial picture) other than character inputting picture, the following function keys and other function keys are set to be able to immediately convert the pictures.

The surface of the function key 59 is marked with a [house] pattern, and has a so-called Home function to convert the current picture into the initial picture.

The surface of the function key 61 is marked with a table and arrow pattern, and has a so-called Menu function to convert the current picture into the function table picture.

The surface of the function key 63 is marked with a character [A], and means that the keyboard piece 5 is used to perform character inputting.

The surface of the function key 65 is marked with a magnifying glass pattern, and has a so-called searching function.

In addition, the function keys 57 is one time long comparable with press keys 21–32, 51–56 and 58–65 or the like, its surface is marked with [Space], and can be used as a converting key exempt having a space inputting function.

Figure 3:
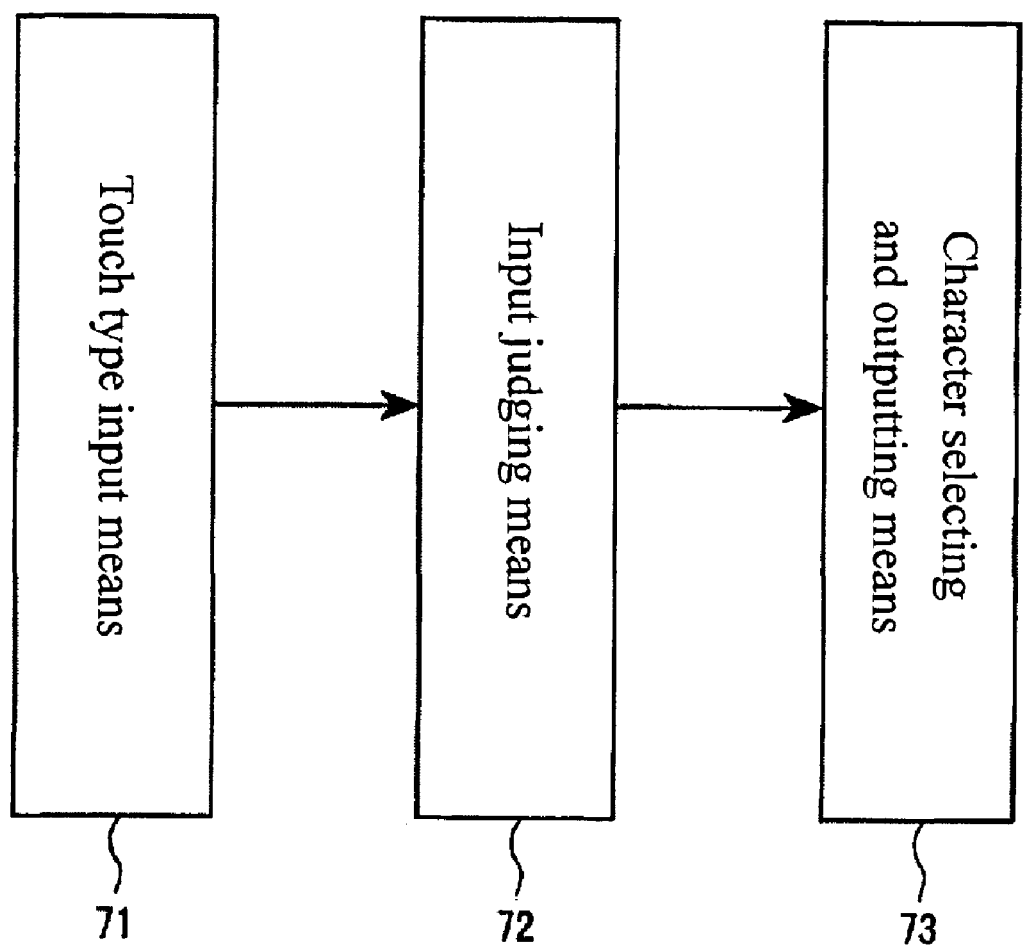
FIG. 3 is a view of the internal structure of the touch press key input device in the preceding embodiment.

The internal structure of the touch press key input device 1 is introduced in conjunction with FIG. 3. FIG. 3 shows the internal function block diagram for constituting the touch press key input device 1.

That is, the pen touch press input means 71, the input judging means 72 and the character selecting and outputting means 73 are employed by the touch press key input device 1.

When the keyboard 5 is pasted on the touch input detecting area 4, the input judging means 72 can judge the areas corresponding to the character keys 21–32 on the touch input detecting area 4, and can judge which area is touched once the touching action of the pen touch press input means 71 exists.

In particular, if the character keys 21–32 are touched by the pen, the input judging means 72 can judge the striking action (beating action) which does not move above a specific length and the draw-line touch action which move above a specific length.

Figure 4:
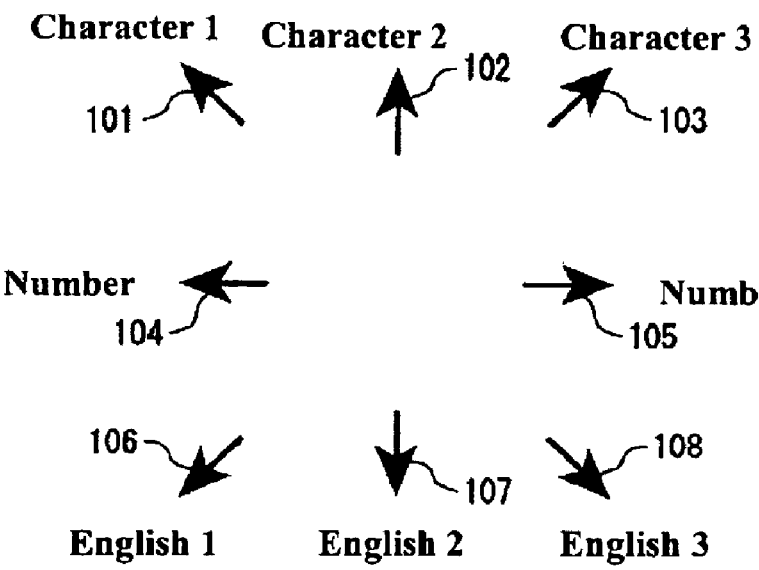
FIG. 4 is a schematic diagram of the moving direction of the draw-line touch input in the preceding embodiment.

The input judging means 72, as shown in FIG. 4, after the character keys 21–32 are touched by the fore end of the pen, in any one of 8 directions (left-up direction 101, up direction 102, right-up direction 103, left direction 104 and right direction 105, left-down direction 106, down direction 107, right-down direction 108), when the draw-line touch action is carried out by maintaining touch state movement specific length, can judge the moving directions 101–108.

Exempt for the right direction 105 in these 8 directions, the other 7 directions correspond to the surface center positions (character key reference positions) of the press keys of at most 7 characters displayed on the surfaces of the character keys 21–32, respectively.

That is, at most 7 characters are set on the surfaces of the character keys 21–32, the existing positions of these characters 21–32 (i.e. relative to the surface center positions of the press keys or the positions referred as the reference positions, or directions) correspond to 8 moving directions 101–108, respectively. When there is a draw-line touch input action, the character in the moving direction can be input responding to the moving directions 101–108 of the input action.

FIG. 4 shows a judging method of different touch input actions, that is, when the pen tip touches the character keys 21–32 and the draw-line touch input moving above a specific length in any one direction (left-up direction 101, up direction 102, right-up direction 103, left direction 104 and right direction 105, left-down direction 106, down direction 107, right-down direction 108, total 8 directions) is carried out, the input judging means 72 is able to judge the moving directions 101–108 of the draw-line touch actions. In this case, the input is judged as a draw-line touch input.

Figure 5:
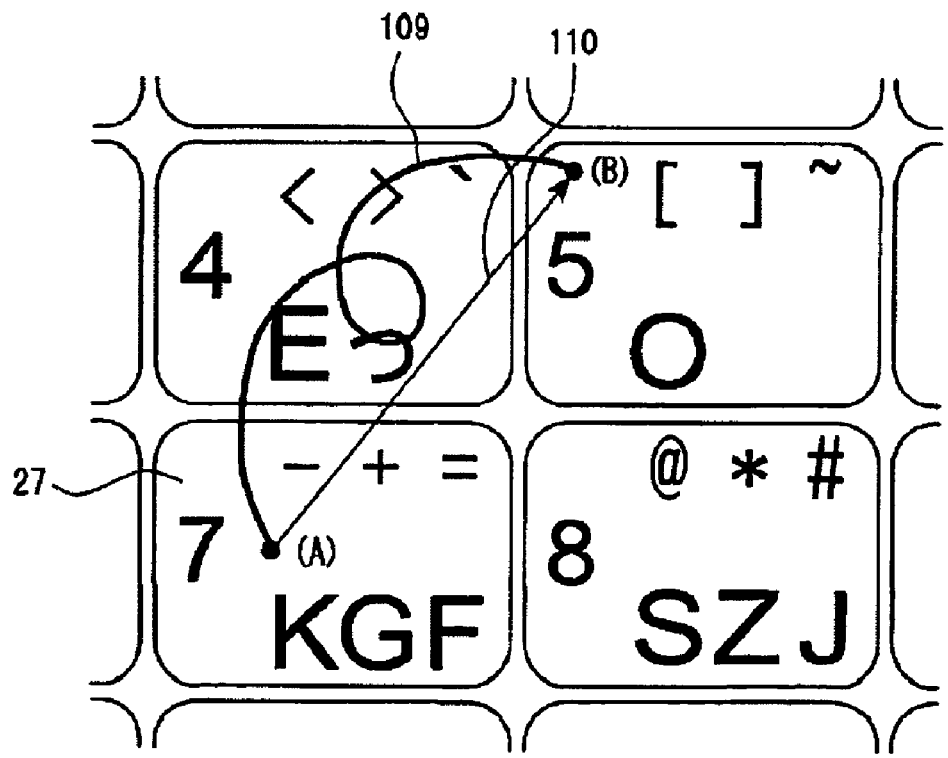
FIG. 5 is a schematic diagram of the touch action of the draw-line touch input in the preceding embodiment.

In this draw-line touch input method as shown in FIG. 5, taking a character key 27 as an example, the pen touches that character key, begins with an initial touching point (A) to move along a route 109, crosses the area of the character key 27 to reach an end point (B), and then is raised off the keyboard piece 5. At this time, the input judging means 72 can judge the character key 27 corresponding to the starting point (A), and as shown by an arrow 110 in the figure, judges the moving direction from the starting point (A) to the end point (B) as the right-up direction 103. In this case, the moving direction is judged only by the starting point (A) and the end point (B), and is not limited by the route 109. The directions other than the right-up direction 103 are also judged by the same method, thus the characters in various directions are input.

According to the starting point (A) and the end point (B), the moving direction is judged very flexibly, for example, if the angle of the up direction 102 is seen from the starting point (A) to be 0° (or 360°), the moving direction is judged as the up direction 102, as long as the end point (B) is seen from the starting point (A) to be in the range of 22.5°–337.5°. If the moving direction is located in the angle range of 112.5°–157.5°, it is judged as the right-down direction 108. That is, what needed is to judge whether the moving direction is in 8 ranges of 45°.

At the same time, the character selecting and outputting means 73, according to the result judged by the input judging means 72, selects the characters displayed in the moving directions 101–108 of the character keys 21–32, and the characters are displayed on the liquid crystal screen 3.

Though no character is marked in the right directions 105 of the character keys 21–32, the characters (numbers) in left directions 104 are selected once moving into the right directions 105.

Figure 6:
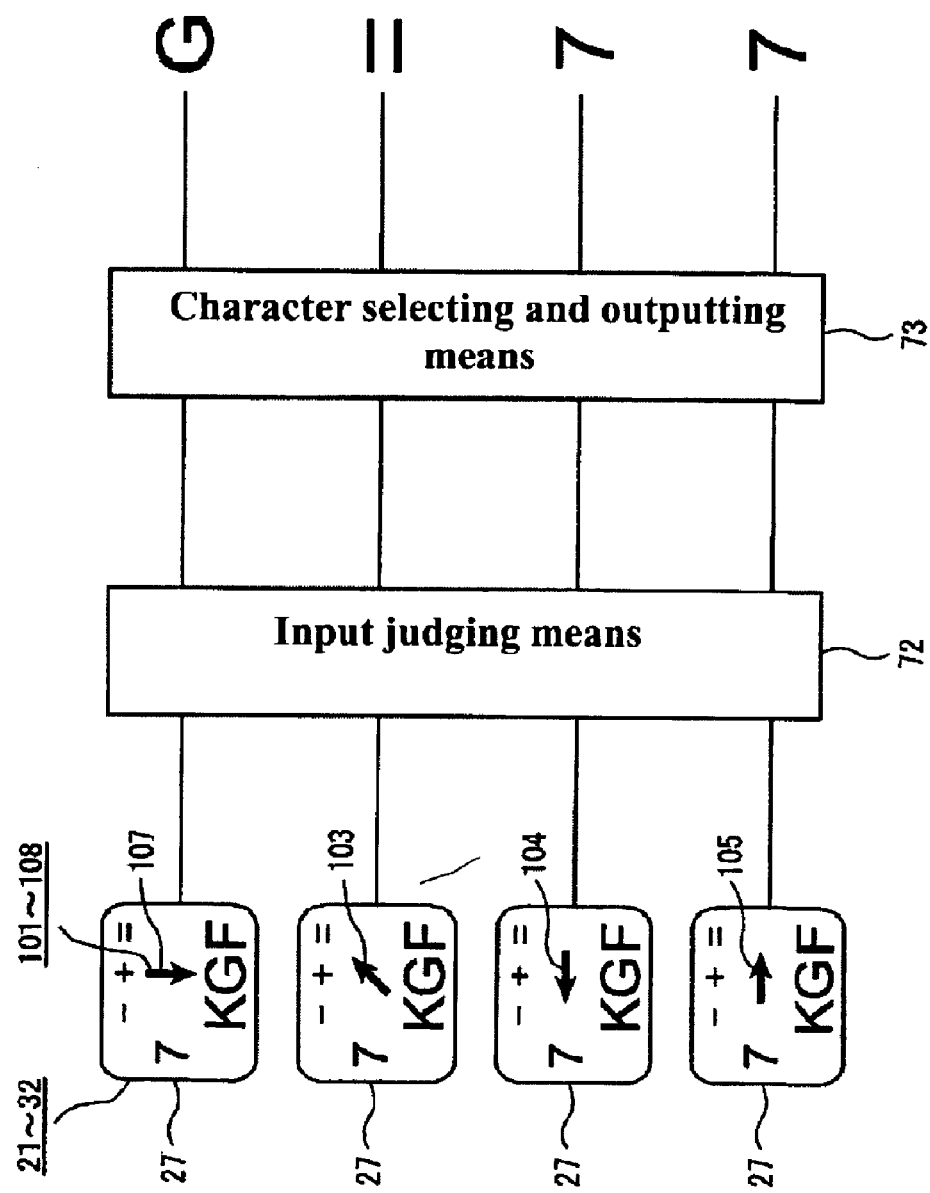
FIG. 6 is a schematic diagram of the draw-line touch input in the preceding embodiment.

FIG. 6 shows more particularly the principle of the draw-line touch input method, that is, once the character key 27 is touched, the input judging means 72 detects the touching to the character key 27 by the pen, and if the pen begins with the touching point to move along the down direction of the character key 26, the input judging means 72 judges the moving direction to be the down direction 107. At the same time, the character selecting and outputting means 73 selects character [G] responding to the judged direction, and the character [G] is also displayed on the liquid crystal screen 3. Again, when the pen moves along the right-up direction 103, the symbol [=] can be selected and output. When the pen moves along the left direction 104, the number [7] can be selected and output, when the pen moves along the right direction 105, the number [7] can also be selected and output.

This draw-line touch input can be used in 3 modes of [kana mode], [English mode] and [number mode] among 4 input modes of [kana mode], [English mode], [number mode] and [symbol mode]. In the [symbol mode], only symbols can be input, but the draw-line touch input can also be carried out in the [symbol mode].

On the other hand, after the input mode is converted into a new input mode by use of the function keys 51–65, the device is able to select a corresponding touch input method automatically.

That is, after the input mode is converted by use of the function keys 51–65, the striking input can be carried out, i.e. the striking input within a specific length can be carried out by beating directly the character keys 21–32 with the pen, and the characters to be input are judged in terms of the number of striking times.

The operations of the striking input (beating input) and the draw-line touch input are described below in detail.

[Striking Input (Beating Input)]

The striking input is to input the characters according to the number of striking times (1–3 times) after the input mode converting, and this method is easy to learn and can be used to input by everyone.

In particular, the input mode needed is selected from 4 input modes of [kana mode], [English mode], [number mode] and [symbol mode] by use of the function keys 52–54 or 56.

For example, if the function key 54 is touch one time or two times, the input mode is converted into this Japanese input mode: [hiragana input (a hiragana input in which kana and Chinese characters are convertible)] or [katakana mode], used by Japanese Roman letter input. In this mode, the characters marked on the down portions of the surfaces of the character keys 21–32 can be input, i.e. the English alphabets used by Japanese Roman letter input.

In Japanese input mode, once the character keys 21–32 are stroked, the input judging means 72 will judge the number of striking times, and if the number of striking times is one, the character selecting and outputting means 73 will select the characters marked on the left-down portions of the character keys 21–32, and the characters are output through the liquid crystal screen 3. Similarly, if the number of striking times is two, the character selecting and outputting means 73 will select the characters marked on the down portions of the character keys 21–32, and if the number of striking times is three, the character selecting and outputting means 73 will select the characters marked on the right-down portions of the character keys 21–32.

That is to say, three characters [KGF] can be input by use of the character key 27. That is, character [K] can be selected by striking the character key 27 one time, character [G] by striking two times, and character [F] by striking three times.

After characters are input, if kana and Chinese characters are converted, the function key 57 is stroked.

In addition, in Japanese input mode, a long sound character [—] is input by striking the character key 21 two times, and an urgent sound character [っ] is input by striking the character key 24 two times.

An awkward sound character is generally input by use of the character [Y]. For example, when [ちょ] is to be input, [TYO] are stroked successively, i.e. striking the character keys 29, 26, 25 each one time.

A sound character [ん] is input by striking [N] (the press key 30) one time or two times.

When small character kana is input individually, this can be realized by striking Shift key 55 one time.

The input mode is converted into English mode (English small character mode or English capital character mode) by striking the function key 56, and in English mode, the characters (English alphabets) marked on the down portion of the character keys 21–32 can be input, which is same as in Japanese mode in selecting the characters (symbols) on the left-down portion (by striking one time), on the down portion (by striking two times) and on the right-down portion (by striking three times) according to the number (1–3) of striking times.

The input mode is converted into number mode by striking the function key 52, and in the number mode, the characters (numbers, symbols) marked on the left portion of the character keys 21–32 can be input, and numbers, comma [,] and period [.] can be input by striking the character keys 21–32 one time, respectively.

The characters thus selected are all output to the liquid crystal screen 3.

(Draw-Line Touch Input)

The above striking input method is to select the characters to be input according to the number of striking and is easy to learn and understand, but the conversion of the input modes is often needed, particularly when Japanese is input, the mixing inputting of Chinese characters, hiragana, katakana, numbers, symbols etc. is often needed even for a short article, thereby having the operation trouble due to the frequent conversion of the input modes.

The draw-line touch input does not need the frequent conversion of the input modes, and English alphabets, characters, numbers, symbols etc. can be mixed to input almost in every mode.

The draw-line touch input and the striking input can be commonly used at the same time.

That is, if two methods of the draw-line touch input and the striking input are employed at the same time, the characters input is almost not limited by the input modes, and English alphabets, characters, numbers, symbols and other characters can be input in one input mode.

For example, the English alphabets used by Japanese Roman letters input on the down portion of the surfaces of the press keys can be selected and input by means of the striking input according to the number of the striking times in the [kana mode]. In kana mode, if the draw-line touch in left direction 104 or in right direction 105 is carried out, the numbers on the left portions of the surfaces of the press keys can be selected. If the draw-line touch in left-up direction 101, up direction 102, or right-up direction 103 is carried out, the symbols at corresponding positions can be selected. If the draw-line touch in left-down direction 106, down direction 107, or right-down direction 108 is carried out, the English alphabets at corresponding positions can be selected.

Therefore, the input of the consonants [M], [w] and the consonants [G, Z, D, B, P], needs 2–3 times of striking in the striking input mode, but needs only one time of draw-line touch in down direction 107 or right-down direction 108 in the draw-line touch input mode.

In [English mode], the striking input method is almost same as that in [kana mode], exempt for inputting English alphabets. In [English mode], if the draw-line touch input manner is employed, the characters (English alphabets, numbers, symbols) required in the moving direction can be selected likewise. Further, in the striking input mode, the input of English alphabets needs 2–3 times of striking, and in the draw-line touch input mode, needs only performing the draw-line touch in down direction 107 or right-down direction 108.

Therefore, in [English mode], the English alphabets marked on the left-down portions of the surfaces of the character keys 21–32 are input generally by use of the striking input mode, and the English alphabets marked on the down portion or right-down portion are input by use of the draw-line touch input mode in down direction 107 or right-down direction 108, thereby greatly improving the input efficiency.

In [number mode], the numbers marked on the left portions of the surfaces of the press keys are input by use of the striking input method. The symbols displayed in left-up direction 101, up direction 102, right-up direction 103; the symbols displayed in left-down direction 106, down direction 107, right-up direction 103; and the English alphabets displayed in left-down direction 106, down direction 107, right-down direction 108 are also input by use of the striking input method.

Although in [symbol mode] the draw-line touch input mode can be carried out, the other types of characters almost can not be input in [symbol mode], therefore it is best to input symbols by use of the striking input manner.

It can be seen that the draw-line touch input mode is irrespective of the input mode, that the various English alphabets, numbers, symbols can directly be input, and that this input manner is very efficient particularly where the mixing input of the various character such as Japanese input is needed.

Figure 7:
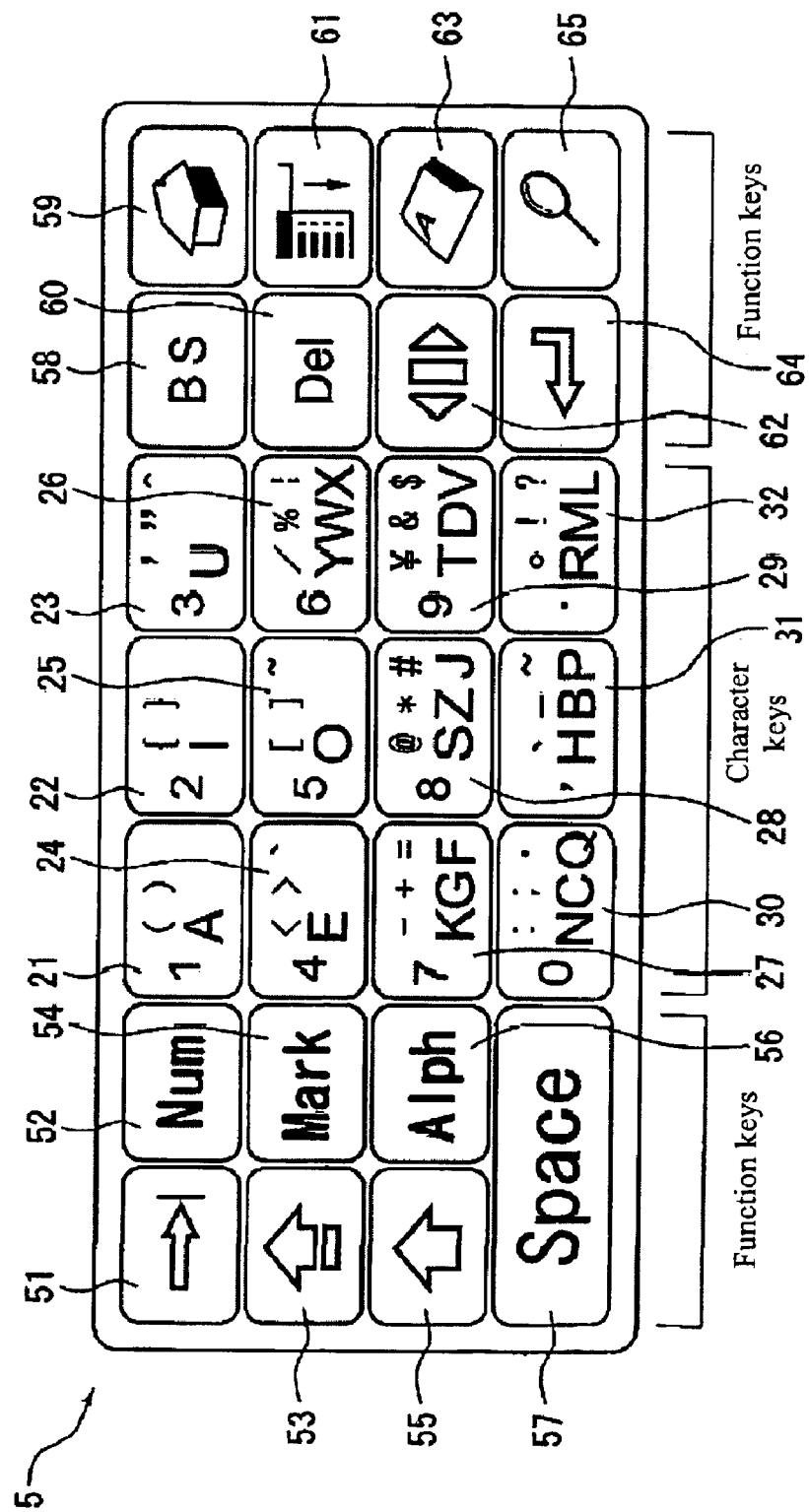
FIG. 7 is a configuration diagram of the keyboard piece particular for English in the preceding embodiment.

Besides the standard configuration (commonly used by English and Japanese) described above, the keyboard piece 5 is provided with a special English configuration for English input as shown in FIG. 7. The special English configuration can be realized by resetting the character keys and the function keys specially used for Japanese input on the base of the standard configuration. Specifically, the character keys 23, 24, 52–54, 56, 57 of the standard configuration are reset.

This special English configuration has [small character input mode], [capital character input mode], [number input mode], [symbol input mode] to be selected, and same as the standard configuration (commonly used by English and Japanese), the marks [A], [a], [1], [*] and so on are displayed on the right portion of the liquid crystal screen 3, corresponding to the input mode selected.

Figure 8:
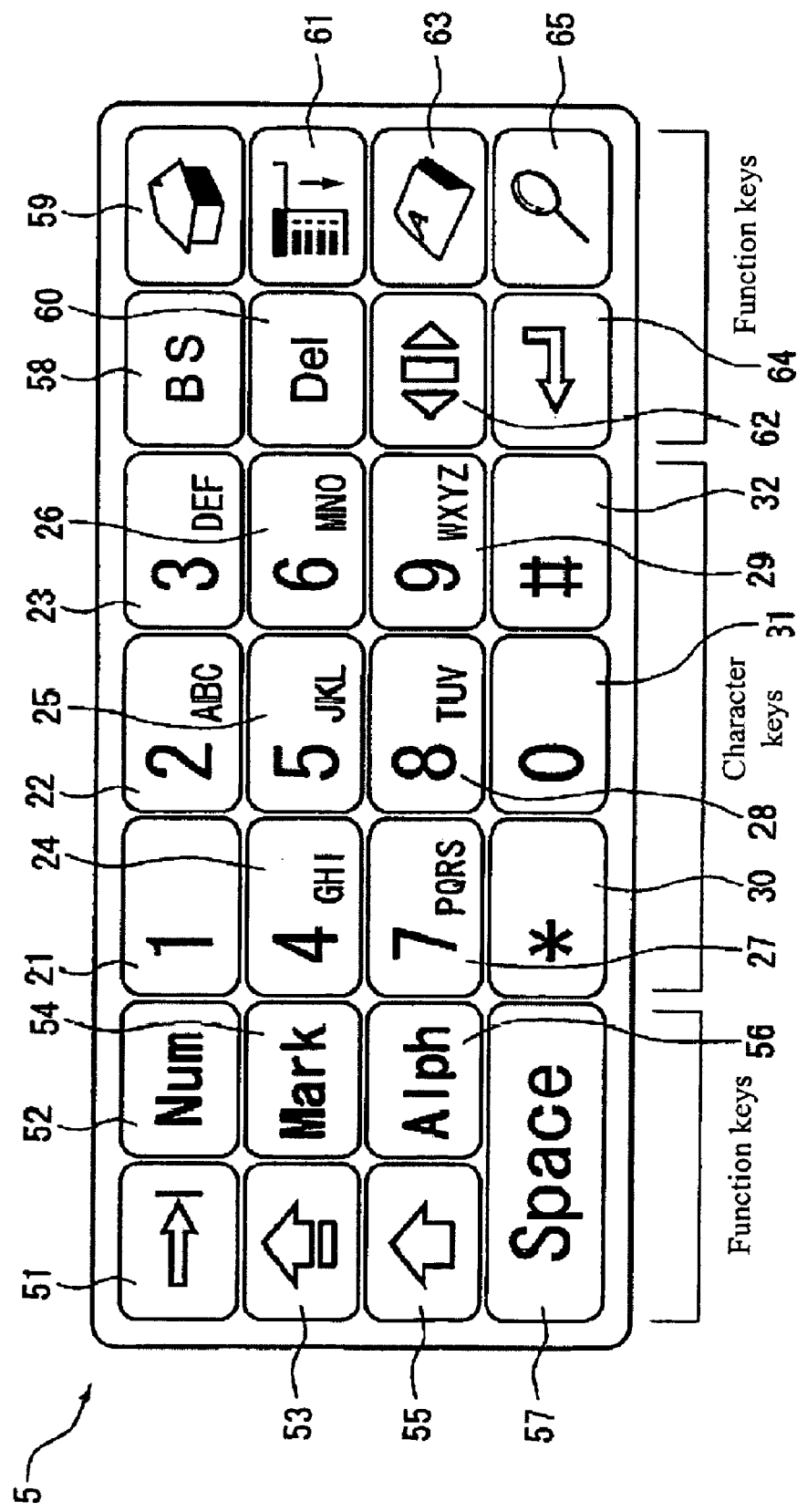
FIG. 8 is an alternative configuration of the keyboard piece in the preceding embodiment.

In addition, as shown in FIG. 8, the arrangement order of the characters, such as [ABC], [DEF] and so on used by common telephone sets, can be employed, and in this case, the configuration of the various function keys can use both the standard configuration and the special English configuration.

The changed configurations as shown in FIG. 7 and FIG. 8 can also be used to input characters and output them to the crystal screen 3 by the touch input (draw-line touch input and striking input) manner.

(The Effects of the First Embodiment)

The first embodiment described above can obtain the following effects:

1. The input judging means 72 judges the moving directions 101–108 of the character keys 21–32 in draw-line touch inputting, and the character selecting and outputting means 73 selects and outputs the characters displayed in the moving directions 101–108 of the character keys 21–32. The input operation is sensible, easy to grasp, and has a high input efficiency. Further, the characters marked on the character keys 21–32 can be seen at a glance, and the characters can be input conveniently and quickly.

2. Although there are as few as 12 character keys 21–32, thereon total 72 characters of the 26 English alphabets used by Japanese Roman letter input and English input, the 10 numbers 0–9 used by various serious numbers, and 36 symbols such as brackets and so on can be set. Therefore, the characters input by the character keys 21–32 are more than those input directly by a common keyboard, and the operation is simple, the characters can be input conveniently and quickly.

3. Every character key 21–32 can set 7 characters at most, and the number of the press keys is reduced comparing with [soft keyboard input] in which one key corresponds to one character, so that the portability is completely assured. Further, the volumes of the character keys 21–32 can be increased correspondingly because of the reduction of the number of the character keys 21–32, and the reduction of the number of the character keys 21–32 also shortens the movement distance in operating on the keyboard to make the input efficiency higher.

Particularly in the case of that a small portable machine etc. is used, the size of the keyboard 5 fails to be big, but the touch input can be perform easily by a pen or the like because the number of the keys is low and the keys can be made bigger.

4. When the Japanese input is set to be the Roman letter input, comparing with the kana input manner, only 26

English alphabets are set and the positions of the remaining press keys can be used to set other more characters and symbols.

5. Since the area of each character key 21–32 can be increased, the users can easily distinguish every moving direction 101–108 when performing draw-line touch input, therefore the user can correctly select the required characters to be input, and the input efficiency is high. Further, the increase of the area of each character key 21–32 also makes the distinguished targets of the input judging means 72 bigger, that is, improves the judging accuracy of the moving directions 101–108.

6. The keyboard 5 is pasted on the touch input detecting area 4, and can be used as a usual keyboard as long as the proper setting to the input judging means 72 is carried out, and the character input is easy to learn. Furthermore, the keyboard 5 can be removed easily; therefore the input method can be switched into the handwriting input as required when it is desired that the hand writing input manner or figure should be employed. It can be seen that the different input methods can be used at the same time.

7. Since the 8 moving directions 101–108 can be judged and the characters needed to be input are preset on the character keys 21–32, the draw-line touch input manner is used to input characters, such as letters, symbols, numbers and so on, through one time touch action without the need to perform input mode conversion, and the inputting has a rapid speed and a high efficiency.

8. The moving directions are set in 8 directions of left-up direction 101, up direction 102, right-up direction 103, left direction 104, right direction 105, left-down direction 106, down direction 107 and right-down direction 108, and the intervals among the directions are equal, thus the judging errors of the input judging means 72 can be reduced. In addition, since the moving directions 101–108 actually are the moving directions of the strokes, the sense is harmonious and the inputting is easy and has a high efficiency.

9. What appeared most frequent generally in articles is numbers besides English alphabets, the selection and output of these numbers can be realized by the draw-line touch in the left direction 104 or the right direction 105. Comparing with the case that the left direction 104 is set, inputting numbers is more convenient, for example, when the prior moving direction approaches the right direction 105, then if numbers are to be input, a slight change of the moving direction is needed, thus numbers can be conveniently input while the article input is performed.

10. Besides the draw-line touch input, the striking input method can also be employed. The striking input method is to strike directly the character keys 21–32 to realize the character input, without need for paying attention to the moving direction as the draw-line touch input method, and the operation is simple. Both the draw-line touch input method and the direct touch input method can be used individually, and the input manner can be selected very flexibly in conjunction with the applications and personal preference.

11. Comparing with the general [hand writing input], it is not necessary to judge all the stroke loci, thus the input efficiency is high and the quick and long time continual input can be performed.

12. The marks indicated on the character keys 21–32 are set in accordance with the order of character (English alphabets) on down portion, numbers on left portion, and symbols on up portion, thus the configuration and position relations of the characters, numbers and symbols are simple and clear, and easy to distinguish and to be operated.

13. The arrangement order of the English alphabets used by Roman letter inputting is almost completely consistent with the order of the Japanese 50 kana, thus it is easy to grasp the arrangement conditions of the press keys, and the operation is convenient. Further, the consonants for voiced sound input are set to be by the sides of the consonants for voiceless sound input, and the configuration of the press keys is remembered more easily.

14. The vowels used most frequently are individually set on the 21–25 press keys, and at the same time, the consonants for sound input are located on the left-down portions of the 26–32 press keys, thus these characters can be input only by one time striking and the input efficiency is high. The consonants or voiced sounds used less frequently can be input only by 2–3 times striking, thus the number of striking times when performing the general character input would not be increased more and the input efficiency is high. If the draw-line touch input manner is employed, these consonants or voiced sounds can be input only by one time striking and the input efficiency is higher.

15. Because the draw-line touch input is irrespective of the input modes, English alphabets, numbers, and symbols can be input in almost every mode, and this input manner can be employed very efficiently, particular for where English alphabets, numbers, symbols and so on are needed to be mix-input.

[Embodiment 2]

The second embodiment of the invention is introduced below in conjunction with FIGS. 9–10.

In present embodiment, the constitutional parts as same as or similar to those of the first embodiment are shown by the same reference numbers. The description of the same or similar parts will be omitted or simplified.

A touch input device of the second embodiment is substantially same as the touch press key input device 1 of the first embodiment, and is composed of a body [kana mode]2 including a liquid crystal screen 3 and a pad-like touch input detecting area 4, and a keyboard piece 5 pasted on the touch input detecting area 4.

The touch input device is as same as the first embodiment in that a touch input means 71, an input judging means 72 and a character selecting and outputting means 73 are employed.

However, the judging method, which is used by the input judging means 72 to judge the moving directions in the time of the draw-line touch inputting, is not the same as that of the first embodiment.

As same as in the first embodiment, there are 4 input modes of [kana mode], [English mode], [number mode] and [symbol mode]. In all selected particular input modes, as described above, the striking input can be performed corresponding to the input modes, and likewise the characters are selected and input according to the judged number of striking times. The particular operations are completely same as those of the first embodiment, and their descriptions are not repeated here.

Figure 9:
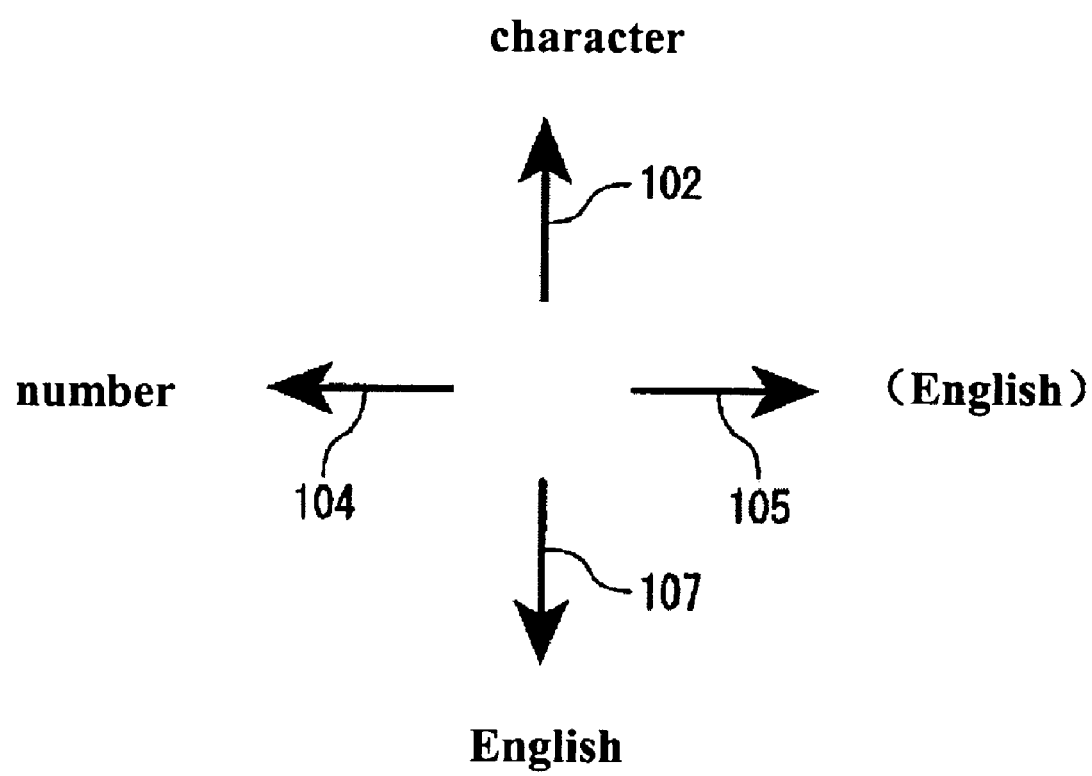
FIG. 9 is a schematic diagram of the moving direction of the draw-line touch input in a second embodiment.

On the other hand, where it is not necessary to select a particular input mode or a certain input mode has been selected, the draw-line touch input can be carried out, and 4 direction draw-line touch input can be employed, with the particular operations as shown in FIG. 9, that is, after the character keys 21–32 is touched by a pen tip, the draw-line touch moved over a special length in any one of directions (there are total 4 directions of up direction 102, left direction 104, right direction 105 and down direction 107) can be carried out. The input judging means 72 can judge the moving directions 102, 104, 105, 107 of the draw-line touch actions and the number of touch times in the moving directions, so as to complete character input.

That is, when English alphabets are input, the characters marked on the left-down portion, down portion, right-down portion of the character keys 21–32 can be selected and output as long as 1–3 times of draw-line touches in down direction 107 are performed.

Figure 10:
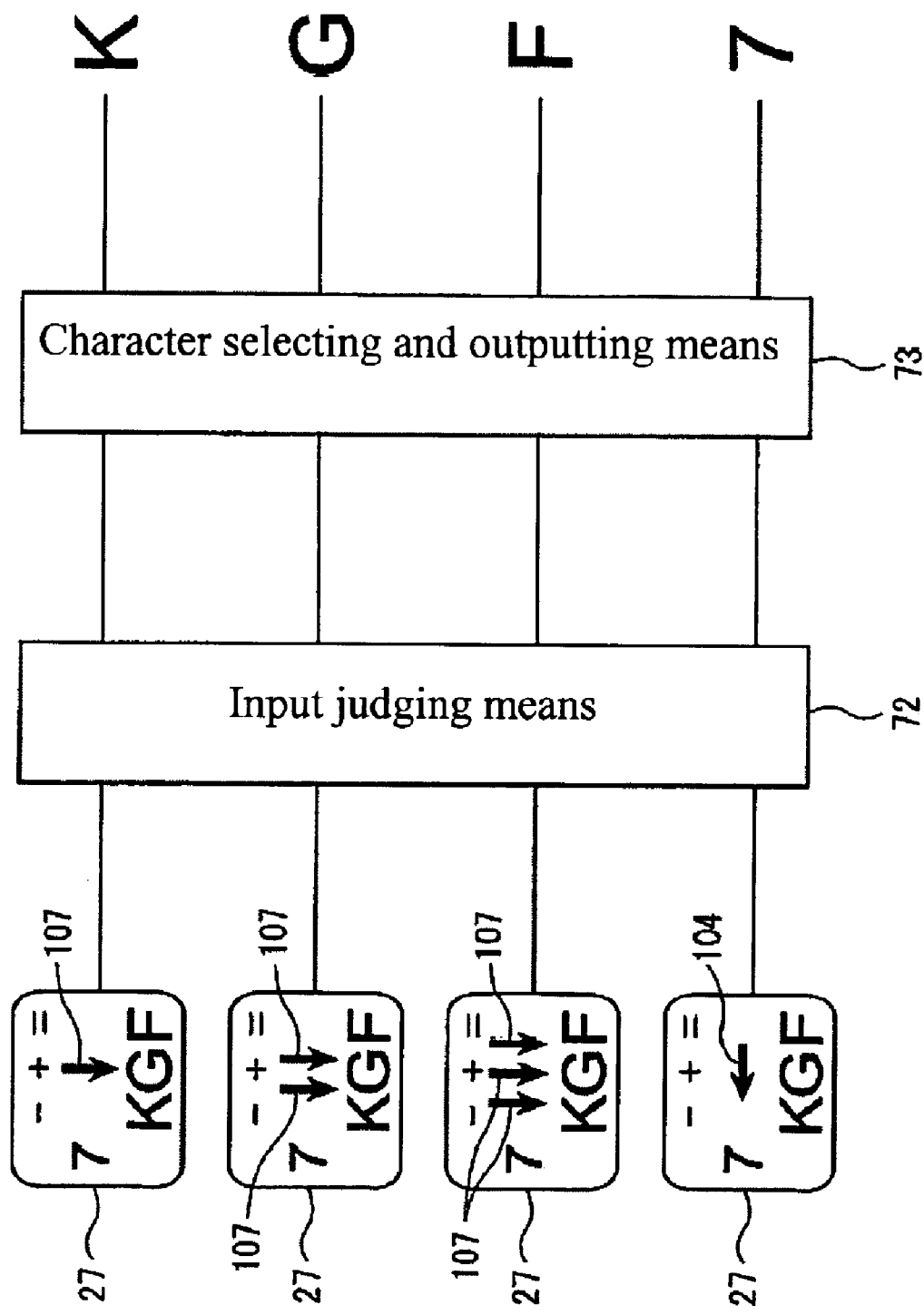
FIG. 10 is a schematic diagram of the draw-line touch input in the preceding second embodiment.

As shown in FIG. 10, taking a character key 27 as an example, if the character key 27 is touched by a pen, the input judging means 72 can judge that touch action; when the pen performs one time of draw-line touch along the down direction 107 of the character key 27, the input judging means 72 can judge that one time of draw-line touch along the down direction 107 is performed. The character selecting and outputting means 73, according to the times of the draw-line touch, selects the characters corresponding to the moving direction 107 in the order from left to right, and the characters are output through the liquid crystal screen 3. That is, if 1 time of draw-line touch in the down direction 107 is performed, [K] is selected and output.

If 2 times of draw-line touches in the down direction 107 are performed, [G] is selected and output, and If 3 times of draw-line touches in the down direction 107 are performed, [F] is selected and output.

If 1 time of draw-line touch in the left direction 104 is performed, [7] is selected and output.

If the moving direction of the draw-line touch action is the up direction 102, as same as the case of the down direction 107, the characters on the up portions of the press key surfaces are selected and input successively beginning with the symbols on the up left portion corresponding to the times of the draw-line touches.

Generally the draw-line touches in right direction 105 are not performed, but when the striking input mode is used to input English in English input mode and Japanese input mode, the draw-line touches in the right direction 105 can be used at the same time.

For example, in [English mode], the English alphabet on the farthest left portion (the left-down portion) of the surface of the press key is directly selected and input by use of the striking input mode. If the draw-line touch in the down direction 107 is performed, the second English alphabet (on the down portion) from left to right on the down portion of the surfaces of the press keys is selected and output; if the draw-line touch in the right direction 105 is performed, the third English alphabet (on the right-down portion) from left to right on the down portion of the surfaces of the press keys is selected and output. In this English mode, the second and third English alphabets from left to right can be input only by one time of touch, and the input efficiency is higher. If the draw-line touch in the left direction 104 is performed at this time, the characters on the left portion of the surfaces of the press keys will be selected and output; if the draw-line touch in the left direction 102 is performed, as described above, the corresponding symbols are selected and output according to the times of the draw-line touches.

In [kana mode], the English alphabets on the down portion of the press keys used by the Japanese Roman letter input can be directly selected and input by use of the striking input mode. If the draw-line touch of the left direction 104 is performed, the numbers on the left portion of the surfaces of the press keys are selected and output; if the draw-line touch of the up direction 102 is performed, as described above, the corresponding symbols will be selected and output according to the times of the draw-line touch; if the draw-line touch of the down direction 107 is performed, English capital alphabets used by the English input are selected and output corresponding to the times of the draw-line touch.

In [number mode], the numbers on the left portions of the press keys can be directly input by use of the striking input manner. If the draw-line touch of the up direction 102 is performed, respective symbols are selected and output corresponding to the times of the draw-line touch; if the draw-line touch of the down direction 107 is performed, English alphabets are selected and output corresponding to the times of the draw-line touch.

In [symbol mode] the draw-line touch input can be carried out likewise, but the other types of characters almost can not be input in [symbol mode], therefore it is best to input symbols by use of the striking input manner.

Besides the effects (1)–(6), (10)–(15) of the first embodiment, the second embodiment described above has following advantages.

16. 4 moving directions, i.e. the up direction 102, the left direction 104, the right direction 105 and the down direction 107, are judged, and since a few directions are judged and the intervals of the directions are equal, the judging errors of the input judging means 72 can be reduced.

17. The surfaces of the character keys 21–32 are divided into 4 parts, and 4 moving directions of 102, 104, 105 and 107 of the draw-line touch actions can be judged, thus comparing with 8 parts in 8 directions, the judging scope is bigger to be capable of reducing the deviations occurred when the operator selects the moving direction, and accurately judging it, and the input efficiency is high.

18. English alphabets appeared most frequently in articles can be input both by the draw-line touch of the down direction 107 and by the draw-line touch of the right direction 105, and comparing with the case in which only the down direction 107 is set, the input speed is higher and the operation is simpler.

[Embodiment 3]

The third embodiment of the invention is introduced below in conjunction with FIGS. 11–24.

In present embodiment, the constitutional parts as same as or similar to those of the prior embodiments are shown by the same reference numbers. The description of the same or similar parts will be omitted or simplified.

Figure 11:
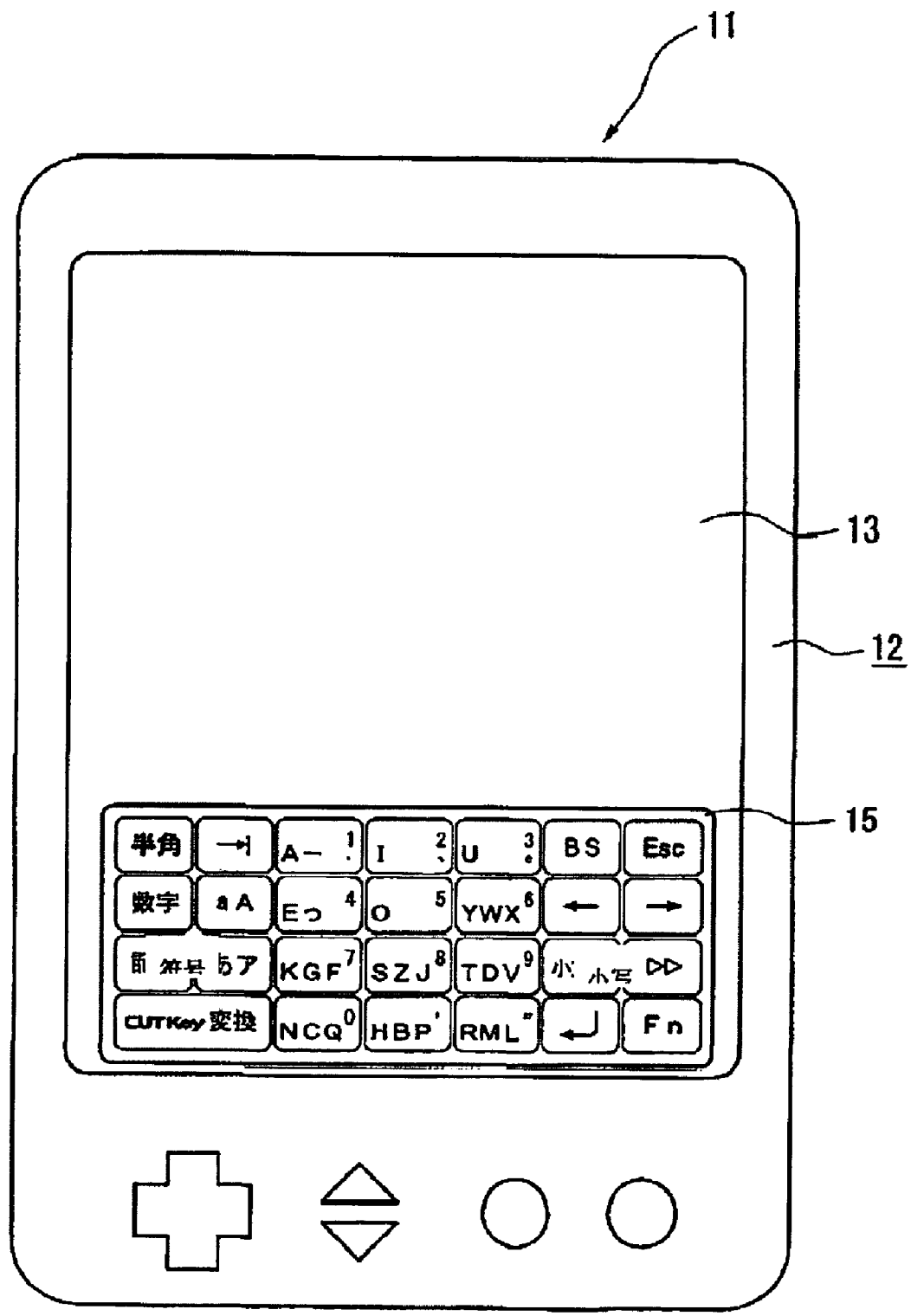
FIG. 11 is a plan view of a touch press key input device in a third embodiment.

As shown in FIG. 11, a touch press key input device 11 of the third embodiment of the invention is a personal digital assistant (PDA), on a surface of a body 12 of which is provided with constituents of a liquid crystal screen 13.

The touch press key input device 11, as the prior embodiments, is attached with a pen for inputting.

The liquid crystal screen 13, as the prior liquid crystal screens 3, can show characters and so on and also show a soft keyboard 15.

The liquid crystal screen 13 is integrally set to be the touch input detecting area 4 described before.

That is, the soft keyboard 15 employed by the third embodiment is somewhat different from the keyboard piece 5 employed by the first and second embodiments.

Further, as described below, the present scheme is added a shot cut input method in order to improve the input efficiency of Japanese. This point is also different from the prior embodiments.

The soft keyboard 15 has same character key and function key in number and shape as the keyboard piece 5.

Illustrations are made to the same characters set on press key on the positions corresponding to the positions of the pres keys 21–32 and 51–65 on the keyboard piece 5.

Figure 12:
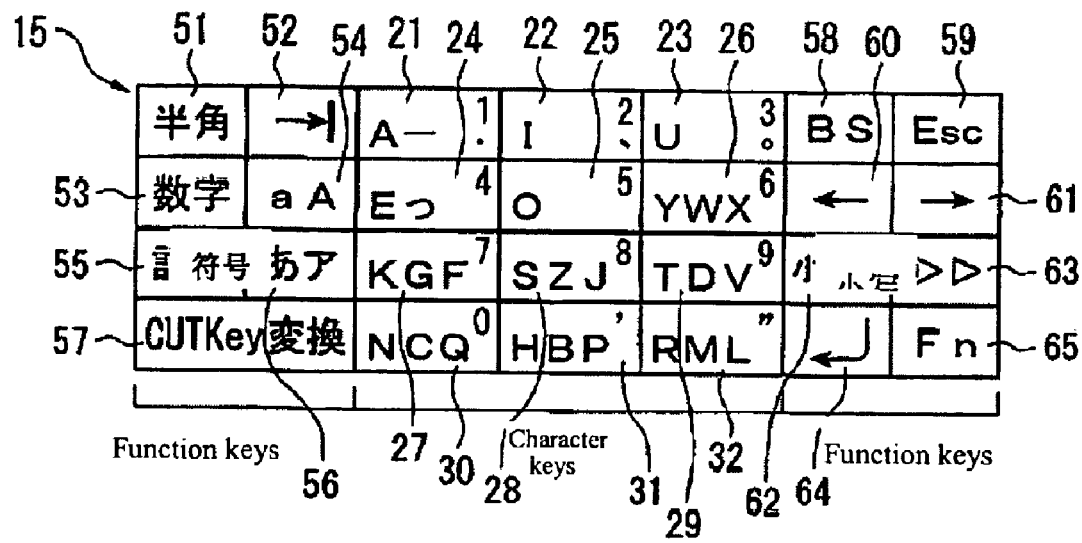
FIG. 12 is a configuration diagram of a kana mode in the preceding third embodiment.

As shown in FIG. 12, both English alphabets and numbers on the pres keys 21–32 and 51–65 are configured in accordance with kana mode, thus the Japanese Roman letter input can be carried out.

English alphabets (including [っ]) are set on the down portions of the surfaces of the character keys 21–32, which is same as the standard configuration (commonly used by Japanese and English) in the prior embodiments, but the numbers and symbols set on the surfaces of the press keys in the standard configuration (commonly used by Japanese and English) are set on the right-up portions of the surfaces of the press keys in the present embodiment.

[・], [ヽ], [．] are set on the right-down portions of the surfaces of the character keys 21–32, respectively The function 51–65, same as in prior embodiments, has the functions needed for the input mode conversion and the character input.

Figure 13:
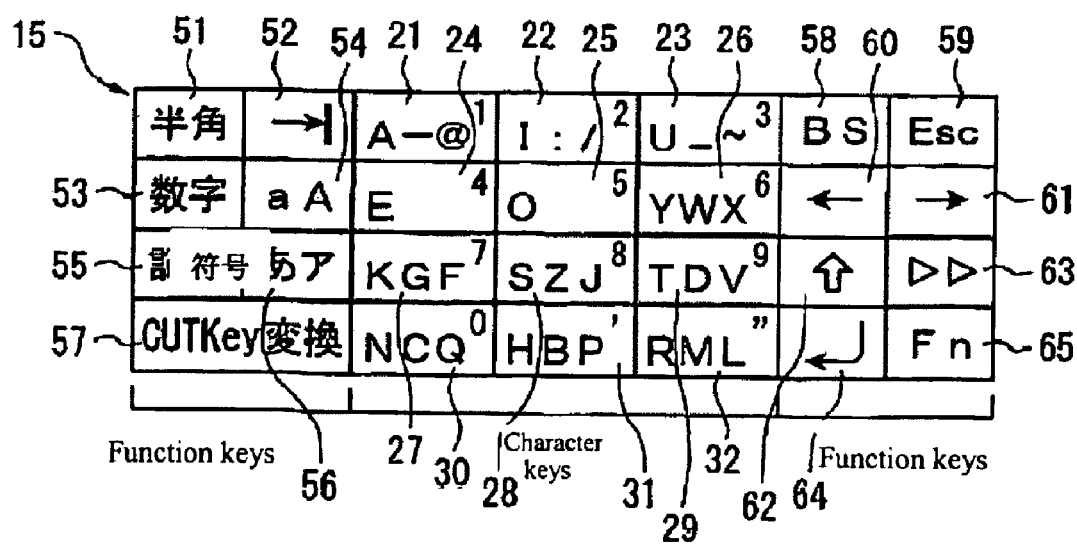
FIG. 13 is a configuration diagram of an English mode of the soft keyboard in the preceding third embodiment.
Figure 14:
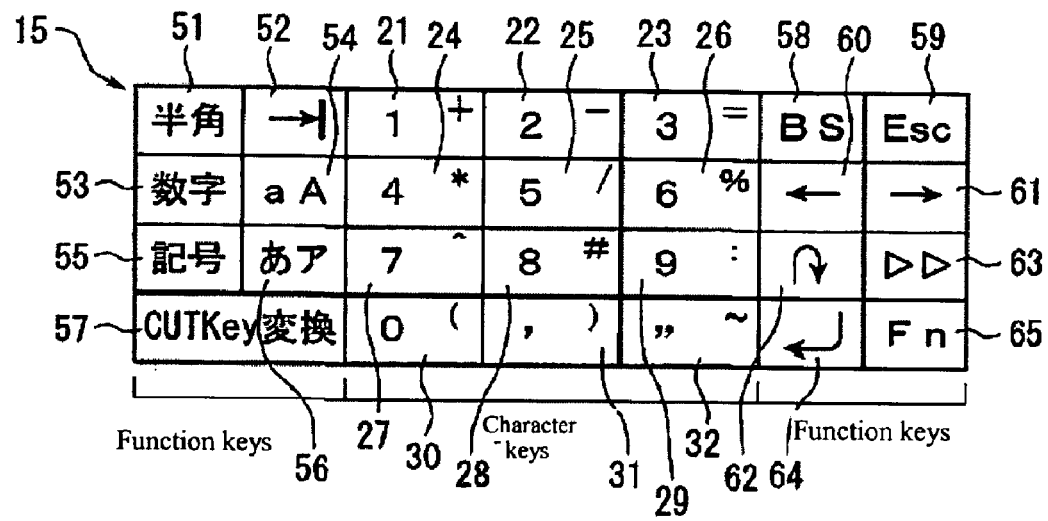
FIG. 14 is a configuration diagram of a number mode of the soft keyboard in the preceding third embodiment.
Figure 15:
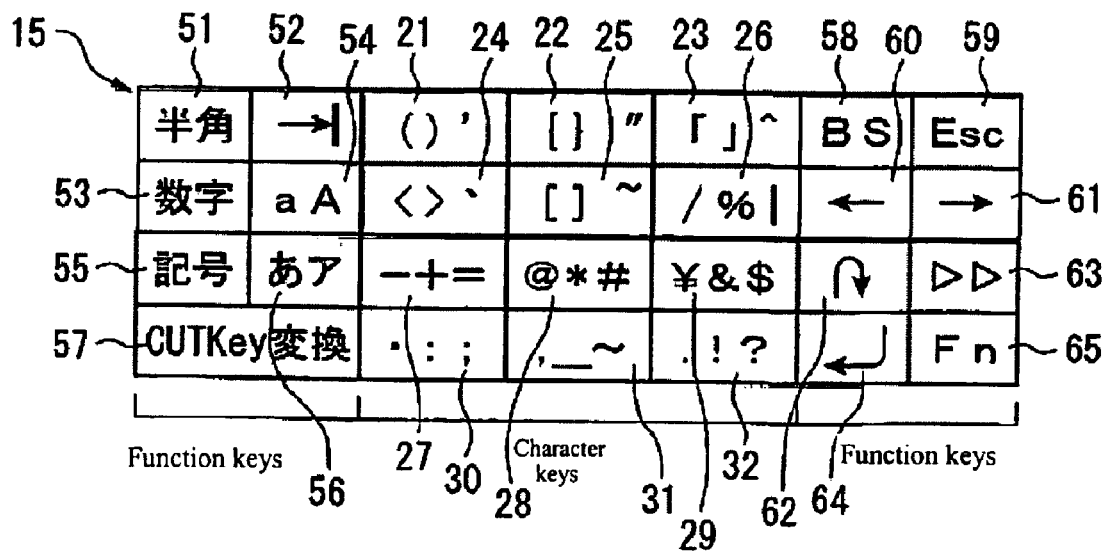
FIG. 15 is a configuration diagram of a symbol mode of the soft keyboard in the preceding third embodiment.

The present embodiment, same as the two embodiments described before, has 4 input modes of [kana mode], [English mode], [number mode] and [symbol mode]. The difference is that: since the pres keys 21–32 and 51–65 are displayed on the soft keyboard 15 on the liquid crystal screen 13, when the input mode is converted, as shown in FIGS. 13–15, the character keys 21–32 and the function 51–65 will alternatively display English alphabets, numbers and symbols responding to different input modes.

The function keys 51–65, on the surfaces of which the word [number] is marked, are used for converting the input modes, that is, the input mode is converted into [number mode] for inputting numbers.

The character [a A] is marked on the surfaces of the function key 54, that is, the input mode is converted into [English mode], and the conversion between the [English small character mode] and [English capital character mode] can be carried out.

The word [symbol] is marked on the surfaces of the function key 55, that is, the input mode is converted into [symbol mode] for the symbol inputting.

The characters [あ ア] are marked on the surfaces of the function key 56, that is, the input mode is converted into [kana mode], and the conversion between the [hiragana mode] and [katakana mode] can be carried out.

Further, the function keys, such as the function key 51, the function key 52, the function key 57, the function key 58 and the function key 59, used auxiliary for character edition, are set.

The word [half shape] is marked on the surfaces of the function key 51, and the conversion between the [half shape] and [whole shape] of the English alphabets, numbers, symbols and the like can be carried out.

The function key 52 is same as the Tab key described before.

Besides inputting a space, the function key 57 can convert the input characters into Chinese characters and so on.

The function key 58 is same as the standard configuration (commonly used by Japanese and English) in the first and second embodiments, and the function is same as Back Space.

[→]

By striking this key, the prior input state can be returned, and at the same time, all characters before converted can be deleted in the [kana mode].

The function key 60 is a cursor moving key, and on its surface there is a [←] mark, that is, the position of the cursor can be moved leftwards, and the cursor can be moved leftwards into a sentence in conversion.

The function key 61 is a cursor moving key, and on its surface there is a [→] mark, that is, the position of the cursor can be moved rightwards, and the cursor can be moved rightwards into a sentence in conversion.

The surface of the function key 62 is marked with words [small character], a small character can be input in the [kana mode], the function of the function key 62 is same as that of the Shift key 62, and by striking it the fore input mode can be returned in the [number mode] and [symbol mode].

The function key 62 is same as the Pause Repeat key described before.

The function key 64 is marked with arrows on its surface, and is used to determine the undetermined words and change line after determining them.

The function key 65 is marked with [Fn] on its surface, and its function is to display the command configuration described below.

The function keys 51–65 in the embodiment is somewhat different from those in the first and second embodiments in the arrangement and function setting, but they also can be arranged and set in a same manner as the first and second embodiments.

The internal structure of the touch press key input device 11 is same as that of the preceding embodiments, and the touch input means 71, the input judging means 72 and the character selecting and outputting means 73 are also employed.

The touch input method is same as in the fore embodiments, and the two manners of the draw-line touch input and the direct touch input can be employed.

At most 4 characters are set on the character keys 21–32, and these characters are marked on the right-up portions, the left-down portions, the down portions and the right-down portions of the press keys.

The relative positions of the characters listed on the surfaces of the press keys respectively correspond to 4 moving directions (right-up direction 103, left-down direction 106, down direction 107 and right-down direction 108) in draw-line touch inputting, and if the draw-line touches in the moving directions are carried out, the characters in the respective directions are input.

The input judging means 72 is substantially same as that of the first embodiment in the function exempt for the fact that the preceding 4 moving directions 103, 106, 107 and 108 can be judged.

The character selecting and outputting means 73 is also same as that of the first embodiment, and the characters in the moving directions 103 and 106–108 of the surfaces of the character keys 21–32 are first selected in draw-line touch inputting. The selected characters are displayed through the liquid crystal screen 3.

The striking input is completely same as those of the first and second embodiments, wherein the input judging means 72 first judges the number of the striking times, and then the character selecting and outputting means 73, according to the judged result, selects the corresponding characters, which are displayed through the liquid crystal screen 13.

Therefore, before the touch input (the draw-line touch input and the striking input) is prepared, the output mode are first selected, then a proper touch input mode is selected according to the characters marked on the character keys 21–32, and the characters input are finally displayed on the liquid crystal screen 13.

Figure 16:
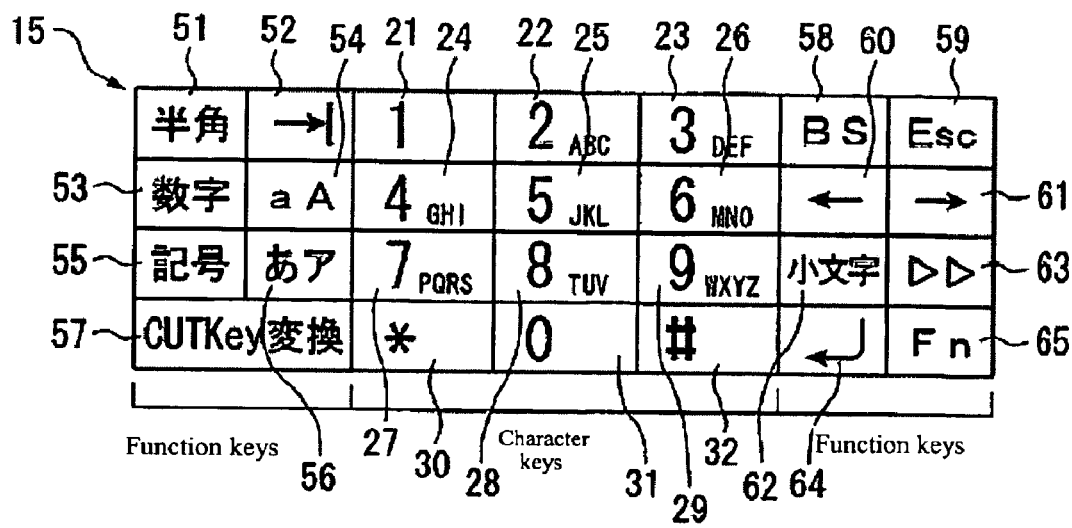
FIG. 16 is an alternative configuration of the soft keyboard in the preceding third embodiment.

Besides the above configurations (kana mode configuration, English mode configuration, number mode configuration, and symbol mode configuration), the soft keyboard 15 can also employ [ABC], [DEF] and so on used by a general portable telephone set, as shown in FIG. 16.

Figure 17:
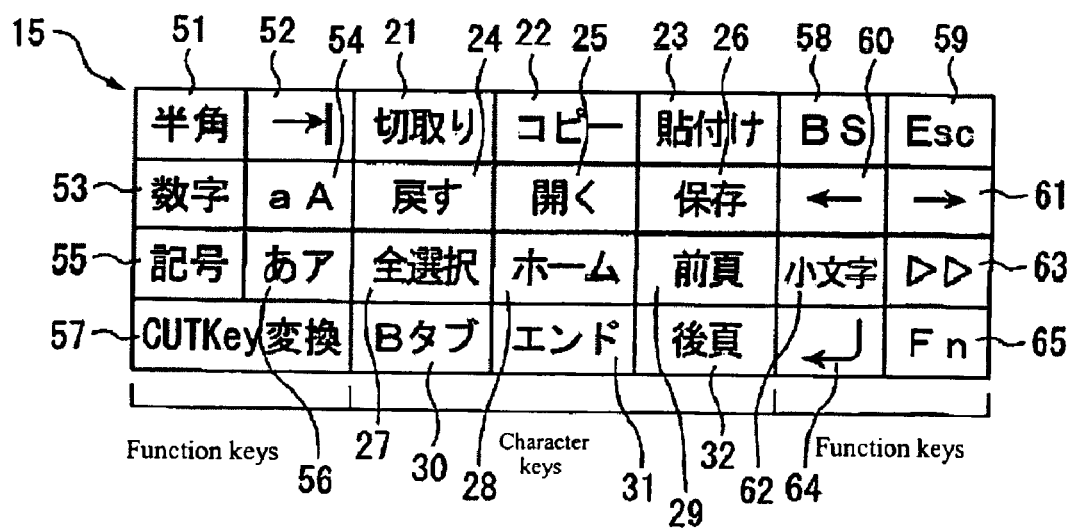
FIG. 17 is an instruction configuration diagram of the soft keyboard in the preceding third embodiment.

In addition, as shown in FIG. 17, the command configuration mode of the command function is set on the character keys 21–32.

If the configuration is in accordance with the manner as shown in FIG. 16 and FIG. 17, and the changes to the functions of the input judging means 72 and the character selecting and outputting means 73 are only required, likewise by use of the touch input (the draw-line touch input and the striking input) methods, the characters are input, and output to the liquid crystal screen 3.

Besides the effects (1)–(5), (8), (10)–(15) of the first embodiment, the third embodiment described above has following characteristics.

19. The press keys 21–32 and 51–65 on the soft keyboard 15 are shown on the liquid crystal screen 13, and the soft keyboard 15 does not appear when it is not needed, thereby the whole liquid crystal screen 13 can be used. Particularly when web pages, figures, tables and the like of Internet are browsed, the increased display scope facilitates the browsing.

20. The character (English alphabets, numbers, and symbols) configurations on the character keys can be properly changed in combination with the character types to be input. At most 4 fewer characters are set on the press keys 21–32 so as to reduce the occupied spaces of the soft keyboard 15 on the liquid crystal screen 13 and increase the displaying scope of the figures, tables and the like on the liquid crystal screen 13, and it is more convenient to browse images.

21. Auxiliary functions are set on the press keys 21–32, so as to reduce the troubles in inputting voiced sound and awkward sounds by the striking mode, and the input speed is higher and the operations are more convenient.

[Embodiment 4]

The fourth embodiment of the invention is introduced below in conjunction with FIGS. 18–21.

The fourth embodiment is same as the first embodiment in the basic input operations, but the draw-line touch input is emphasized so as to input more easily the characters used most frequently by Japanese and English.

In present embodiment, the constitutional parts as same as or similar to those of the prior embodiments are shown by the same reference numbers. The description of the same or similar parts will be omitted or simplified.

A touch press key input device of the fourth embodiment is as same as that of the first embodiment, and is composed of a body 2 provided with a liquid crystal screen 3 and a touch input detecting region 4, and a keyboard piece 5A pasted on the touch input detecting region 4.

Comparing the keyboard piece 5A with the keyboard piece 5 (reference to FIG. 2) of the first embodiment, the configurations of the press keys are partly different, and the new character strings not marked on the keyboard piece 5A can be input by the use of the draw-line touch input method.

Figure 18:
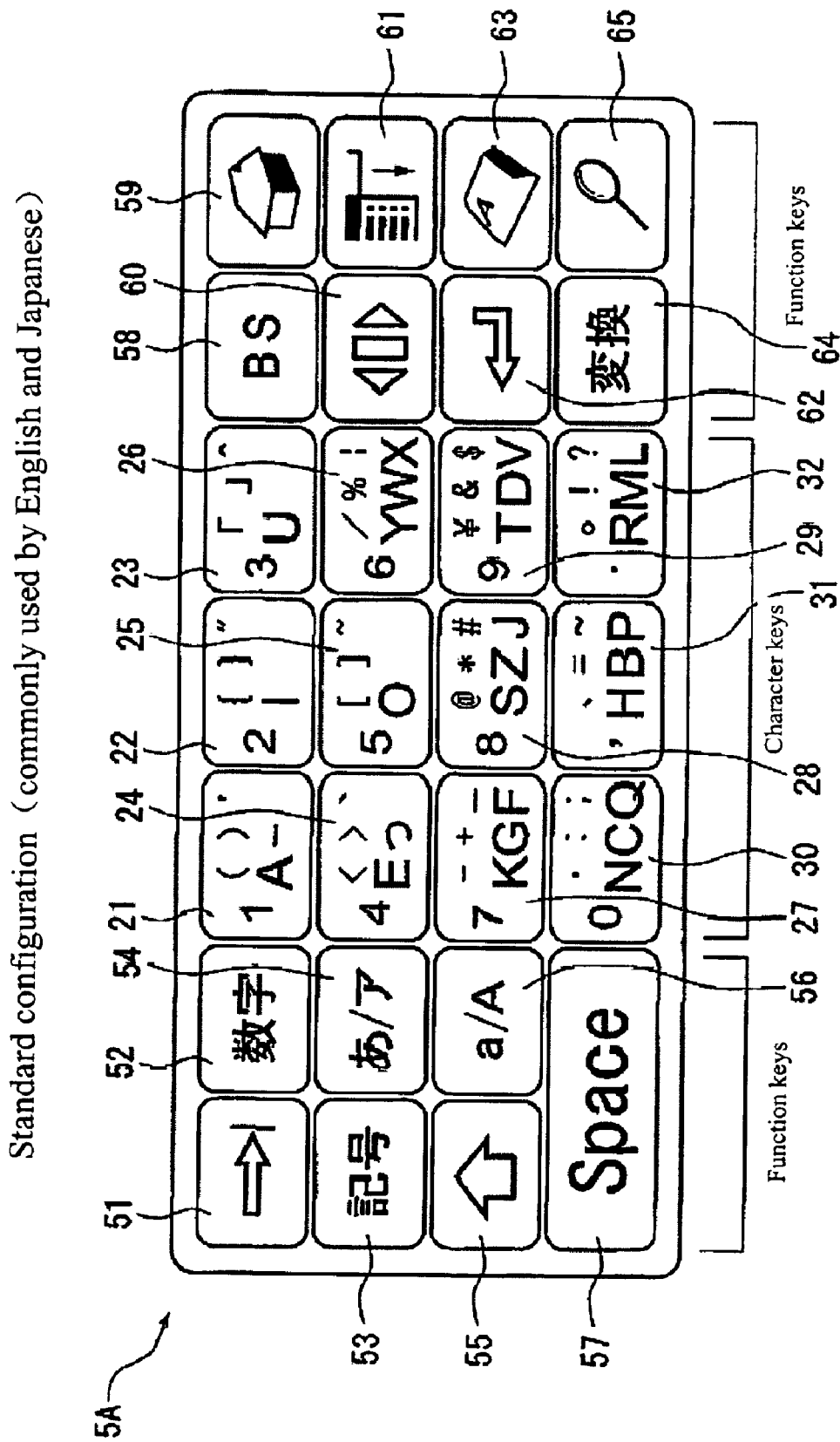
FIG. 18 is a plan view of a keyboard piece in a fourth embodiment.

The particular configurations are shown in FIG. 18, and exempt for the different symbol configurations on the up portions of the surfaces of the character keys, the configurations of the press keys of the keyboard piece 5A is almost completely same as the keyboard piece 5 of the first embodiment.

The character configuration on the surface of the character key 27 is [−+_] from left to right, and the character configuration on the up portion of the surface of the character key 31 is [` =∽] from left to right.

The internal structure of the touch press key device of the present embodiment is same as that of the first embodiment, and the input touch means, the input judging means 72 and the character selecting and outputting means 73 are also employed (reference to FIG. 3). The character input method is same as that of the first embodiment, and two input methods of the draw-line input and the striking input in 8 run directions of the pen are employed.

The particular operations of the striking input is same as that of the first embodiment, and the input mode is converted and then the corresponding English alphabets, numbers, and symbols are selected according to the touch times (1–3 times) on the character keys 21–32.

Figure 19:
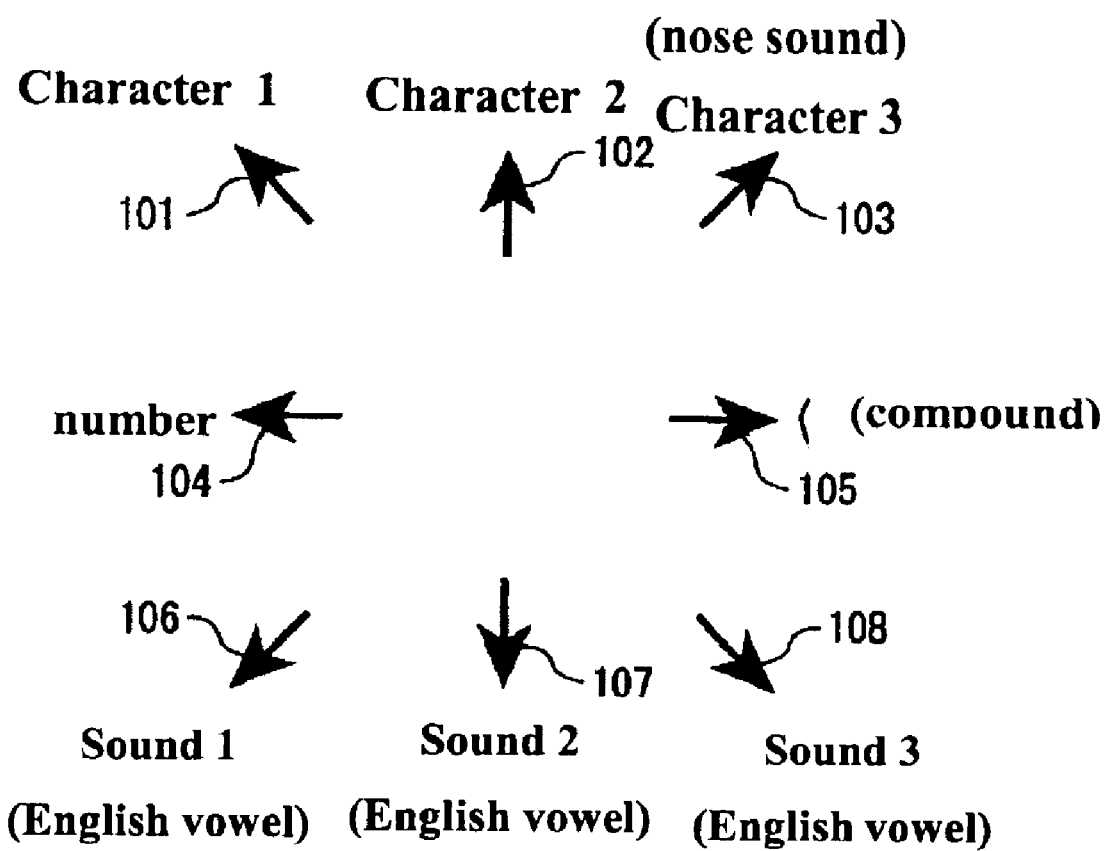
FIG. 19 is a schematic diagram of the moving direction of the draw-line touch input in a fourth embodiment.

In addition, same as the first embodiment, two input methods of the draw-line input and the striking input are used at the same time. FIG. 19 shows the draw-line input method in 8 directions, that is, the characters displayed in the moving directions of the character keys 21–32 can be input corresponding to the moving directions 101–108 of the pen.

However, in the first embodiment, the draw-line input in right direction 108 is set as the number input, and in the present embodiment, only the draw-line input in left direction 104 can carry out the number input.

The character strings in the brackets shown in FIG. 19 are set on the character keys 21–32, and the character strings, though not marking on the surfaces of the press keys, can input by the draw-line touch action in directions shown in FIG. 19. Since a free register table is designed in the character selecting and outputting means 73, the input can be realized as long as the characters corresponding to the press key operations are registered in that table in advance. The initial setting of the registration is performed by manufacturers, and can be done freely by the user with the use of the user registration functions.

For example, as shown in FIG. 20 and FIG. 21, when the draw-line touch input is carried out under the English input mode, if the words and so on used more frequently are set in advance, the input efficiency would be improved greatly.

That is, an English alphabet is to be input by use of the character keys 21–25, and this can be completed by one time of striking action or draw-line touch action in the left-down direction 106.

On other hand, as shown in a box of [draw-line touch] of the character keys 21–25 in FIG. 20, if the draw-line touch in the down direction 107 is performed on the character key 21, [an] can be input; if the draw-line touch in the left-down direction 108 is performed, [as] can be input; and if the draw-line touch in the right direction 105 is performed, [at] can be input, [A] marked on the surface of the press key means the preposition words beginning with A.

Likewise, [is] can be input by use of the down direction 107 of the character key 22, [in] can be input by use of its right-down direction 108, and [it] can be input by use of its right direction 105, [I] marked on the surface of the press key means the words beginning with I.

[up] can be input by use of the down direction 107 of the character key 23, [us] can be input by use of its right-down direction 108, and [ul] can be input by use of its right direction 105, [u] marked on the surface of the press key means the character strings related to U.

[ea] can be input by use of the down direction 107 of the character key 24, [er[ can be input by use of its right-down direction 108, and [es] can be input by use of its right direction 105; [on] can be input by use of the down direction 107 of the character key 25, [of] can be input by use of its right-down direction 108, and [off] can be input by use of its right direction 105. [E] and [O] marked on the surface of the press key means the character strings related to E and O.

The operating method for inputting the English alphabets in the character keys 26–32 by the draw-line touch input mode is shown in FIG. 21, and if the moving directions of the draw-line touches are the left-down direction 106, down direction 107, and right-down direction 108, the characters marked on the respective positions on surfaces of the press keys are input respectively in principle.

If the moving directions of the draw-line touches on the character keys 26–32 are the right direction 105, the new character strings can be input, in particular, [you], [for], [so], [to], [no],[he] and [me] are set on the character keys 26–32, that is, the character strings beginning with English alphabets marked on the surfaces of the press keys are set.

As described before, because the character strings appeared frequently in inputting English are set, the characters not marked on the surfaces of the press keys can be input, likewise the character strings appeared frequently in French, German, Italian, Russian, Chinese, Korean, Japanese and other languages can be set in advance, and the principle is same as the shortening input method used by Japanese and English, so as to be capable of reducing the touch times of the press keys. Therefore, it is possible completely that in combination with different languages, a keyboard system commonly used in the world can be made by slightly changing the settings.

This is not limited to the character strings appeared most frequently in languages, and the character strings used most frequently by a user can also be set, thereby improving the input efficiency greatly.

Besides the effects (1)–(8), (10)–(15), (17), (18), (21) of the preceding embodiments, the fourth embodiment described above has following characteristics.

22. The words or character strings and the like used most frequently in Japanese and English can be set in the directions not marked on the surfaces of the press keys, so as to reduce the number of the touch times of the press keys 21–32 in inputting and improve the input efficiency.

23. If the draw-line touches of the down direction 107, the right-down direction 108, and right direction 105 are performed on the character keys 21–25 set with vowels, the words appearing frequently in English can be input, and the input speed is high. If the draw-line touches of the right direction 105 and the right-up direction 103 are performed on the character keys 26–32 set with consonants, the consonants, once being input by several times of touches, can be input only by needing one time of touch, and the input speed is high.

24. The characters or words, which can be input by touching at least two times or more, are set as character strings in advance and thus can be input by touching press keys one time, so as to reduce the number of the touch times on the character keys 21–32 and improve the input efficiency.

25. The characters, which relate to the characters marked on the surfaces of the press keys but are not completely marked out, can be set on the press keys in a manner of character strings in advance, and then are input by the draw-line input method. Therefore, the characters, even if not marked out, can be input through the keyboard, and further, the character strings set on the character keys 21–32 are easy to remember, thereby the input operation is simple.

26. Because the characters not marked out can be input by the input system designed, all needed is that the English alphabets, symbols and numbers commonly used in Japanese and English are marked on the keyboard piece 5, and the characters specially belonging to Japanese or English and so on need not be marked out, thus the keyboard piece 5 is not limited to the input of Japanese and English, and can become completely a general keyboard over the world. The reduction of the types of the keyboard piece 5 corresponds to the low production cost.

[Embodiment 5]

The fifth embodiment of the invention is introduced below in conjunction with FIGS. 22–28.

Figure 22:
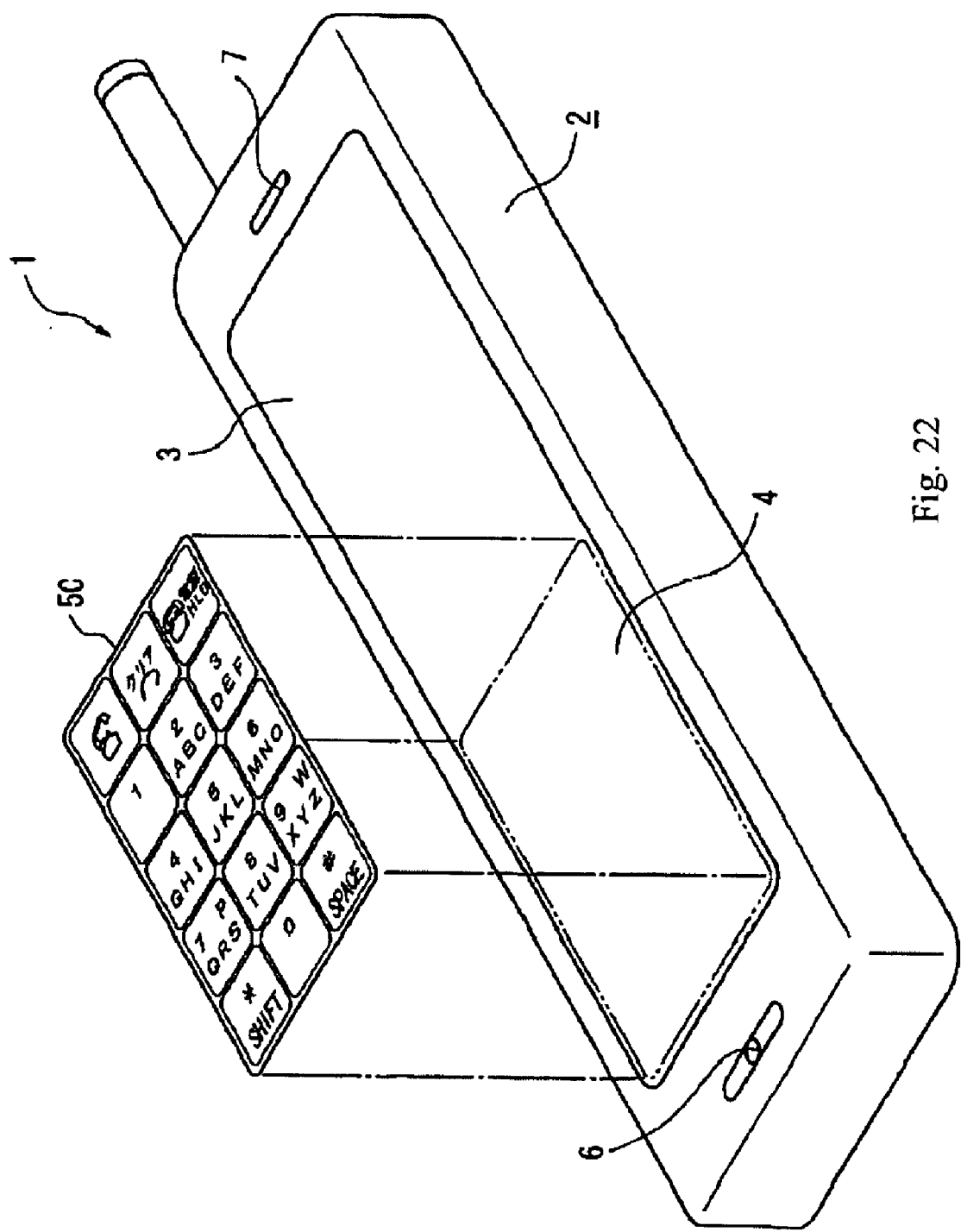
FIG. 22 is a perspective view of a touch press key input device in a fifth embodiment of the invention.

FIG. 22 shows a touch press key input device 1 of the fifth embodiment of the invention.

As shown in the figure, the touch press key input device of the present embodiment is mainly used to a portable telephone, and is composed of a body 2 provided with a liquid crystal screen 3 and a touch input detecting region 4, and a keyboard piece 5C pasted on the touch input detecting region 4. Further, the body 2 is provided with a microphone 6 and a speaker 7.

The touch input detecting region 4, same as the liquid crystal screen 3, can display various kinds of information. The touch input detecting region 4 is to use a part of the liquid crystal screen 3, and the keyboard piece 5C is pasted on with separated adhesive. Therefore, if the keyboard piece 5C is removed, the whole liquid crystal screen 3 containing the touch input detecting region 4 can used to display various kinds of information, and thus is used as a personal digital assistant (PDA).

The touch press key input device 1 (portable telephone set) is likewise provided with a pen for the draw-line touch input (not shown in the figure), and a hole to hold the pen is provided in the body 2, thereby the damage or losing of the pen can be prevented.

When the touch press key input device 1 is used, the body 2 is held by left hand (or right hand), or the body 2 is placed on the surface of the desk, and then the operation is performed by holding the pen by right hand (or left hand).

Displayed in the liquid crystal screen 3 are the input characters as well as characters or images and the like received through Internet and other communication lines.

The touch input detecting region 4, being touched by a pen or the like, can detect the touching pressure of the pen. Once characters or figures are written onto the touch input detecting region 4, the written characters or figures can be input into the device as they were. For example, the drawn maps and so on can be input.

Figure 23:
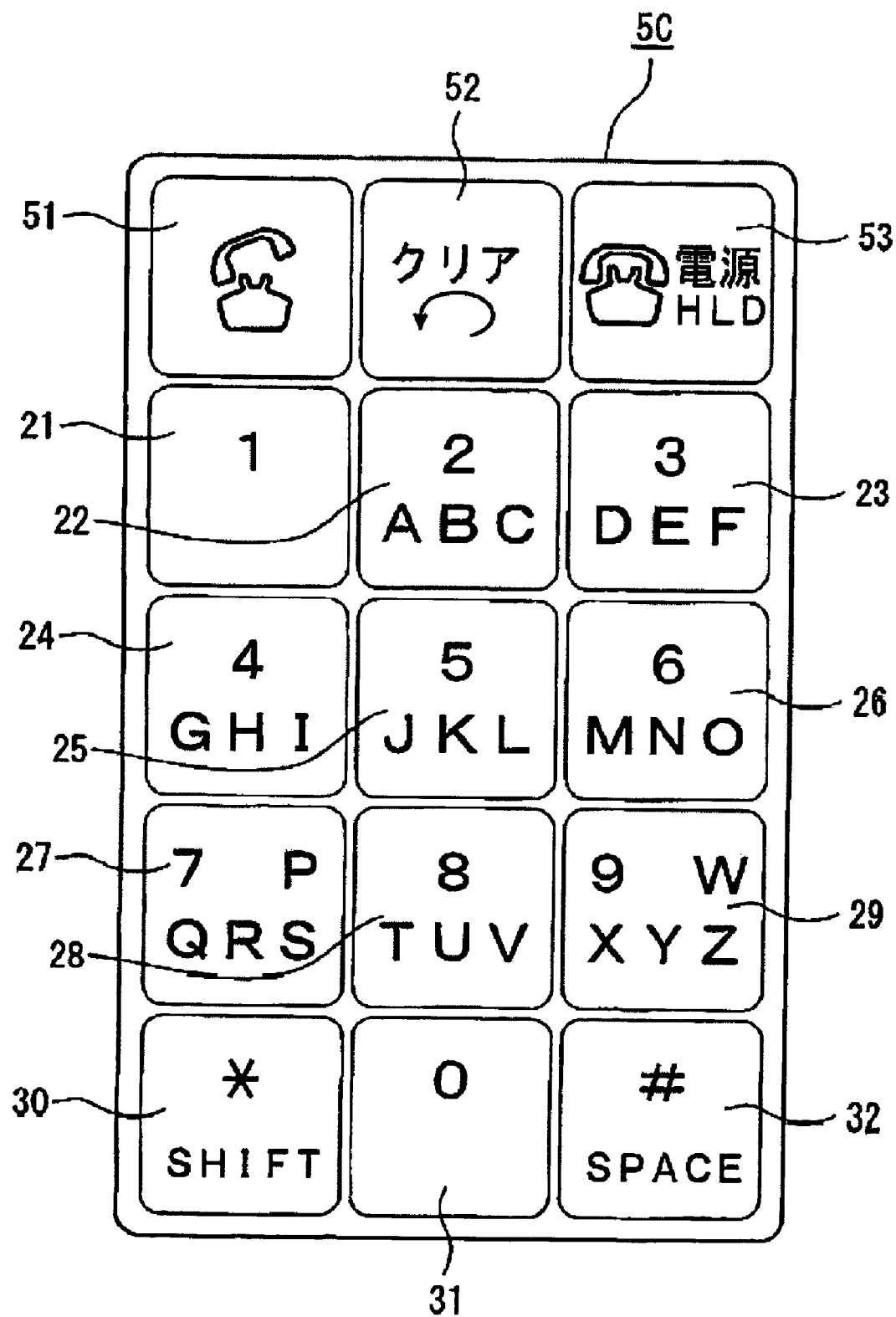
FIG. 23 is a plan view of a keyboard piece in the fifth embodiment.

As shown in FIG. 23, the keyboard piece 5C contains total 12 character keys 21–32 in 4 up and down rows and 3 left and right columns, and 3 function keys 51–53 set on the character keys 21–32. All the press keys 21–32 and 51–53 are arranged in the following manner, and the input of the English and Japanese Roman letters can be performed.

The keyboard piece 5C is pasted on the touch input detecting region 4, and each of the press keys 21–32 and 51–53 has its own corresponding function so as to input characters.

The characters configured on the up portions (above the center position (reference position)) of the surfaces of the character keys 21–26, 28, and 30–32 respectively are: 3 numbers 1–3 are configured on 3 character keys 21–23 in the first row from left to right, that is, [1] is configured on the character key 21, [2] on the character key 22, and [3] on the the character key 23. 3 numbers 4–6 are configured on 3 character keys 24–26 in the second row from left to right, that is, [4] is configured on the character key 24, [5] on the character key 25, and [6] on the character key 26.

Number [8] is configured on character key 28 in the third row of the keyboard. The character configurations of 3 character keys 30–32 in the fourth row of the keyboard from left to right are: [*] is configured on the character key 30, [0] on the character key 31, and [#] on the character key 32.

Numbers [7] and [9] are configured on the left-up portions (in the left-up directions of the center positions of the surfaces) of the surfaces of the character keys 27 and 29 in the third row of the keyboard, respectively.

6 character keys 22–26 and 28 among 12 character keys 21–32 are configured with 3 English alphabets respectively, and character keys both 27 and 29 are configured with 4 English alphabets.

In particular, one English alphabet is respectively set at three positions of the left-down portion, down portion, and right portion of the reference positions of the press keys, that is, ⌈ABC⌋ are set on the character key 22, ⌈DEF⌋ on the character key 23, ⌈GHI⌋ on the character key 24, ⌈JKL⌋ on the character key 25, ⌈MNO⌋ on the character key 26, and ⌈TUV⌋ on the character key 28.

In addition, ⌈P⌋ is set on the right-up portion of the center position of the surface of the character key 27, ⌈Q⌋ on the left-down portion, ⌈R⌋ on the down portion, and ⌈S⌋ on the right-down portion. ⌈W⌋ is set on the right-up portion of the center position of the surface of the character key 29, ⌈X⌋ on the left-down portion, ⌈Y⌋ on the down portion, and ⌈Z⌋ on the right-down portion.

3 or 4 English alphabets are set on the character keys 22–29 in the order of the alphabets.

In addition, set on the down portions of the character keys 30 and 32 are ⌈SHIFT⌋ function for the conversion of capital and small letters, and ⌈SPACE⌋ function for the input of the space.

Figure 24:
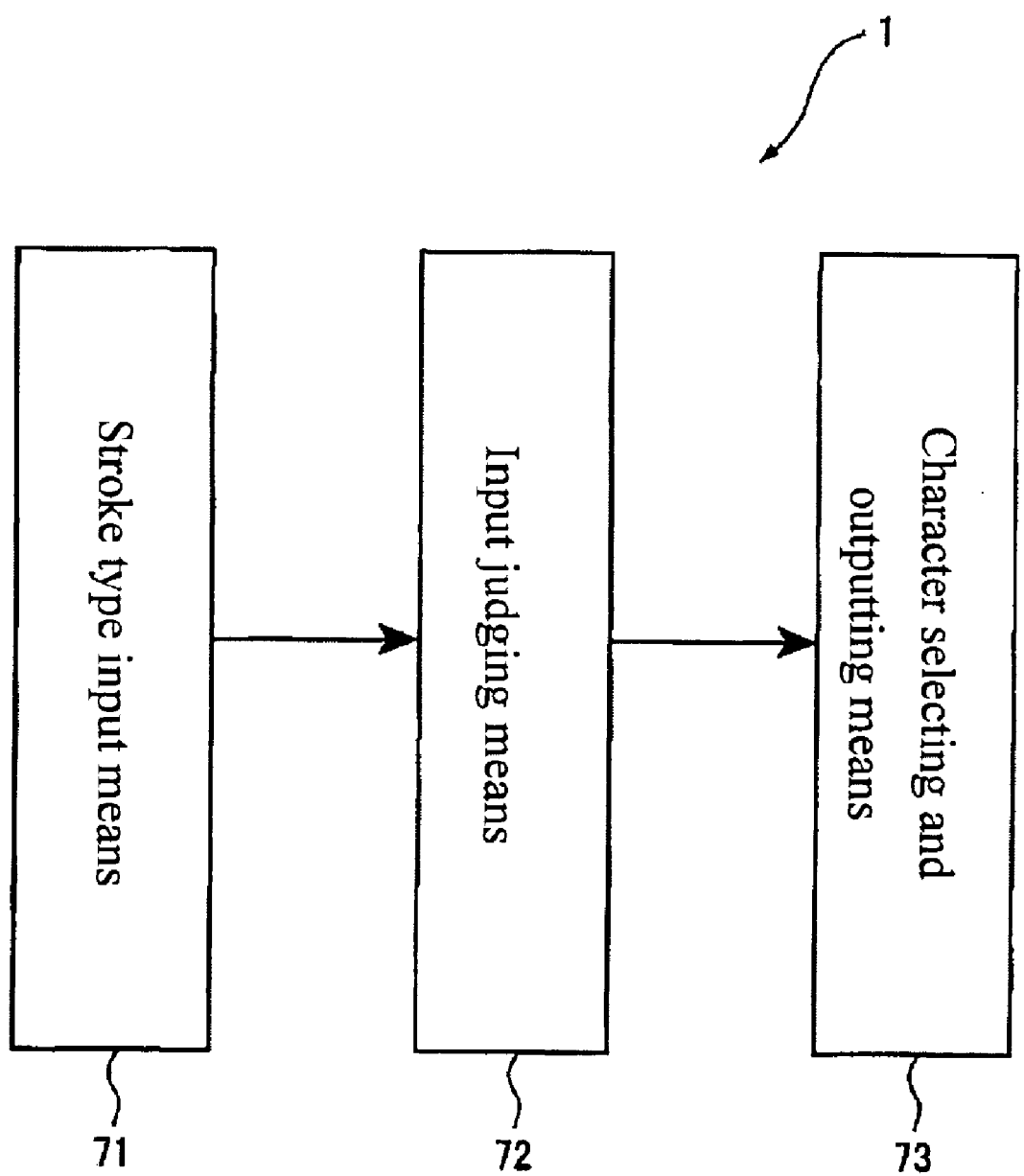
FIG. 24 is a block diagram of the internal structure of the touch press key input device in the preceding fifth embodiment.
Figure 26:
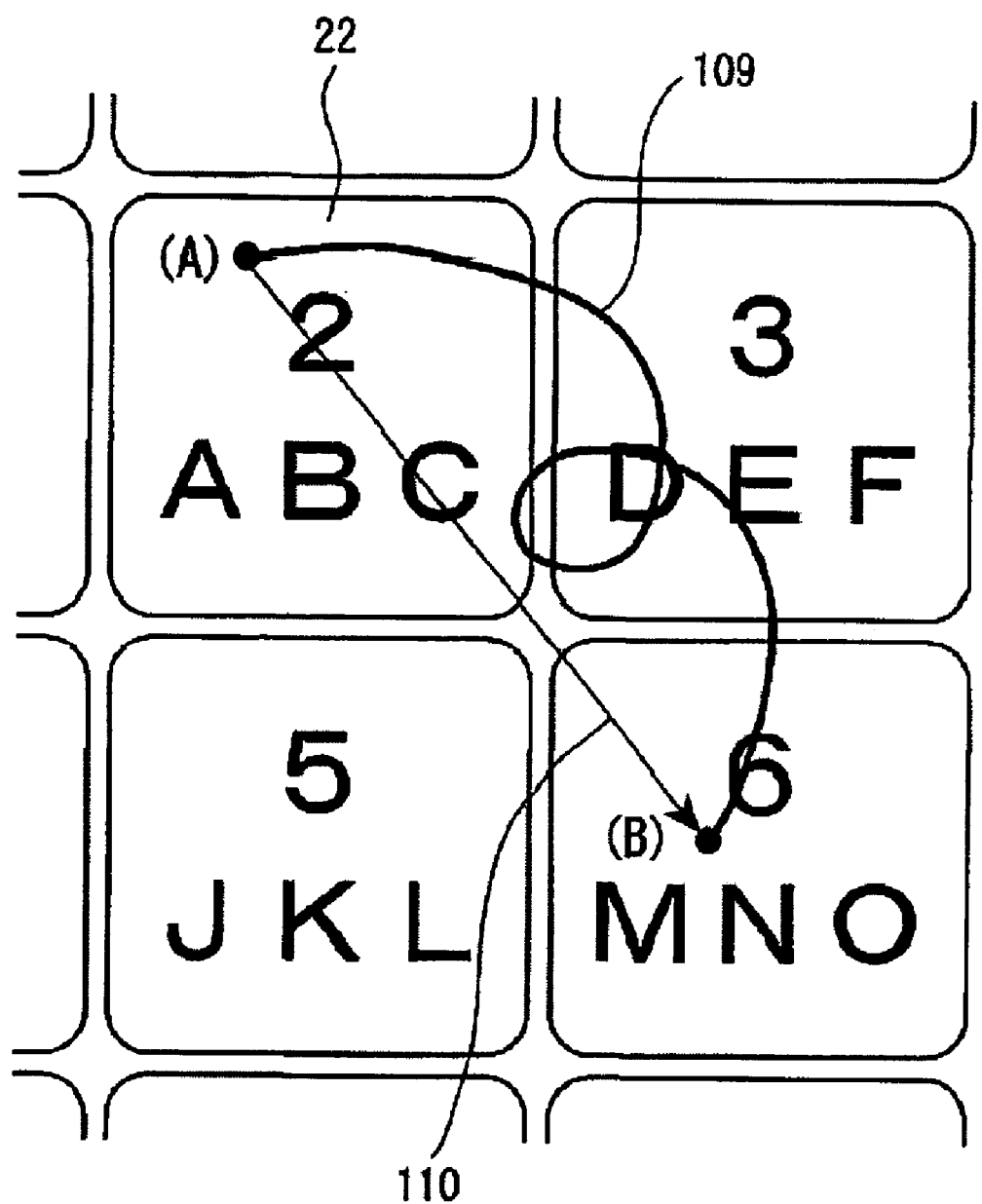
FIG. 26 is a schematic diagram of the touch action of the draw-line touch input in the preceding fifth embodiment.

Various functions, such as conversing, hanging up, history recording and displaying, input removing and so on for telephone, are set on the function keys 51–53 respectively The internal structure of the touch press key input device 1 is described in conjunction with FIG. 24. FIG. 24 is an internal function block of the touch press key input device 1.

The touch press key input device 1 is same as the preceding description, and the touch input means 71 of the pen touch, the input judging means 72 and the character selecting and outputting means 73 are employed.

The input judging means 72, when the keyboard piece 5C is pasted on the touch input detecting region 4, is to judge the corresponding regions on the touch input detecting region 4 of the character keys 21–32 and detect whether the regions are subjected to the pen input touch of the touch input means 71.

In particular, the input judging means 72, after the character keys 21–32 are touched by the pen, is to judge the striking actions within a special length and the draw-line touch action moved above a special length.

As shown in FIGS. 25(A) and (B), when the character keys 21–32 are touched by the pen and the draw-line touch in any one direction (left-up direction 101, up direction 102, right-up direction 103, left-down direction 106, down direction 107, right-down direction 108, total 6 directions) is performed, the input judging means 72 would judge the moving directions of the draw-line touch actions.

That is, on the character keys 21–26 and 28 marked with numbers and 3 English alphabets, the up portions of the center positions (reference positions) are numbers, and the left-down portions, down portions and right-down portions are English alphabets. Therefore, as shown in FIG. 25(A), when the moving direction of the draw-line touch on the character keys 21–26 and 28 is up direction 102, the numbers can be input; when the moving direction of the draw-line touch is left-down direction 106, the English alphabets on the left-down portion can be input (English 1); when the moving direction of the draw-line touch is down direction 107, the English alphabets on the down portion can be input (English 2); and when the moving direction of the draw-line touch is right-down direction 108, the English alphabets on the left-down portion can be input (English 3).

On the character keys 27 and 29 marked with numbers and 4 English alphabets, for the center positions of the key surfaces of reference positions of the character keys 21–32, the left-up portions are numbers, and the left-down portions, down portions, right-down portions and right-up portions are English alphabets. As shown in FIG. 25(B), if the moving direction of the draw-line touch on the character keys 27 and 29 is left-up direction 101, the numbers can be input; when the moving direction of the draw-line touch is left-down direction 106, the English alphabets on the left portion can be input (English 1); when the moving direction of the draw-line touch is down direction 107, the English alphabets on the down portion can be input (English 2); when the moving direction of the draw-line touch is right-down direction 108, the English alphabets on the right-down portion can be input (English 3); and when the moving direction of the draw-line touch is right-up direction 103, the English alphabets on the right-up portion can be input (English 4).

If the moving direction of the draw-line touch on the character keys 21 and 30–32 is up direction 102, numbers and symbols ⌈1⌋, ⌈*⌋, ⌈0⌋ and ⌈#⌋ marked on the up portions of the center positions (reference positions) of the character keys can be input respectively.

As shown in FIG. 25, after the character keys 21–32 are touched by a pen tip, the draw-line touch action in any one direction (left-up direction 101, up direction 102, right-up direction 103, left-down direction 106, down direction 107, right-down direction 108, total 6 directions) is performed, and the input judging means 72 would judge the moving directions 101–108 of the draw-line touch actions.

In this draw-line touch input as shown in the figure, taking the character key 22 as an example, the pen touches that character key, and moves along a route 109 beginning with a touch point (A), crosses the region of the character key 22 to reach a end point (B), and then is raised off the keyboard piece 5C. At this time, the input judging means 72 can detect the character key 22 corresponding to the starting point (A), and as shown by a arrow 110 in the figure, judge the moving direction from the starting point (A) to the end point (B) as the right-down direction 108. In this case, the moving direction can be judged only by the starting point (A) and the end point (B), and is not limited by the route 109. The directions other than the right-down direction 108 can be judged in accordance with the same method, and thus the characters in various directions are input.

The method that the moving direction is judged through the starting point (A) and the end point (B), is not particularly limited, for example, if the angle of the up direction 102 is seen from the starting point (A) to be 0° (or 360°), the moving direction is judged as the up direction 102, as long as the end point (B) is seen from the starting point (A) to be in 45° range of 22.5–°337.5°. If the moving direction is in the angle range of 112.5°–157.5°, it is judged as the right-down direction 108. That is, what needed is to judge whether the moving direction is in 8 angle ranges of 45°.

On the other hand, the character selecting and outputting means 73, on the base of the result judged by the input judging means 72, selects the characters displayed in the moving directions 101–108 of the draw-line touch input on the surfaces of the character keys 21–32, and the selected characters are finally displayed on the liquid crystal screen 3.

Figure 27:
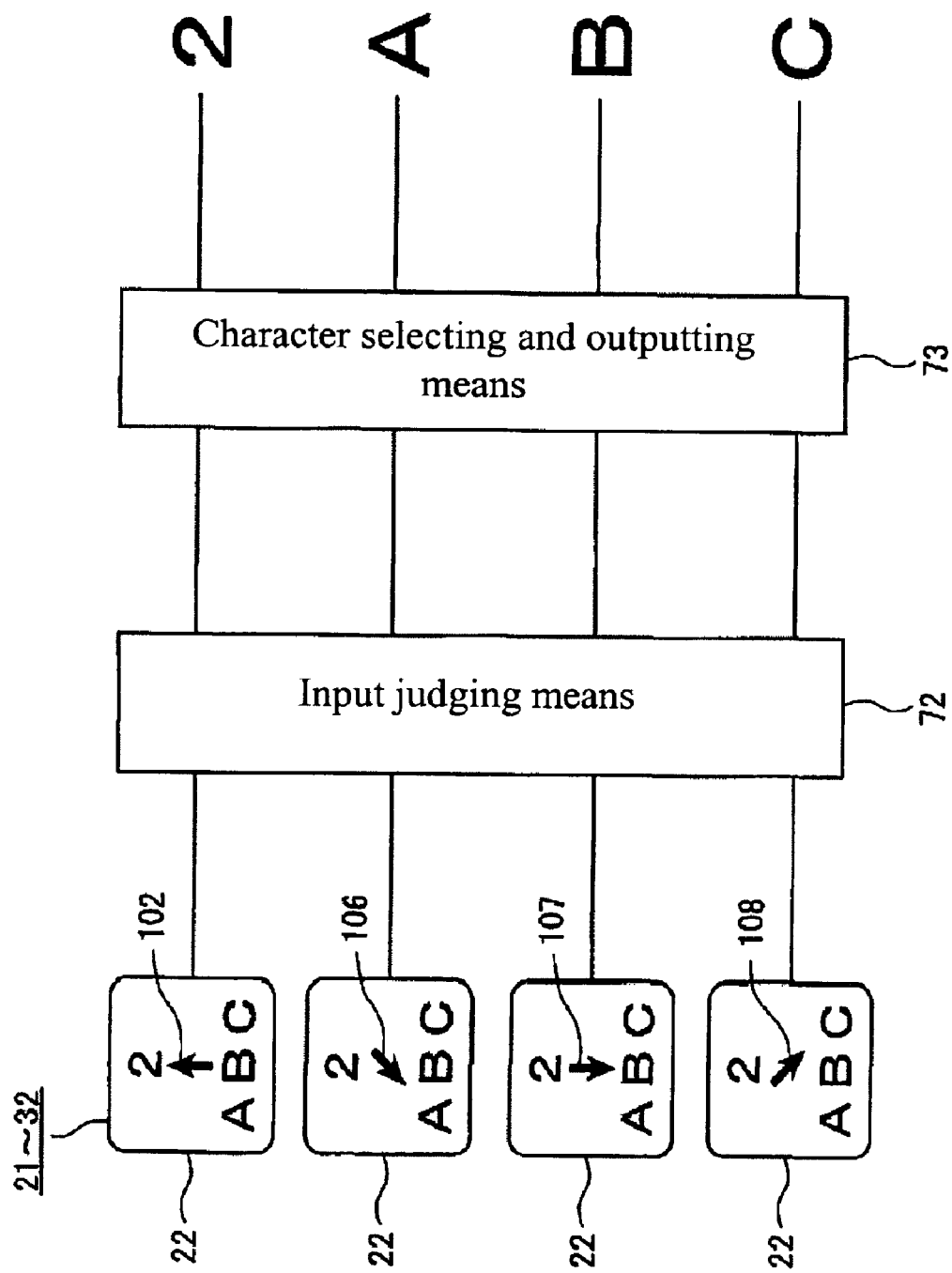
FIG. 27 is a schematic diagram of the draw-line touch input in the preceding fifth embodiment.

FIG. 27 shows more particularly the principle of the draw-line touch input, that is, once the character key 22 is touched, the input judging means 72 will first detects the touch to the character key 22 by a pen, and if the pen moves along the up direction 102 of the character key 22, the input judging means 72 judges that the moving direction has moved to the up direction 102. Then, the character selecting and outputting means 73 selects and outputs the number [2] responding to the judged moving direction 102, and thus the number [2] is displayed on the liquid crystal screen 3.

Again, when the pen moves to the left-down direction 106, the character [A] can be selected and output. When the pen moves to the down direction 107, the character [B] can be selected and output, and when the pen moves to the right-down direction 108, the character [8] can also be selected and output.

Figure 28:
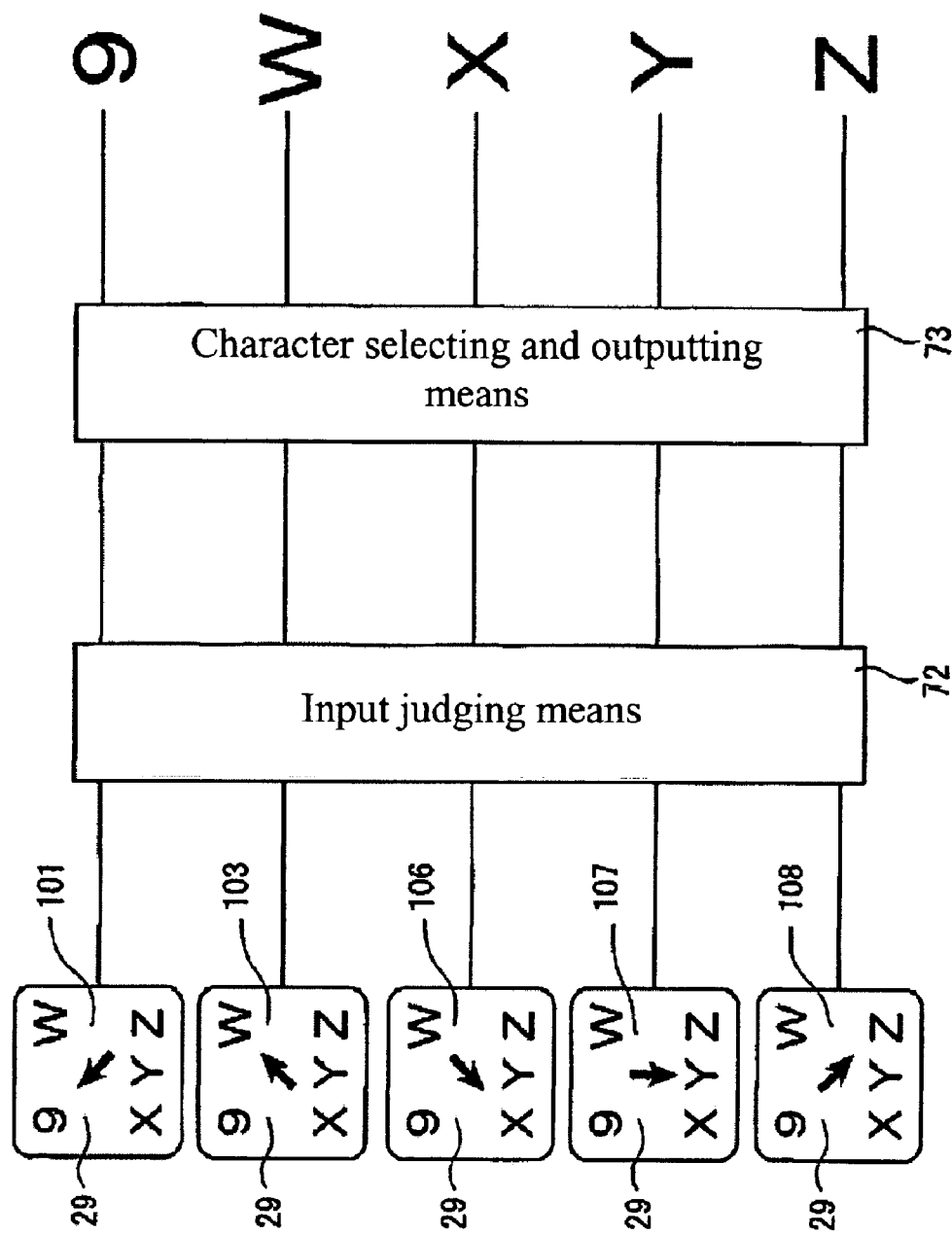
FIG. 28 is a schematic diagram of the draw-line touch input in the preceding fifth embodiment.

As shown in FIG. 28, once the character key 29 is touched, the input judging means 72 will first detects the touch to the character key 29 by a pen, and if the pen moves along the left-up direction 101 of the character key 29, the input judging means 72 judges that the moving direction has moved to the left-up direction 101. Then, the character selecting and outputting means 73 selects and outputs the number [9] responding to the judged moving direction 101, and thus the number [9] is displayed on the liquid crystal screen 3.

Again, when the pen moves to the right-up direction 103, the character [W] can be selected and output. When the pen moves to the left-down direction 106, the character ∃X] can be selected and output; when the pen moves to the down direction 107, the character [Y] can be selected and output; and when the pen moves to the right-down direction 108, the character [Z] can be selected and output.

The fifth embodiment described above can obtain the following effects:

(5-1) The input judging means 72 can judge the moving directions 101–108 on the character keys 21–32 in draw-line touch inputting. The character selecting and outputting means 73 selects and outputs the characters displayed in the moving directions 101–108 of the character keys 21–32. Because the characters marked on the character keys 21–32 corresponds to the moving directions of the draw-line touch input each other, in order to input a certain character, what needed is to perform the draw-line touch input of the corresponding directions. The input operation is sensible, easy to grasp, and has a high input efficiency. Further, the characters marked on the character keys 21–32 can be seen at a glance, and the characters can be input conveniently and quickly.

(5-2) Although there are very few character keys, 12 character keys 21–32, thereon total 38 characters of the 26 English alphabets used by Japanese Roman letter input and English input, the 10 numbers 0–9 used by various serious numbers, [#] and the second symbol can be set. Therefore, the characters, which can be input, are as more as those by a common keyboard, and the operation is simple, the characters can be input conveniently and quickly.

(5-3) Every character key 21–32 can set 5 characters at most, and the number of the press keys is reduced greatly comparing with the original [soft keyboard input] in which one key corresponds to one character, so that the portability is completely assured. Further, the volumes of the character keys 21–32 can be increased correspondingly because of the reduction of the number of the character keys 21–32, and the reduction of the number of the character keys 21–32 also shortens the movement distance in operating on the keyboard to make the input efficiency higher.

Particularly in the case in which a small portable machine etc. is used, the size of the keyboard 5C fails to be big, but the touch input can be performed easily by means of a pen or the like because the number of the keys is low and the keys can be made bigger.

(5-4) When the Japanese input is set to be the Roman letter input mode, comparing with the general kana input manner, only 26 English alphabets are needed to be set and the positions of the remaining press keys can be set.

(5-5) Since the area of each character key 21–32 can be increased, the users can easily distinguish every moving direction 101–108 when performing draw-line touch input, therefore the user can correctly select the characters wanted to be input, and the input efficiency is high. Further, the increase of the areas of character keys 21–32 also makes the scopes of the moving directions judged by the input judging means 72 bigger, so as to improve the judging accuracy of the directions.

(5-6) The keyboard 5C is pasted on the touch input detecting area 4, and can be used as a usual keyboard as long as the proper setting to the input judging means 72 is carried out, thereby the character input is simple and easy to learn. Further, the keyboard 5C can be removed simply, therefore the input method can be changed into the hand writing input according to requirements when it is desired that the characters or figures are input by use of the hand writing input manner. It can be seen that the different methods can be used at the same time.

(5-7) Since the 6 moving directions 101–103 and 106–108 can be judged and the characters needed to be input are set on the character keys 21–32 in advance, the characters, such as letters, symbols, numbers and so on, can be input in the draw-line touch input manner through one time touch without the need for performing input mode conversion, and the inputting has a rapid speed and a high efficiency.

(5-8) The moving directions are set in 6 directions of left-up direction 101, up direction 102, right-up direction 103, left-down direction 106, down direction 107 and right-down direction 108, and the intervals among the directions are equal, thus the judging errors of the input judging means 72 can be reduced. In addition, the sense is harmonious, and the inputting is easy and has a high efficiency.

(5-9) Comparing with the general [hand writing input], it is not necessary to judge all the stroke loci, thus the input efficiency is improved and the quick and long time continual input can be performed.

(5-10) The marks marked on the character keys 21–32 are set in accordance with the order of character (English alphabets) on down portion, and numbers on up portion, thus the configuration and position relations of the characters and numbers are simple and clear, and easy to be distinguished and operated.

(5-11) The arrangement order of the English alphabets used by Roman letter inputting is [A, B, C, . . . Z], thus it is easy to grasp the arrangement conditions of the press keys, and the operation is convenient.

Particularly, the arrangement order of the numbers and English alphabets on the character keys 21–32 are same as and similar to that now widely used by the portable telephone sets, and if the touch press key input device 1 of the invention is used to a portable telephone set, the character configuration is grasped easily by the user and the input operation is convenient.

(5-11) Because the setting does not relate to the input mode, the input efficiency is higher where the English alphabets and numbers can be input.

[Embodiment 6]

The sixth embodiment of the invention is introduced below in conjunction with FIGS. 29 and 30.

In the present embodiment, the constituent parts as same as or similar to those of the fifth embodiment are shown by same reference numbers. The description of the same parts or similar parts can be omitted or described briefly.

Figure 29:
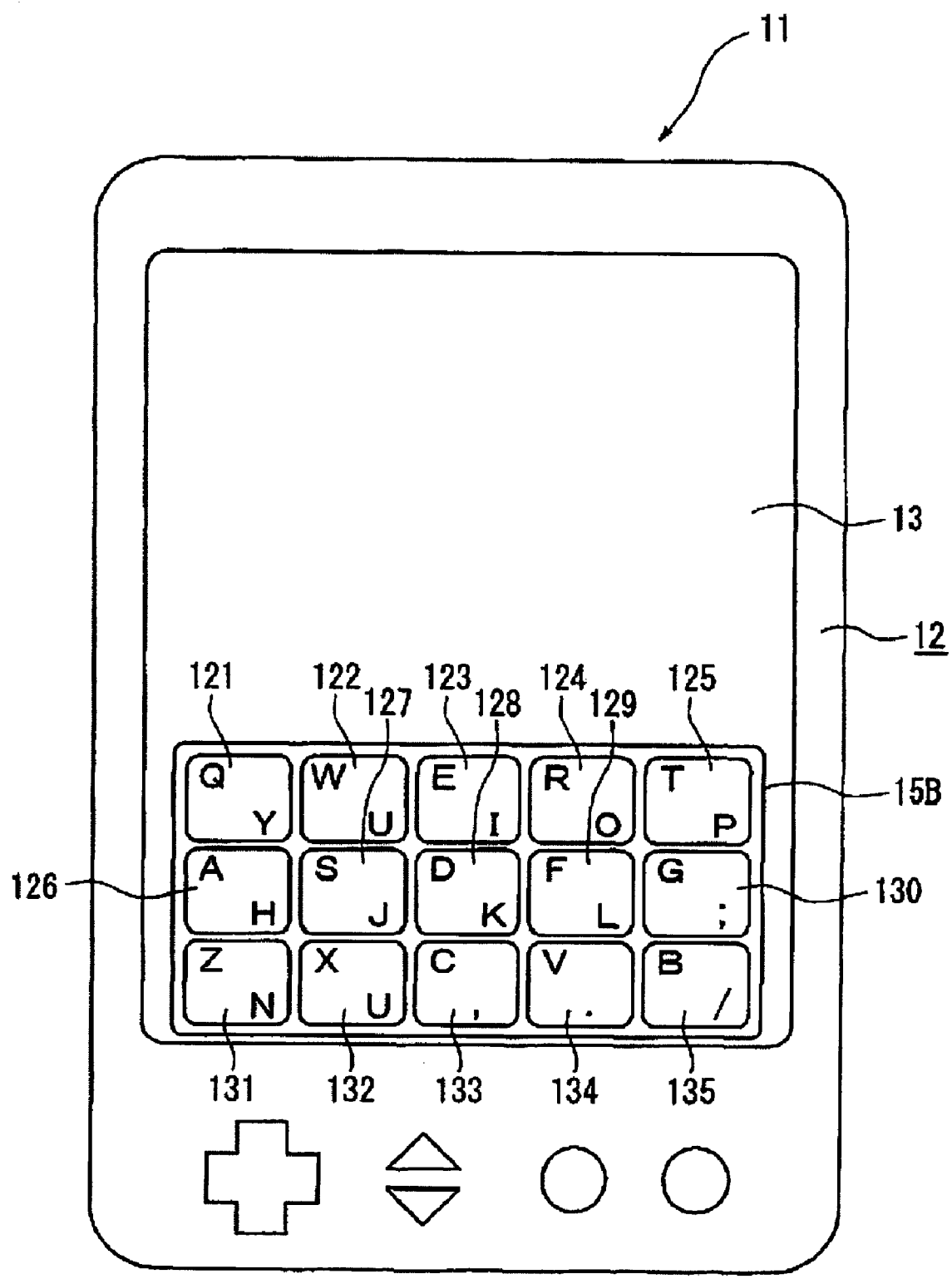
FIG. 29 is a plan view of a touch press key input device in a sixth embodiment of the invention.

As shown in FIG. 29, a touch press key input device 11 of the sixth embodiment of the invention is a personal digital assistant (PDA), and the surface of the body 12 is provided with a liquid crystal screen 13.

The touch press key input device 11 is same as that of the preceding embodiments, and is attached with a pen for the draw-line touch input.

The liquid crystal screen 13, same as the preceding liquid crystal screen 3, is used to display characters and the like, and display a soft keyboard 15B.

The liquid crystal screen 13 is wholly used as the preceding touch input detecting region.

That is, comparing to the keyboard piece 5C used by the fifth embodiment, the soft keyboard 15B displayed on the liquid crystal screen 13 is employed by the sixth embodiment.

Total 15 character keys 121–135 in 3 left and right rows and 5 columns are contained on the soft keyboard 15B, and the character keys 121–135 are provided with English alphabets in accordance with so called QWERTY manner used by general keyboard.

That is, the left-up portions of the first row of character keys 121–125 are provided with [Q], [W], [E], [R] and [T] respectively, and the right-down portions are provided with [Y], [U], [I], [O] and [P] respectively, thereby the order of those English alphabet actually are the order of the letters in first row of the general QWERTY keys.

The left-up portions of the second row of character keys 126–130 are provided with [A], [S], [D], [F] and [G] respectively, and the right-down portions are provided with [H], [J], [K], [L] and [; (semicolon)] respectively, thereby this actually is the configuration manner of the second row of the general QWERTY keyboard.

The left-up portions of the third row of character keys 131–135 are provided with [Z], [X], [C], [V] and [B] respectively, and the right-down portions are provided with [N], [M], [, (comma)], [. (period)] and [/(slope dash)] respectively, thereby this actually is the configuration manner of the third row of the general QWERTY keyboard.

The touch press key input device 11 is same as that of the preceding fifth embodiment, and the touch input means 71, the input judging means 72 and the character selecting and outputting means 73 are employed. The judging methods of the different input operations is also same as that of the preceding embodiments, and the draw-line input is employed by the input method.

That is, 2 characters are set on the character keys 121–135 respectively, and are set on the left-up portions and right-down portions of the center positions (the reference positions) of the surfaces of the press keys.

Figure 30:
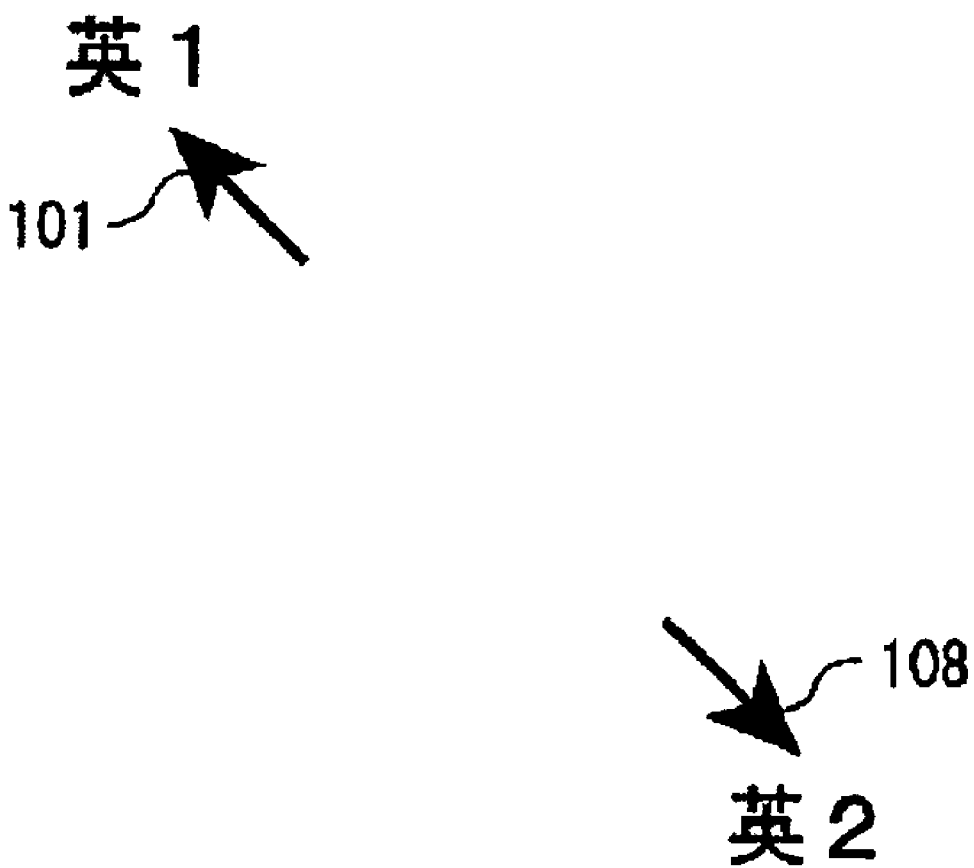
FIG. 30 is a schematic diagram of the input operation in the preceding sixth embodiment.

As shown in FIG. 30, these left-up portions and right-down portions corresponds to the two moving directions (the left-up direction 101 and the right-down direction 108) the draw-line input described latter, and the characters in the moving directions can be input responding to the moving directions.

Exempt for the fact that the moving directions to be judged have only 2 directions 101 and 108, the other functions of the input judging means 72 are substantially same as those of the first embodiment.

The functions of the character selecting and outputting means 73 are same as those of the first embodiment, that is, when the draw-line input is performed, the characters in the directions 101 and 108 of the surfaces of the character keys 121–135 can be selected, and displayed out through the liquid crystal screen 3.

Besides the effects (5-1), (5-3)-(5-5), (5-7) and (5-9) of the fifth embodiment, the sixth embodiment described above has following characteristics.

(5-13) The directions able to be judged are set only in 2 directions of the left-up direction 101 and the right-down direction 108, and the directions can be distinguished easily and clearly in the input operations, thereby the error judgments of the input judging means 72 can be reduced.

(5-14) The surfaces of the character keys 21–32 are divided into 2 parts, and 2 moving directions of 101 and 108 of the draw-line touch actions can be judged, thus comparing with 6 directions, the judging scope is increased to reduce the deviations occurred when the operator moves, and accurately judging the moving directions, and the input efficiency is high.

(5-15) The character keys 121–135 on the soft keyboard 15B are displayed on the liquid crystal screen 13, and the soft keyboard 15B does not appear when it is not needed, so that the viewable scope of the liquid crystal screen 13 can be increased. Particularly when web pages, figures, tables and the like of Internet are browsed, the increased display scope further facilitates the browsing.

(5-16) Only 2 characters are set on the character keys 121–135 so as to reduce the areas of the character keys 121–135, so that the occupied spaces of the soft keyboard 15B on the liquid crystal screen 13 are increased, and the liquid crystal screen 13 is made to have bigger space for displaying the other figures, tables and the like on, so as to facilitate the browsing.

(5-17) This arrangement manner of the press keys is that English alphabets and symbols are set on the 15 character keys 121–135 in the order of the QWERTY configuration which has been accustomed to be widely used, and for the persons who have been accustomed to use the QWERTY configuration, the arrangement of the press keys is easy to remember, and they can be used immediately.

Because only 15 character keys 121–135 are set, and the number of the press keys is much less than that of the general keyboard, thereby they can be set into a small portable machine.

[Embodiment 7]

Figure 31:
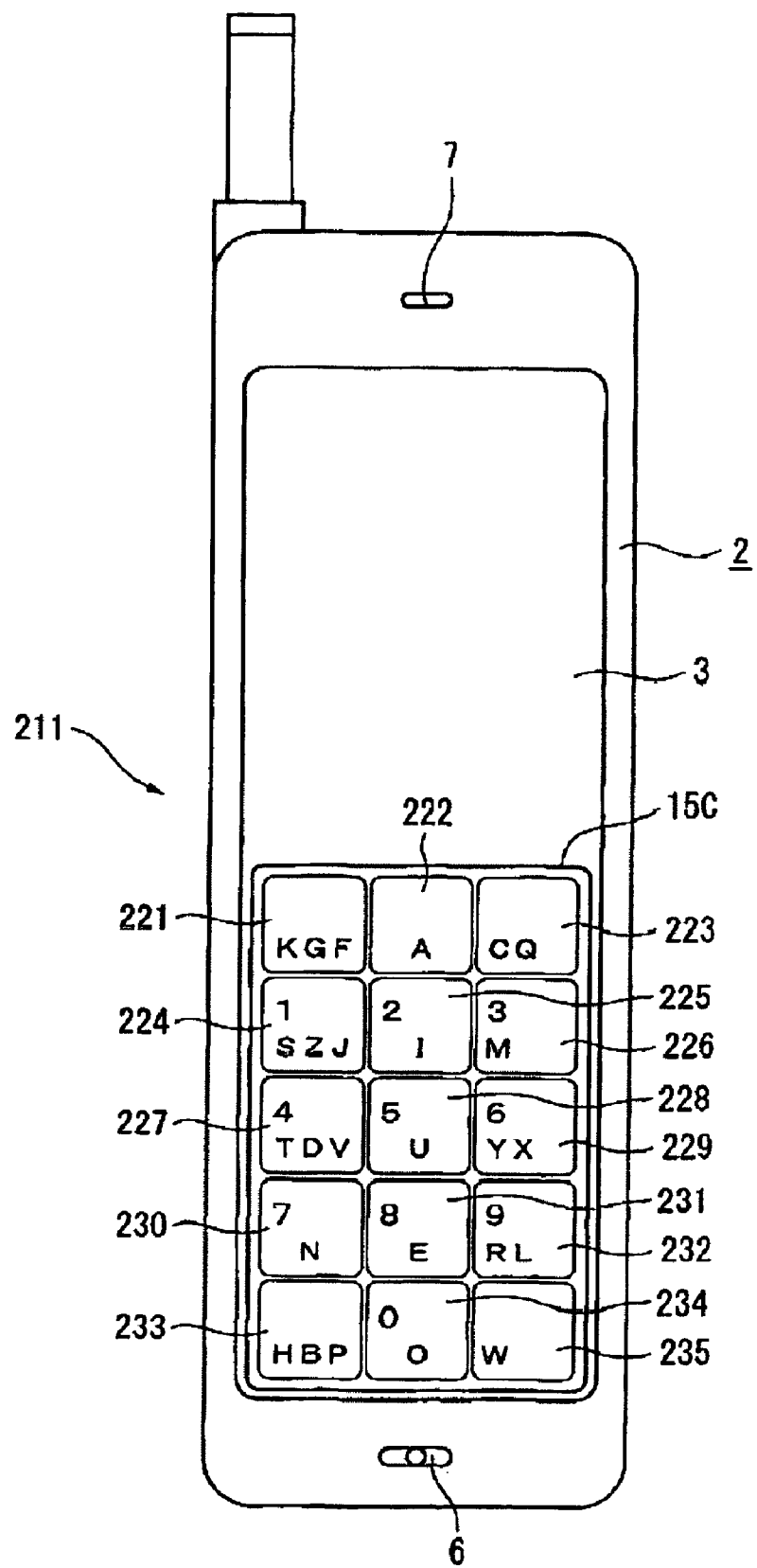
FIG. 31 is a plan view of a touch press key input device in a seventh embodiment of the invention.

The seventh embodiment of the invention is introduced below in conjunction with FIGS. 31 and 32.

In the present embodiment, the constituent parts as same as or similar to those of the preceding embodiments are shown by same reference numbers. The description of the same parts or similar parts can be omitted or described briefly.

Comparing the seventh embodiment with the fifth embodiment, the same points are in the fact that they can equally be used to a portable telephone set, and the different points are in the fact that the English alphabets on the character keys are configured differently.

In addition, the present embodiment, same as the sixth embodiment, employs a soft keyboard 15C displayed on the liquid crystal screen, and the keyboard, same as in the fifth embodiment, is pasted on a touch input detecting region 4.

Total 15 character keys 221–235 in 3 left and right rows and 5 columns are contained on the touch input press key input device 211 of the seventh embodiment.

In these character keys, the left-up portions of the surfaces of 10 press keys 224–232 and 234 (in the left-up direction of the center positions (reference positions) of the surfaces of the press keys) are provided with 10 numbers [1, 2, 3, 4, 5, 6, 7, 8, 9 and 0] respectively.

In addition, the down portions of the center positions of the surfaces of the character keys in middle column are provided with 5 letters [A, I, U, E and O] for Japanese Roman letter input respectively.

The character keys 221, 224, 227 and 233 in left column are configured in the manner of 3 English alphabets on each key, that is, 3 English alphabets are configured in the left-down direction, down direction and right-down direction of the center position of the surface of every character key. Speaking particularly, [KGF] is configured on the character key 221, [SZJ] on the character key 224, [TDV] on the character key 227, and [HBP] on the character key 223.

[N] is configured in the down direction of the center of the surface of character key 230.

The character keys 223, 229 and 232 in right column are configured in the manner of 2 English alphabets on each key, that is, 2 English alphabets are configured in the left-down direction and down direction of the center position of the surface of every character key. Speaking particularly, [CQ] is configured on the character key 223, [YX] on the character key 229, and [RL] on the character key 232.

[M] and [N] are configured on the down portions of the centers of the surfaces of the character key 226 and 235.

This configuration manner mainly facilitates the input of the Japanese Roman letters. The input of kana in the rows [か]-[わ] by use of the input method of Japanese Roman letters needs the combination of the vowels with consonants, the vowels are located in the middle column, and the consonants [K, S, T, N, H, M, Y, R and W] are set on both sides of the vowels and arranged in the order of from up to left (i.e. from the character key 221 on the left-up portion to the character key 233 on the left-down portion and from the character key 226 on the right-up portion to the character key 235 on the right-down portion), thereby facilitating the input of the vowels and consonants in combination.

The consonants [G, Z, D and B] for inputting voiced sounds [が row, ざ row, だ row and ば row] and consonants [K, S, T and H] for inputting voiceless sounds in close relation with the voiced sounds are set on the character keys 221, 224, 227 and 233, thereby the input operations of the voiced sounds can be remembered easily.

In addition, the consonants [P] for inputting half-voiced sounds in [ぱ row] and consonants [H] for inputting voiceless sounds in close relation with the voiced sounds are set on the character key 223.

The internal structure of the touch press key device 211 is same as that of the preceding fifth embodiment, and for both the touch input means 71, the input judging means 72 and the character selecting and outputting means 73 are employed (reference to FIG. 24).

Figure 32:
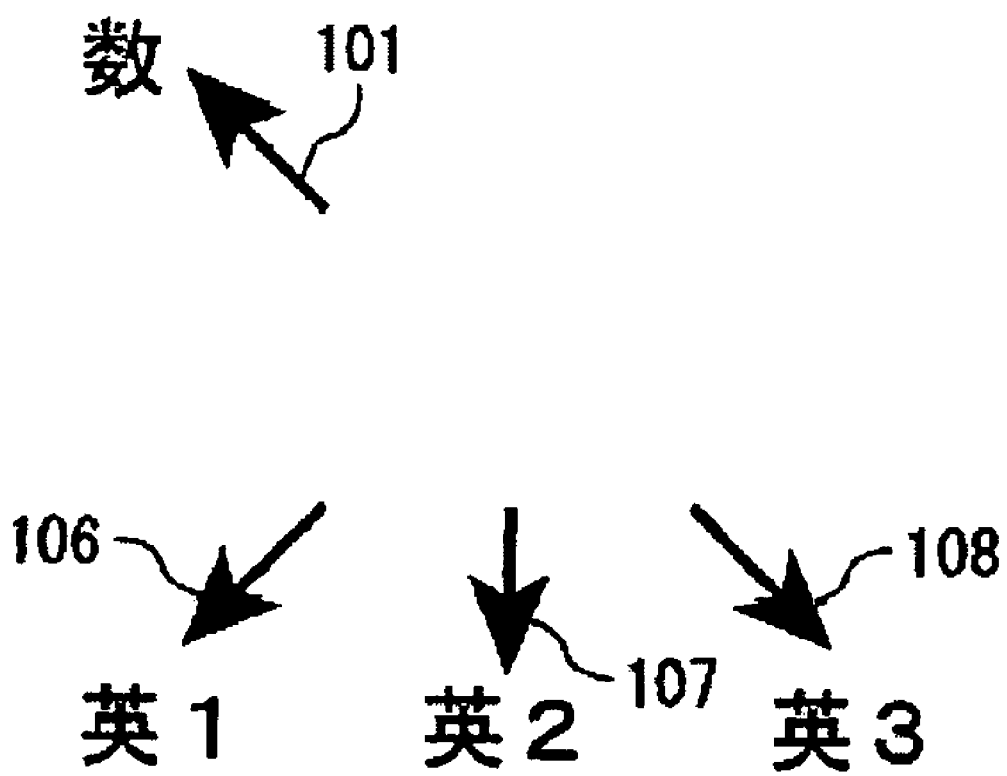
FIG. 32 is a schematic diagram of the input operation in the preceding seventh embodiment.

As shown in FIG. 32, 4 directions of the draw-line inputs are employed by the character input method.

That is, the numbers can be input by performing the draw-line input in left-up directions 101 on the character keys 224–232 and 234 set with numbers.

If the draw-line touches in the left-down direction 106, the down direction 107 and the right-down direction 108 are performed on the character keys 221–235 are performed, the English alphabets at respective positions of the character keys 221–235 (that is, the first English alphabet is in the left-down direction, the second English alphabet is in the down direction, and the third English alphabet is in the right-down direction).

Besides the all effects of the preceding embodiments, the seventh embodiment described above further has following characteristics.

(5-18) The 5 vowels [A], [I], [U], [E] and [O] used frequently in both Japanese and English are set on 5 character keys 222, 225, 228 231 and 234 individually, the input efficiency is high. That is, one letter (vowel) is set on each of 5 character keys 222, 225, 228, 231 and 234, only the vowels are input irrespective of the touched places of the character keys (the down direction, the left-down direction or the right-down direction). Since the input efficiency of the vowels used frequently is improved, this corresponds to the improvement of the whole efficiency.

(5-19) The 5 vowels [A], [I], [U], [E] and [O] are set on the 5 character keys 222, 225, 228, 231 and 234 in middle column from the first row to the fifth row individually, and the positions of the press keys of the vowels is easy to remember and convenient to be operated. That is, in the middle part of the keyboard, the letters are arranged in the order of [AIUEO (あ い う え お)] from up to down, thereby the arrangement of the press keys is easy to distinguish and the operation is easy.

Next, because the Roman letters are input only by the combination of the vowels and consonants, and the press keys of the consonants are arranged on the two left and right columns of the press keys of the vowels, the moving distances of the pen in alternatively touching vowels and consonants is shortened, and the input efficiency is improved.

(5-20) Since the English alphabet [K] for inputting [か] row and the English alphabet [G] for inputting [が] row are set on same press key 221; the English alphabet [S] for inputting [さ] row and the English alphabet [Z] for inputting [ざ] row are set on same press key 224; the English alphabet [T] for inputting [た] row and the English alphabet [D] for inputting [だ] row are set on same press key 227; and the English alphabet [H] for inputting [は] row and the English alphabet [B and P] for inputting [ば] and [ぱ] rows are set on same press key 233, when Roman letters are input, the related voiceless sounds, voiced sounds and half voiced sound can be input as long as the touch position is slightly changed. It can be seen that the positions of the function keys for voiced sounds and half voiced sounds are easy to grasp and need not to remember particularly, and that the input speed is quick.

[Embodiment 8]

Figure 33:
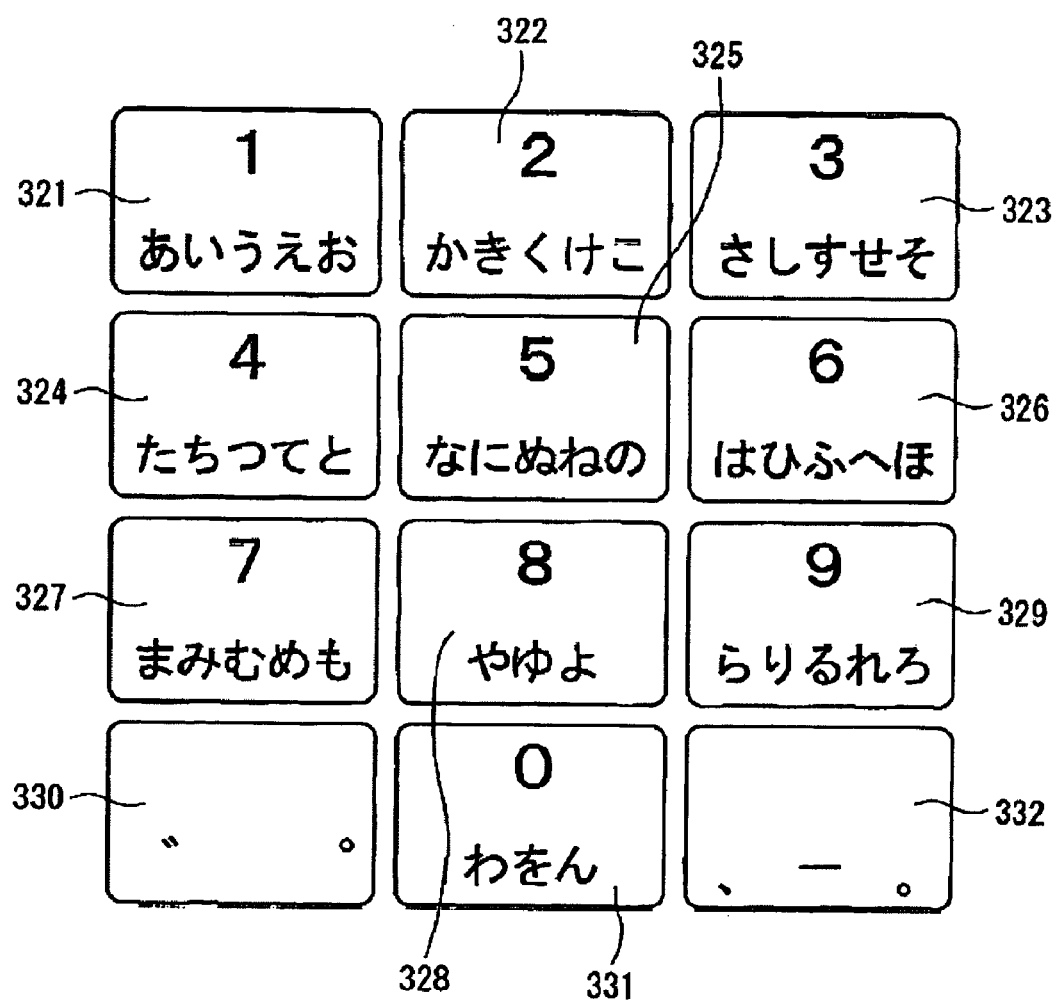
FIG. 33 is a plan view of press keys of a touch press key input device in an eighth embodiment of the invention.

The eighth embodiment of the invention is introduced below in conjunction with FIGS. 33 and 34.

In the present embodiment, the constituent parts as same as or similar to those of the preceding embodiments are shown by same reference numbers. The description of the same parts or similar parts can be omitted or described briefly.

In the preceding embodiments, only English alphabets are marked on the character keys. However, in the present embodiment, the press key configuration is shown in FIG. 33, and only kana (hiragana) is marked on the character keys 321–332, but the draw-line input can be input likewise.

That is, the numbers are marked in up directions of the center positions (reference positions) of the character keys 321–332, the down portions of the center positions are marked with 3–5 kana, and the kana are set on the character keys 321–332 and 331 in the order of [か row, さ row, た row, な row, は row, ば row, ま row, や row, ら row, わ row].

Figure 34:
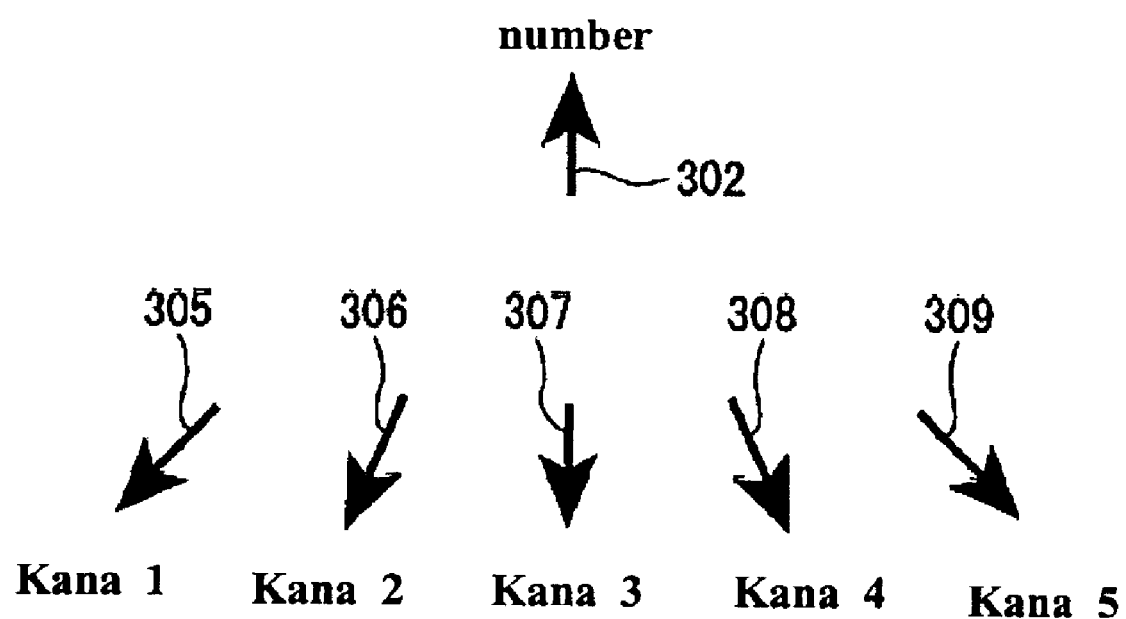
FIG. 34 is a schematic diagram of the input operation in the eighth embodiment.

As shown in FIG. 34, if the draw-line touch in the up direction 302 is performed on the character keys 321–329 and 331, the numbers can be input. If the draw-line touches in the other direction 305–309 (the left-down direction 305, the down direction 307, the second left-down 306 between the right-down direction 309 and the down direction 307, and the second right-down 308 between the right-down direction 309 and the down direction 307) are performed on the character keys 321–329 and 331, the kana at corresponding positions can be input.

If the draw-line touch in the left-down direction 305 is performed on the character key 330, the 「"(voiced sound point)」 can be input, and if the draw-line touch in the right-down direction 309 is performed, 「°" (half voiced sound point)」 can be input.

If the draw-line touch in the left-down direction 305 is performed on the character key 332, the 「丶 (slight pause mark)」 can be input, if the draw-line touch in the down direction 307 is performed, 「–(long sound)」 can be input, and if the draw-line touch in the down direction 309 is performed, 「–(long sound)」 can be input.

Besides the all effects of all the preceding embodiments, the eighth embodiment described above further has following characteristics.

(5-21) Since kana marked on the character keys 321–332 can be input only by needing one time of touch, this can be understood easily and the input speed of Japanese is quick. That is, when the Roman letters are input in other embodiments, in order to input kana other than vowels, two letters of vowel and consonant are must input, and the input efficiency is improved greatly.

(5-22) In addition, since the kana arrangement on the press keys corresponds to the Japanese letter table, the user can easily grasp the positions of the characters, and the operation is convenient and the input efficiency is high.

[Embodiment 9]

Figure 39:
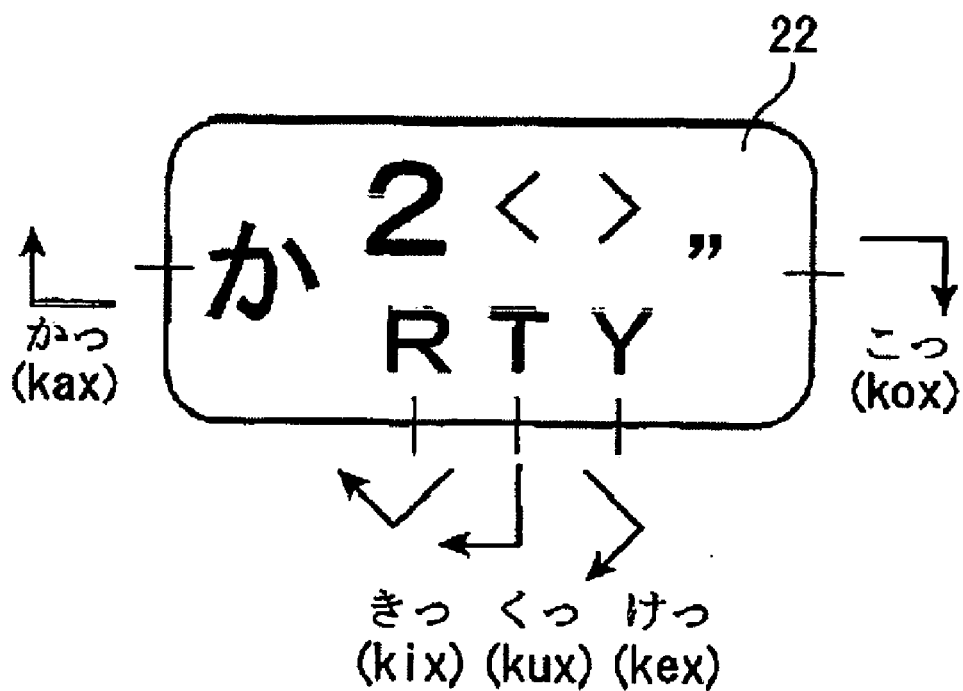
FIG. 39 is an example of the right-curved draw-line touch input in the ninth embodiment.

The ninth embodiment of the invention is introduced below in conjunction with FIGS. 35 and 39. In the present embodiment, the constituent parts as same as or similar to those of the preceding embodiments are shown by same reference numbers. The description of the same parts or similar parts can be omitted or described briefly.

Figure 37:
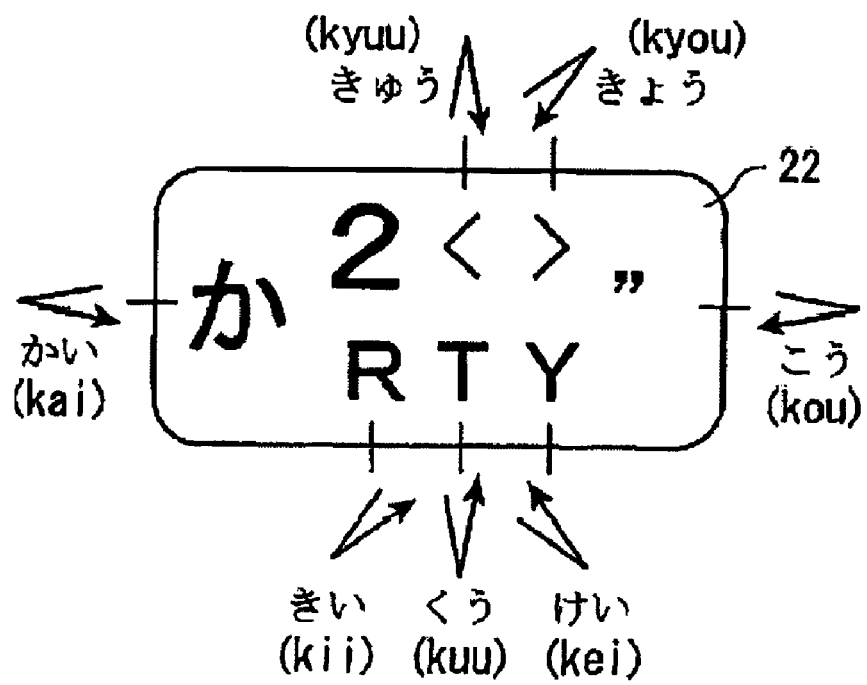
FIG. 37 is an example of the reciprocating draw-line touch input in the ninth embodiment.
Figure 38:
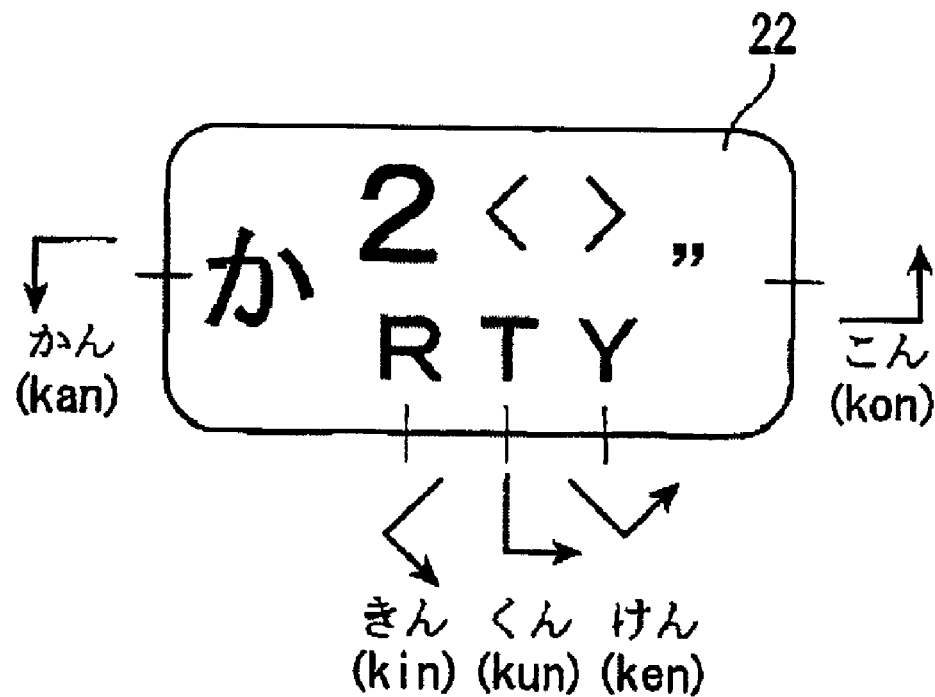
FIG. 38 is an example of the left-curved draw-line touch input in the ninth embodiment.

In the present embodiment, it is not only limited to the draw-line touch input in one direction (the moving direction of the pen) (reference to FIG. 36), further the reciprocating draw-line touch input (reference to FIG. 37), right curved draw-line touch input (reference to FIG. 38), left curved draw-line touch input (reference to FIG. 39) can be performed, the several manners can be used in combination, and in addition, the characters appeared frequently in Japanese input can also be set in advance and input by the specified draw-line touch action (special draw-line touch input).

Figure 35:
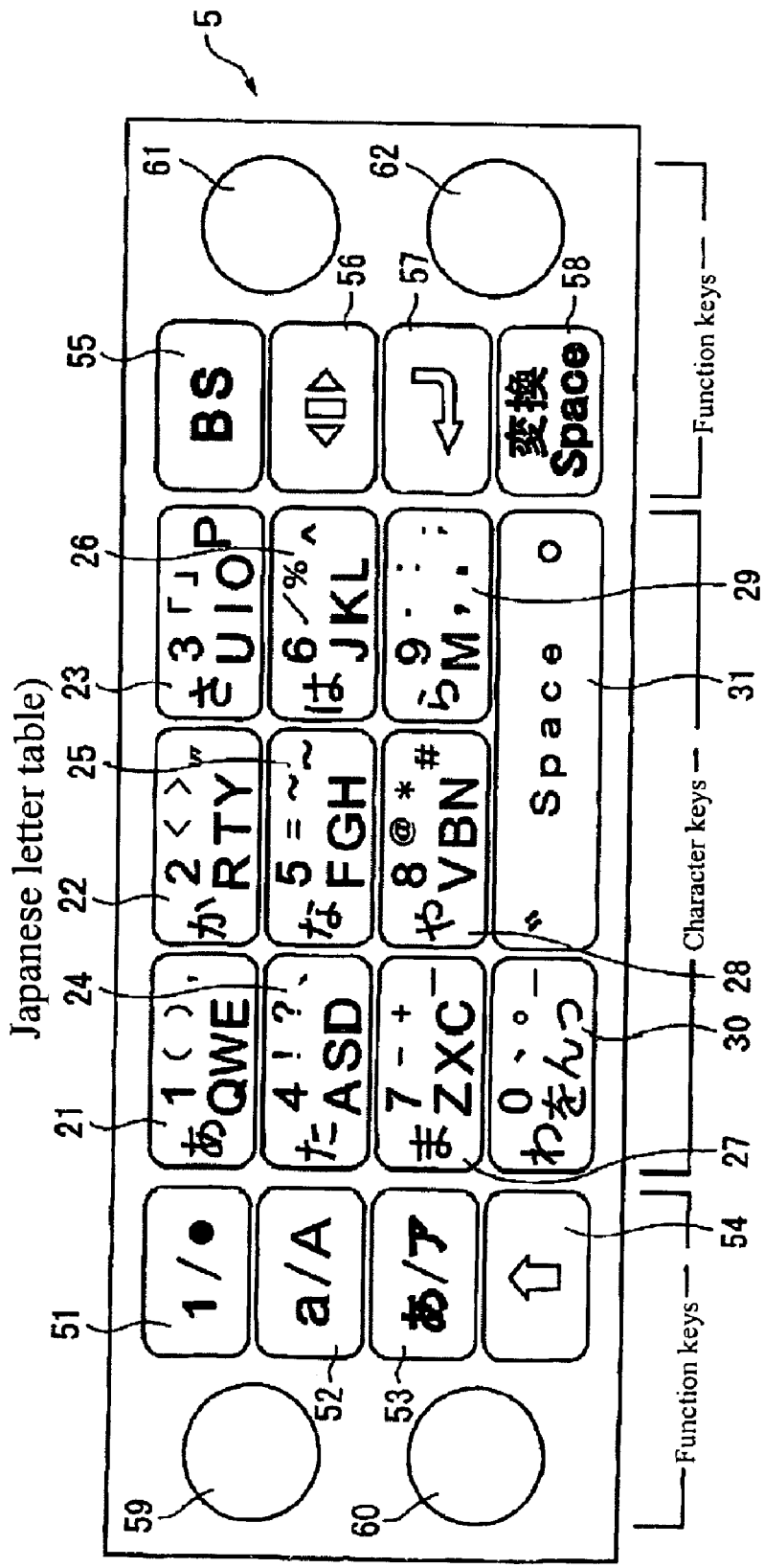
FIG. 35 is a plan view of a keyboard piece of a touch press key input device in a ninth embodiment of the invention.

By taking the keyboard piece 5 used by the touch press key input device 1 of the first embodiment as an example and combining the keyboard piece 5 [kana•QWE configurations] as shown in FIG. 35, the present embodiment is introduced particularly.

There are 11 character keys 21–31 and 12 function keys 51–62 on the keyboard piece 5. The function keys 51–62 include the functions of the conversion between input modes, Shift, Back Space and Return, and are same as those of the preceding embodiments.

50 kana arranged in the order of Japanese letter table and 26 English alphabets arranged in QWERTY as well as numbers and symbols are set on the character keys 21–31.

That is, [QWE], [RTY], [UIO], [ASD], [FGH], [JKL], [ZXC], [VBN] and [M] are set on the left-down, down and right-down positions of the character keys 21–29 respectively, and in the modes other than kana input modes, the draw-line touches in the left-down, down and right-down directions are performed on the character keys 21–29 so as to input these English alphabets and so on.

Likewise, numbers can be input by the draw-line touches in the left-up directions on the character keys 21–30, and the draw-line touches in the up, right-up and right directions are performed so as to input symbols marked on the corresponding positions.

Kana in 「わ」 column and in every row of Japanese letter table are set on the left portions of the character keys 21–30, that is, [わ, ザ, ダ, ヂ, ハ, バ, ま, ヽ, パ, わ].

Figure 36:
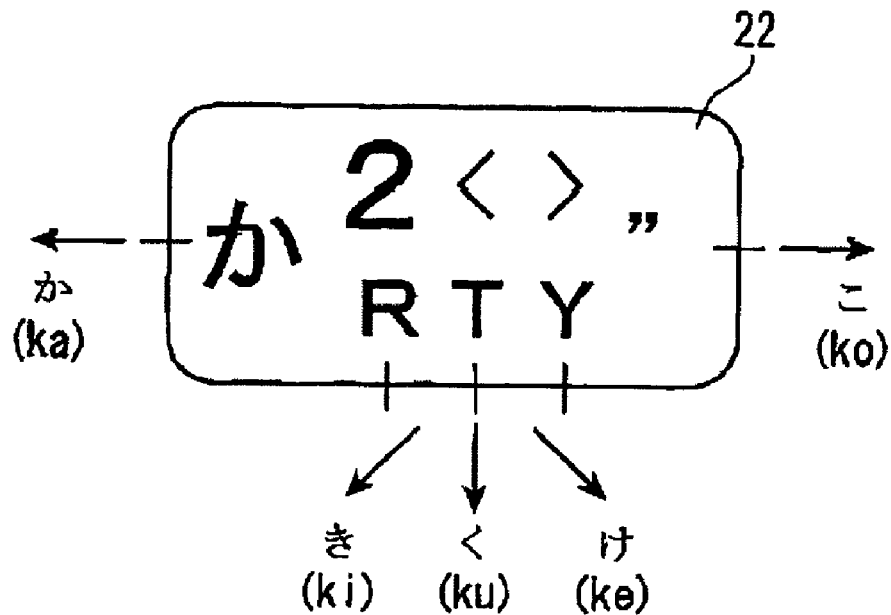
FIG. 36 is an example of the draw-line touch input in the ninth embodiment.

As shown in FIG. 36, if the input modes are converted into the kana modes, kana in 「ア」 column and in every row (such as ザ (ka) and so on]) can be input by performing the draw-line touch in the left direction, kana in 「イ」 column and in every row (such as [き (ki) and so on]) can be input by performing the draw-line touch in the left-down direction, kana in 「ウ」 column and in every row (such as 「く (ku) and so on]) can be input by performing the draw-line touch in the down direction, kana in 「エ」 column and in every row (such as け (ke) and so on]) can be input by performing the draw-line touch in the right-down direction, and kana in 「オ」 column and in every row (such as 「こ (ko) and so on]) can be input by performing the draw-line touch in the right direction.

That is, only the kana in わ column of Japanese letter table are marked on the character keys 21–29, but the kana from い column to お column are not directly marked, and the kana from い column to お column are set in advance. In addition, [わ], [き], [ん]and [つ] are set on the left, left-down, down, right-down portions respectively.

In the kana mode, if the draw-line touches in the left-up, up, down, right-up portions are performed, the numbers and symbols set at corresponding positions can be input.

By the character key 31, besides the space can be input, the voiced point [「"」 or the half voiced point [°」 can also be input if the draw-line touches in left direction or in right direction are performed.

Besides the effects same as those of the preceding embodiments can be obtained by the present embodiment, since the three kinds of high speed input methods (the reciprocating draw-line touch input, the right curved draw-line touch input and the left curved draw-line touch input) referenced above can be set, and the words appeared frequently can be input simply and quickly (such as sound reading kanji and phrases used frequently in Japanese articles), the quick input can be realized by the draw-line touch input and the input efficiency is improved greatly.

By use of the three kinds of special draw-line touch input methods (reciprocating, right curved and left curved), the proper words appeared frequently can be set in advance for various languages, for example, the long sounds, nose sound, urgent sounds, kana and Greek characters, Roman numbers, Latin characters and other characters of the countries over the world can be input in accordance with the types of the specified sentences set by the user in advance.

Besides the general press touch (パタッチ) input, if three kinds of special press touch inputs are employed, comparing with 1 kind of press touch input, 4 times of input changes can be realized. That is, when 96 characters are input from 8 directions by 12 character keys, by further setting 3 kinds of press touch inputs, 96×4=384 characters can be set and can also set to be capable of inputting characters of various countries over the world.

[Embodiment 10]

The tenth embodiment of the invention is illustrated below by reference to FIGS. 40–42. In the present embodiment, the constituent parts as same as or similar to those of the preceding embodiments are shown by same reference numbers. Here, the description of them can be omitted or described briefly.

In the preceding embodiments, the press touch input is performed on each of the character keys 21–32, but in the present embodiment, the structure is that besides the press touch input operations of such individual key, the input regions for collecting many character keys are set and the input is performed by use of the input regions.

Figure 40:
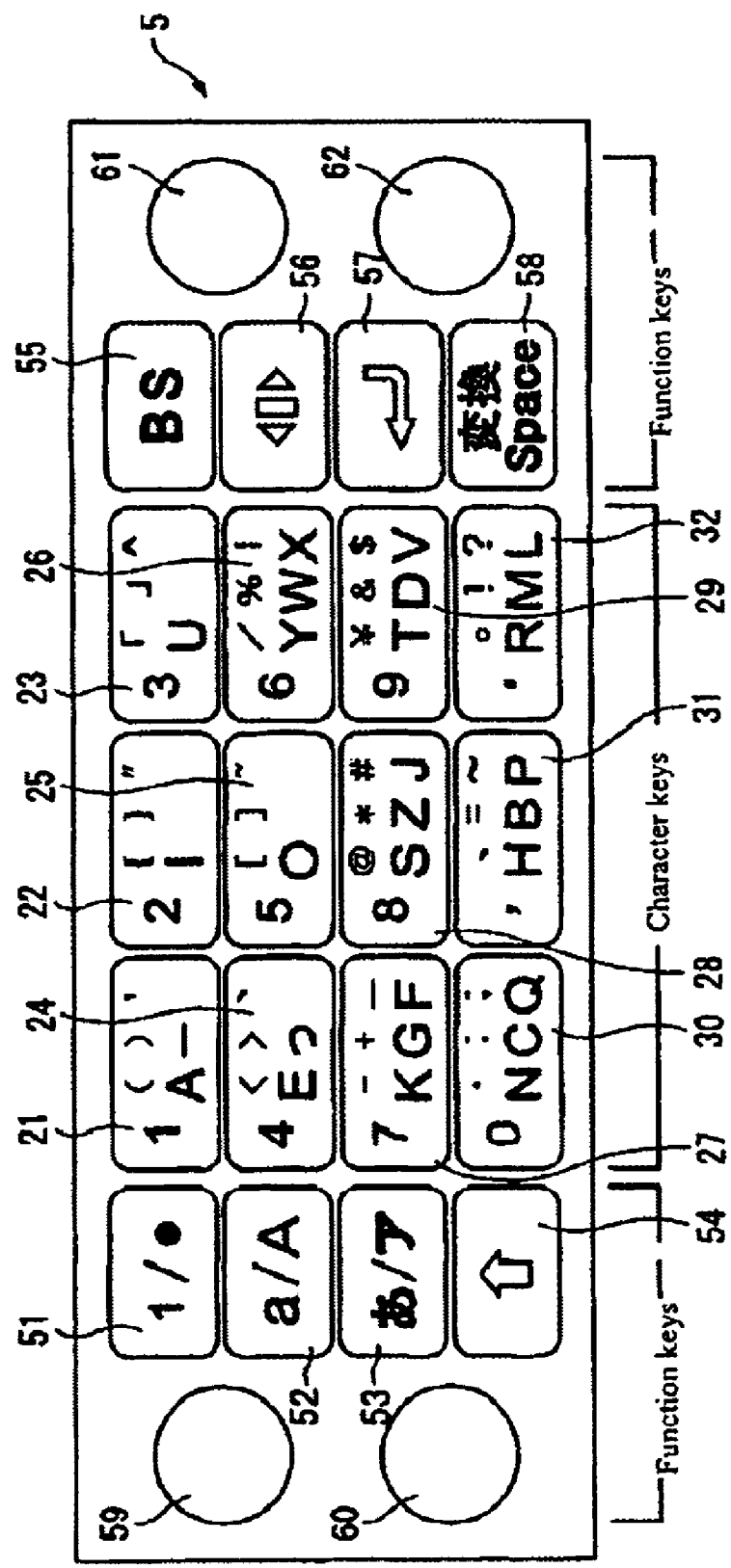
FIG. 40 is a plan view of a keyboard piece of a touch press key input device in a tenth embodiment of the invention.

In particular, as the keyboard plate 5 of the touch key input device 1 composed by the personal digital assistant (PDA) of the first embodiment, the case of plate 5 "standard arrangement (AIU configuration)", for example as shown in FIG. 40, is illustrated as a example.

12 character keys 21–32 and 12 function keys 51–62 are set on the keyboard plate 5. Various functions of input modes or shift, back space, return and so on are performed on the function keys 51–62, and this is same as the preceding embodiments.

In addition, the arrangements of the English alphabets, numbers and symbols of the character keys 21–32 is same as those of the first embodiment as shown in FIG. 2, and the illustrations for this is omitted. In the present embodiment, the character keys 21–32 are also used.

The English alphabets, numbers and symbols at corresponding positions can be input by performing the above draw-line touch inputs in 8 directions. Even if the manner of individual key is used, but comparing with the soft keyboard marked with 26 English alphabets and 50 kana, the number of the press keys is relatively few and the sizes of the press keys are relative big, thereby the input is more convenient. However, since the character keys 21–32 are limited by the size of the PDA (the touch press key input device 1) and can only be limited to a certain size scope, the blind-bar-touch input without looking at the press keys is very difficult.

Figure 41:
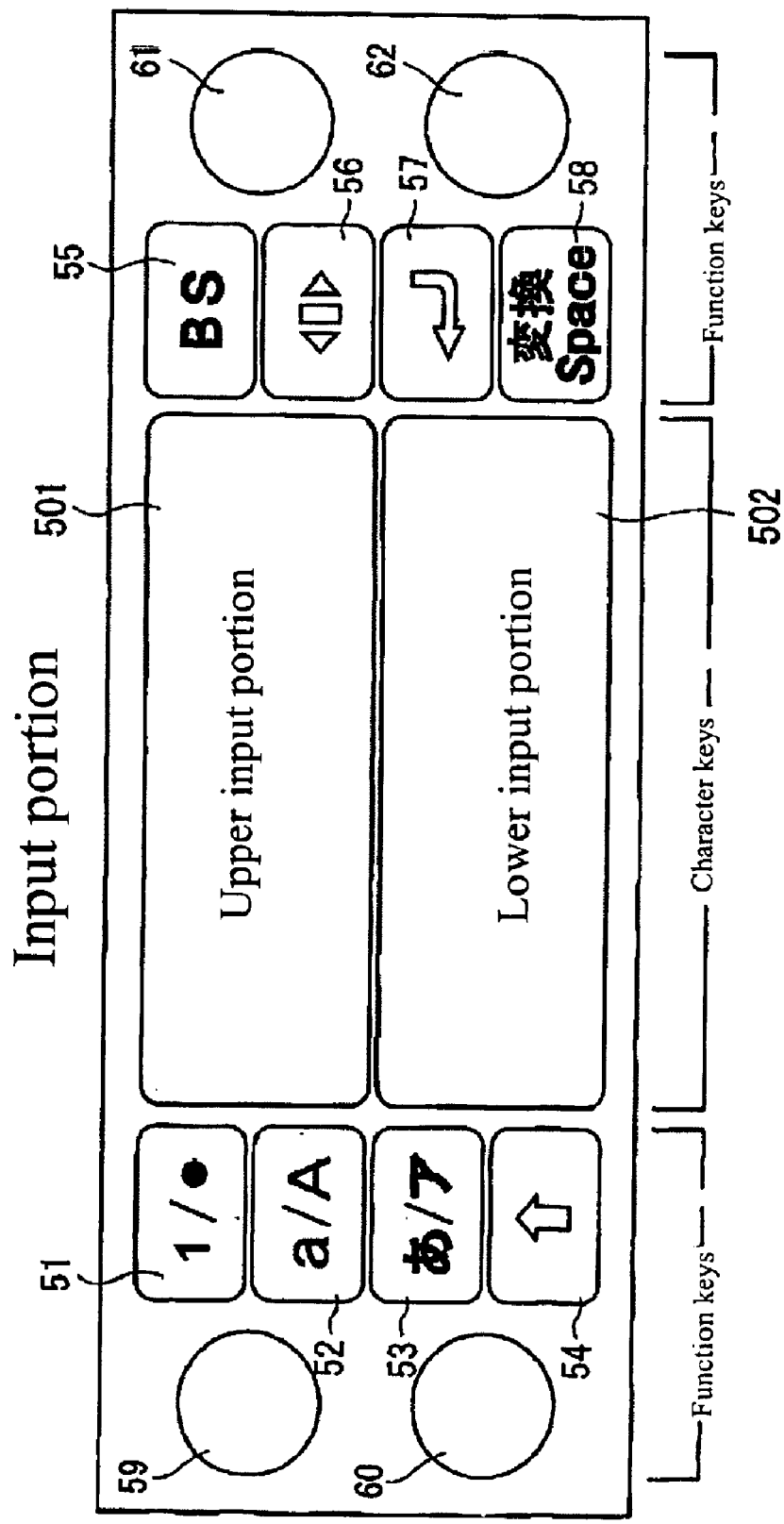
FIG. 41 is a plan view of the imaginary input region in the tenth embodiment of the invention.

For this purpose, as shown in FIG. 41, two input region 501 and 502 are set on the keyboard with 6 press keys as one group in the present embodiment, so that the input regions is increased so as to make the blind-bar-touch input without looking at the press keys possible.

The particular operation methods of the blind-bar-touch draw-line input are introduced below.

(10-1. The conversion method of the blind-bar-touch mode)

The draw-line touch input in down directions are performed on any function keys 55–58 on right sides of the character keys 21–32, so as to convert the input mode into the blind-bar-touch mode, then set the regions of the character keys 21–32 into two input regions 501 and 502, and finally return to the original standard mode (individual key input mode) by the same draw-line touch actions.

Two input regions 501 and 502 are formed in the manner of 6 press keys in one group of the character keys 21–32, and the user can easily grasp the fact that the character keys 21–32 are imaged as two input regions 501 and 502.

(10-2. The input method of the first character on the character key)

Figure 42:
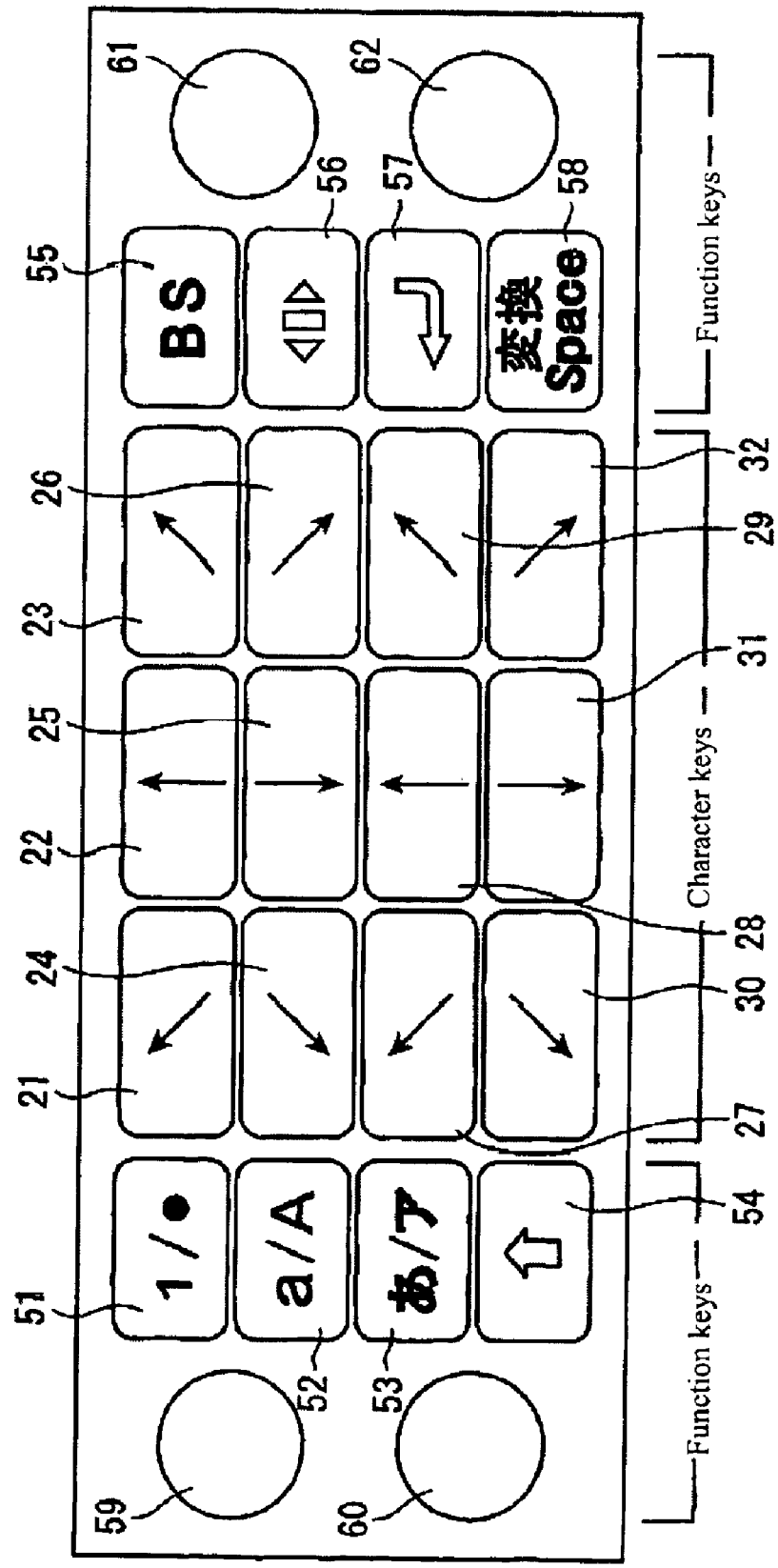
FIG. 42 is a plan view of the draw-line touch input action for the input region in the tenth embodiment of the invention.

As shown in FIG. 42, in the kana input (Roman letter input) or the English input modes, the character keys on the draw-line input regions 501 and 502 can input the characters set on the character keys in the input regions.

That is, if the first character [A (あ)] on the character key 21 is to be input, what needed is to draw-line touch the left-up direction of the input region 501. Likewise, [I] on the character key 22 can be input by draw-line touching the up direction of the input region 501, [U] on the character key 23 can be input by draw-line touching the right-up direction of the input region 501, [E] on the character key 24 can be input by draw-line touching the left-down direction of the input region 501, [O] on the character key 25 can be input by draw-line touching the down direction of the input region 501, and [Y] on the character key 26 can be input by draw-line touching the right-down direction of the input region 501.

On the input region 502, by draw-line touching its left-up direction [K] on the character key 27 can be input, by draw-line touching the up direction [S] on the character key 28 can be input, by draw-line touching the right-up direction [T] on the character key 29 can be input, by draw-line touching the right-up direction [N] on the character key 30 can be input, by draw-line touching the right-up direction [H] on the character key 31 can be input, and by draw-line touching the right-up direction [R] on the character key 32 can be input.

(10-3. The input method of the second and third characters on the character keys)

In order to input the second and third characters set on the character keys 21–32, after the first character is input by draw-line touching the input region 501, the second character can be input by draw-line touching the same input regions 501 and 502 again, and the third character can be input by further touching.

For example, after [K] is input by draw-line touching the left-up direction of the input region 502, then [G] can be input by draw-line touching the input region again, and [F] can be input by further touching.

(10-4. The input method of numbers and symbols)

In order to input numbers and symbols set on the character keys 21–32, that is, after the first character is input by draw-line touching the input regions 501 or 502, the numbers on the touched character keys can be input by draw-line touching the directions of the same input regions 501 and 502, and the symbols on the left-up, up, right-up positions of the character keys can be input respectively by draw-line touching right directions 1–3 times.

For example, after [K] is input by draw-line touching the left-up direction of the input region 502, then [7] can be input by draw-line touching the left direction, [−] can be input by draw-line touching right direction one time, [+] can be input by draw-line touching right direction 2 times, and [−] can be input by draw-line touching right direction 3 times.

(10-5. Other Functions)

After characters, numbers and symbols are input, the [shift/Space] function can be obtained by touching another input regions 501 or 502, the [BS] function can be obtained by performing the draw-line touch in the left direction, and the [Return] function can be obtained by performing the draw-line touch in the right direction.

The blind-bar-touch mode is same as the general mode, and the functions, which are set on the function keys 51–62 in advance, can be obtained by directly striking the function keys 51–62.

(10-6. Number and Symbol Modes)

The input mode can be converted into the number mode and the symbol mode by use of the function keys 51, and if the draw-line touch input of the input region is performed in the mode, the first character input is not English alphabet but a number or a symbol.

In the present embodiment, the English alphabets, numbers and symbols on the character keys 21–32 can be input likewise by use of the draw-line touch input of the individual key, and the effects same as those of the preceding embodiments can be obtained.

Further, the imaginary input regions 501 or 502 are set, so that character input can be realized through the input regions 501 or 502. Because the input region is relative big, and the input operations are simpler, the blind-bar-touch can be performed without looking the character keys 21–32, and the input efficiency is high. In addition, since the number of the press keys is lower, and the character configuration on the press keys is easy to remember, the machine can be used by the persons who have poor eyesight, and can be said to be a welfare facility.

[Embodiment 11]

Figure 43:
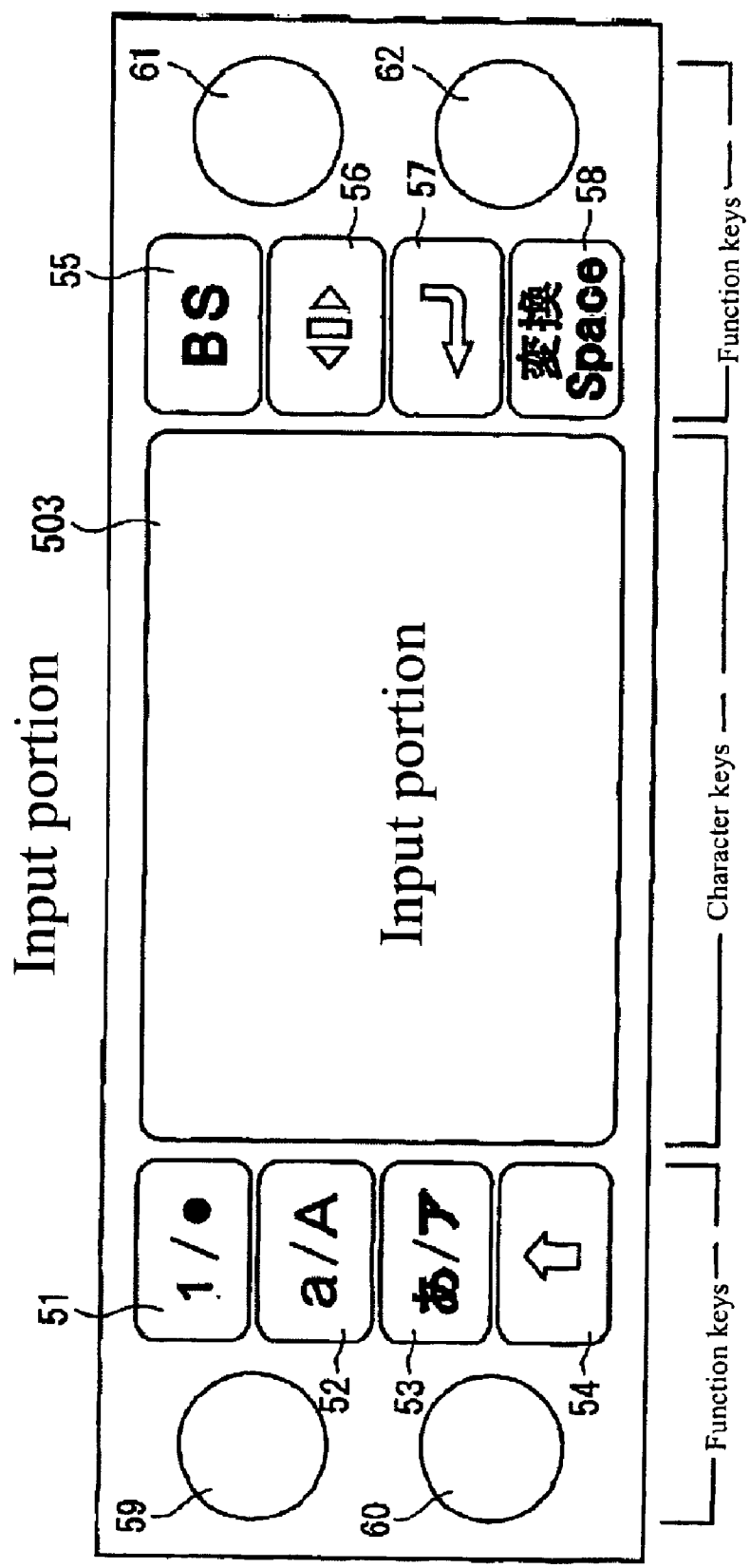
FIG. 43 is a plan view of a keyboard piece of a touch press key input device in an eleventh embodiment of the invention.

The eleventh embodiment of the invention is introduced below in conjunction with FIGS. 43 and 44. In the present embodiment, the constituent parts as same as or similar to those of the preceding embodiments are shown by same reference numbers. The description of the same or similar parts can be omitted or described briefly.

The basic idea of the present embodiment is same as that of the tenth embodiment, and the difference is that 2 input regions of the tenth embodiment are combined into an input region 503.

The particular operation is completely same as that of the tenth embodiment. The present embodiment is particularly introduced below in conjunction with the keyboard piece 5 of [standard arrangement (AIU configuration)] shown in FIG. 40.

First, English alphabets, numbers and symbols can be input respectively by draw-line touching 8 directions of the character keys 21–32, and this is completely same as the tenth embodiment. If the mode is converted into the blind-bar-touch mode, as shown in FIG. 43, 12 character keys 21–32 are set into 1 input region 503.

The particular operation method in the blind-bar-touch mode is introduced.

(11-1. The Conversion Method of the Blind-Bar-Touch Mode)

Same as the tenth embodiment, the input mode is converted into the blind-bar-touch mode by draw-line touching the down direction of any function key 55–58, and then the whole region of the character keys 21–32 is set into an input region 503, so as finally return to the original standard mode (individual key input mode) by the same draw-line touch actions.

[11-2. The Input Method of the First Character on the Character keys]

Figure 44:
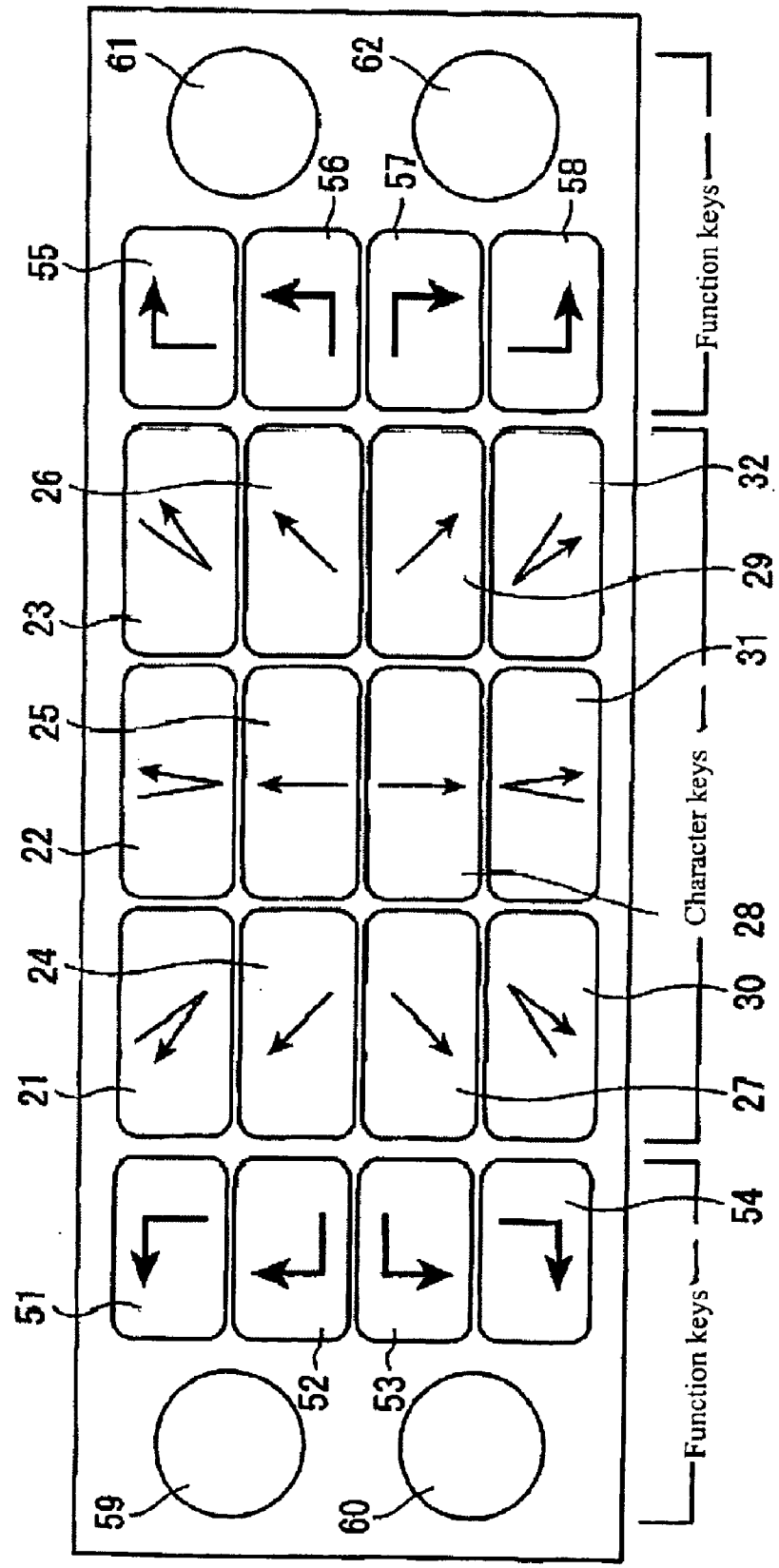
FIG. 44 is a plan view of the draw-line touch input action for the input region in the eleventh embodiment of the invention.

As shown in FIG. 44, in the kana input (Roman letter input) or the English input modes, the characters set on the character keys can be input by draw-line touching the character keys on the input regions 503. That is, if the first character [A (あ)] on the character key 21 is to be input, what needed is to draw-line touch the left direction of the input region 503. Likewise, [I] on the character key 22 can be input by reciprocating draw-line touching the up direction of the input region 503, [U] on the character key 23 can be input by draw-line touching the right-up direction of the input region 503, in addition, [E] on the character key 24 can be input by draw-line touching the left-up direction of the input region 503, [O] on the character key 25 can be input by draw-line touching the up direction of the input region 503, and [Y] on the character key 26 can be input by draw-line touching the right-up direction of the input region 503.

[K] on the character key 27 can be input by draw-line touching the left-down direction of the input region 503, [S] on the character key 28 can be input by draw-line touching the down direction, [T] on the character key 29 can be input by draw-line touching the right-down direction, [N] on the character key 30 can be input by reciprocating draw-line touching the left-down direction, [H] on the character key 31 can be input by reciprocating draw-line touching the down direction, and [R] on the character key 32 can be input by reciprocating draw-line touching the right-down direction.

(11-3. The Input Method of the Second and Third Characters on the Character Keys)

In order to input the second and third characters set on the character keys 21–32, after the first character is input by draw-line touching the input region 503, the second character can be input by draw-line touching the same input regions 503 again, and the third character can be input by further touching.

For example, after [K] is input by draw-line touching the left-up direction of the input region 503, then [G] can be input by draw-line touching the input region 503 again, and [F] can be input by further touching.

(11-4. The Input Method of Numbers and Symbols)

In order to input numbers and symbols set on the character keys 21–32, that is, after the first character is input by draw-line touching the input regions 503, the symbols on the left-up, up, right-up positions of the character keys can be input respectively by draw-line touching left directions of the input regions 503.

For example, after [K] is input by draw-line touching the left-down direction of the input region 503, then [7] can be input by draw-line touching the left direction, [–] can be input by draw-line touching right direction one time, [+] can be input by draw-line touching right direction 2 times, and [–] can be input by draw-line touching right direction 3 times.

(11-5. Other Functions)

In order to carry out the functions set by the function keys 51–62, as shown in FIG. 44, what needed is only to draw-line touch the function keys 51–62, and in particular, various functions can be carried out by performing draw-line touches in up, down, left and right directions.

Same as the tenth embodiment, in the blind-bar-touch mode or in the general mode, the functions, which are set on the function keys 51–62 in advance, can be obtained by directly striking the function keys 51–62.

(11-6. Number and Symbol Modes)

The input mode can be converted into the number mode and the symbol mode by use of the function keys 51, and if the draw-line touch input of the input region is performed in that mode, the first character input is not English alphabet but a number or a symbol.

The present embodiment is same as the tenth embodiment, and first the imaginary input region 503 is set, so that character input can be realized through the input region 503, and the input operation is simpler. Especially, the input region 503 is two times bigger than the input regions 501 or 502 of the tenth embodiment, thus the operations are easier so as to facilitate the blind-bar-touch draw-line input more.

Alternative Example

The present invention is not limited to the preceding embodiments, and all the changes, improvements and so on to realize the purpose of the invention belong to the contents of the invention.

For example, in the preceding embodiments, besides the draw-line touch input method, at the same time the striking input method (beating input, beating operation) is also employed by the character input methods, and though the striking input method can not be set, the striking input method set can alter the input in accordance with applications and preferences so as to meet the requirements of more users.

The character configurations on the character keys are not limited to the preceding embodiments, and can be configured according to the particular conditions.

Figure 45:
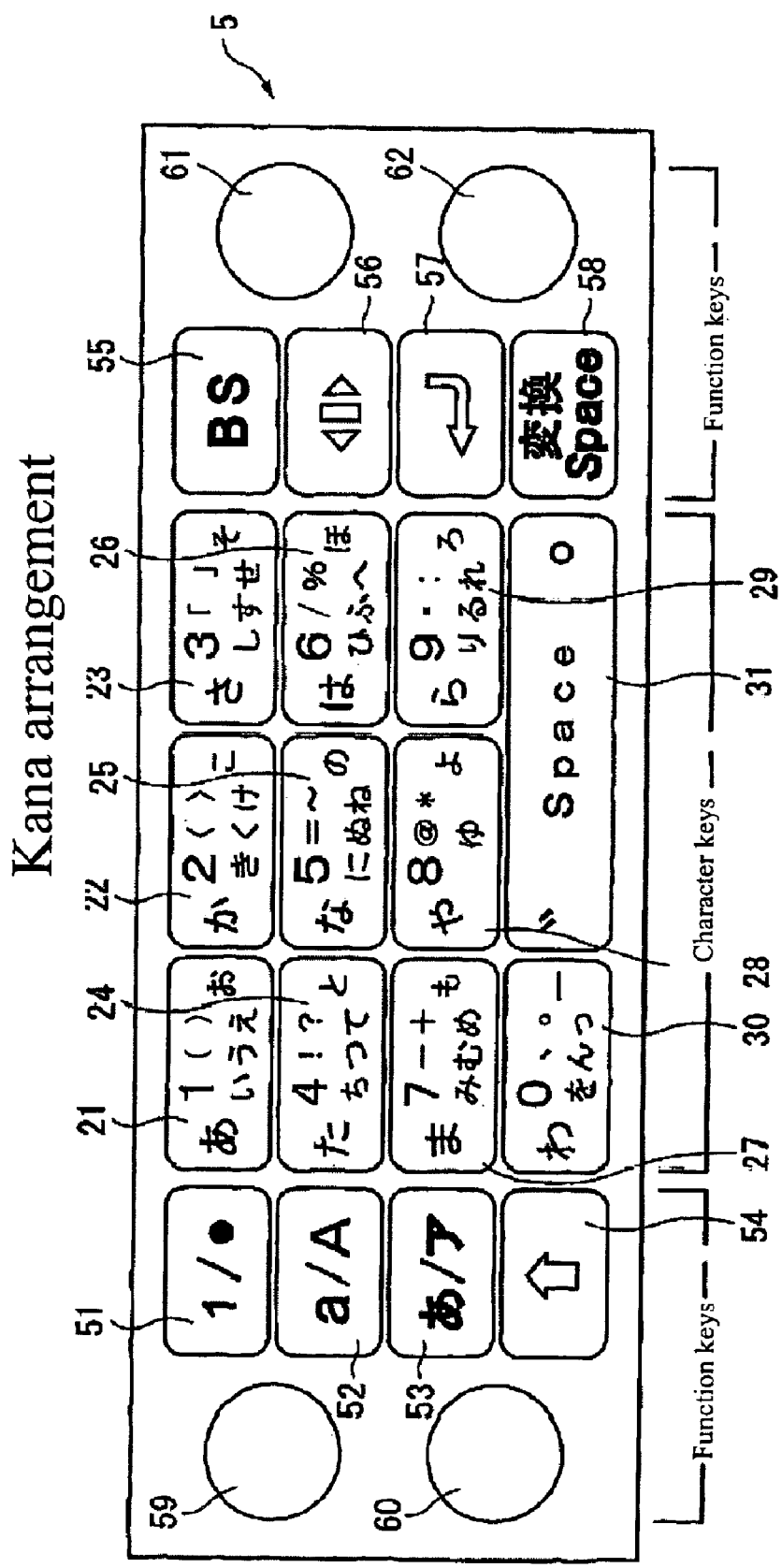
FIG. 45 is a plan view of a press key arrangement in an alternative example of the invention.
Figure 46:
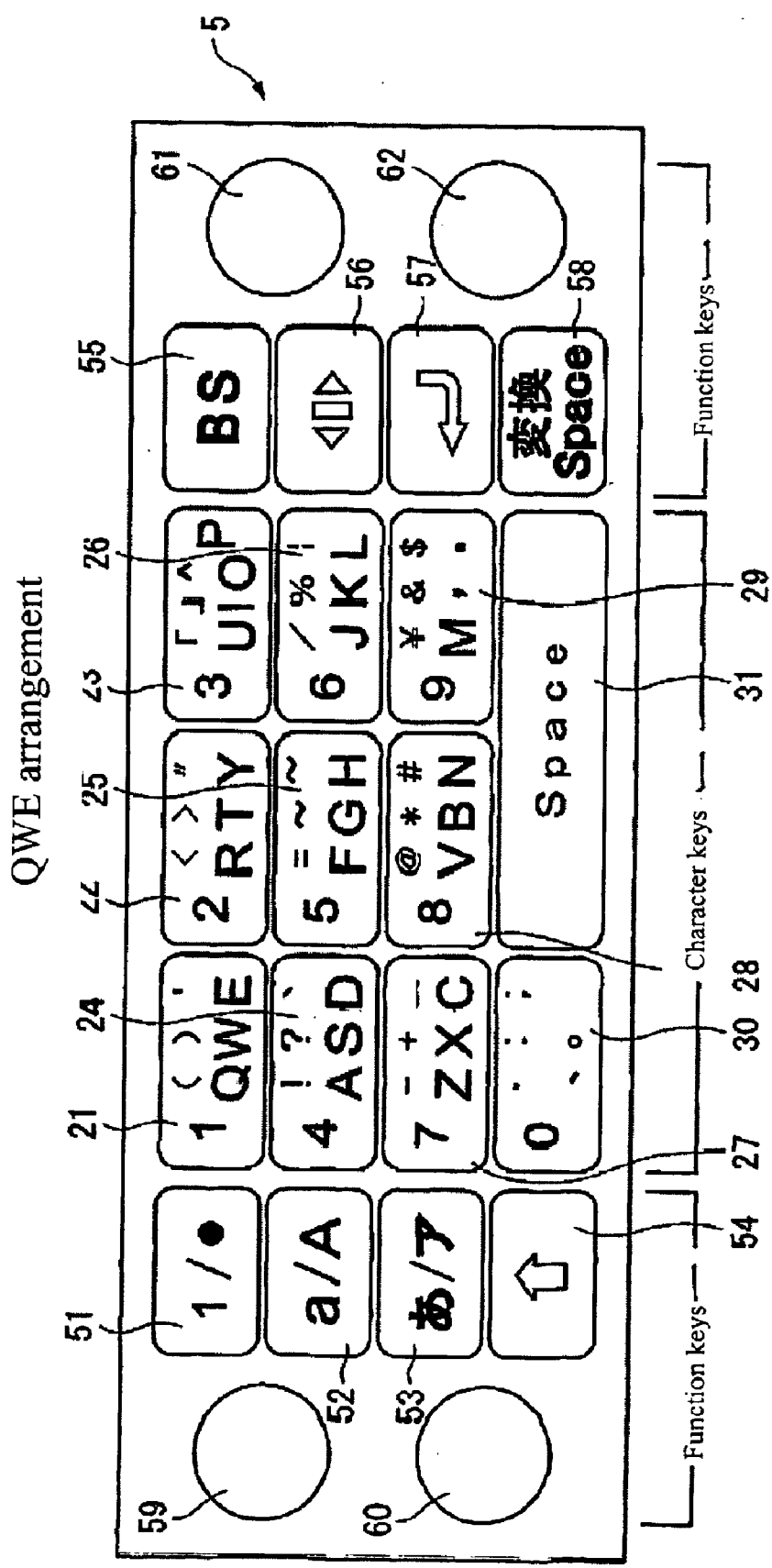
FIG. 46 is a plan view of a press key arrangement in an alternative example of the invention.
Figure 47:
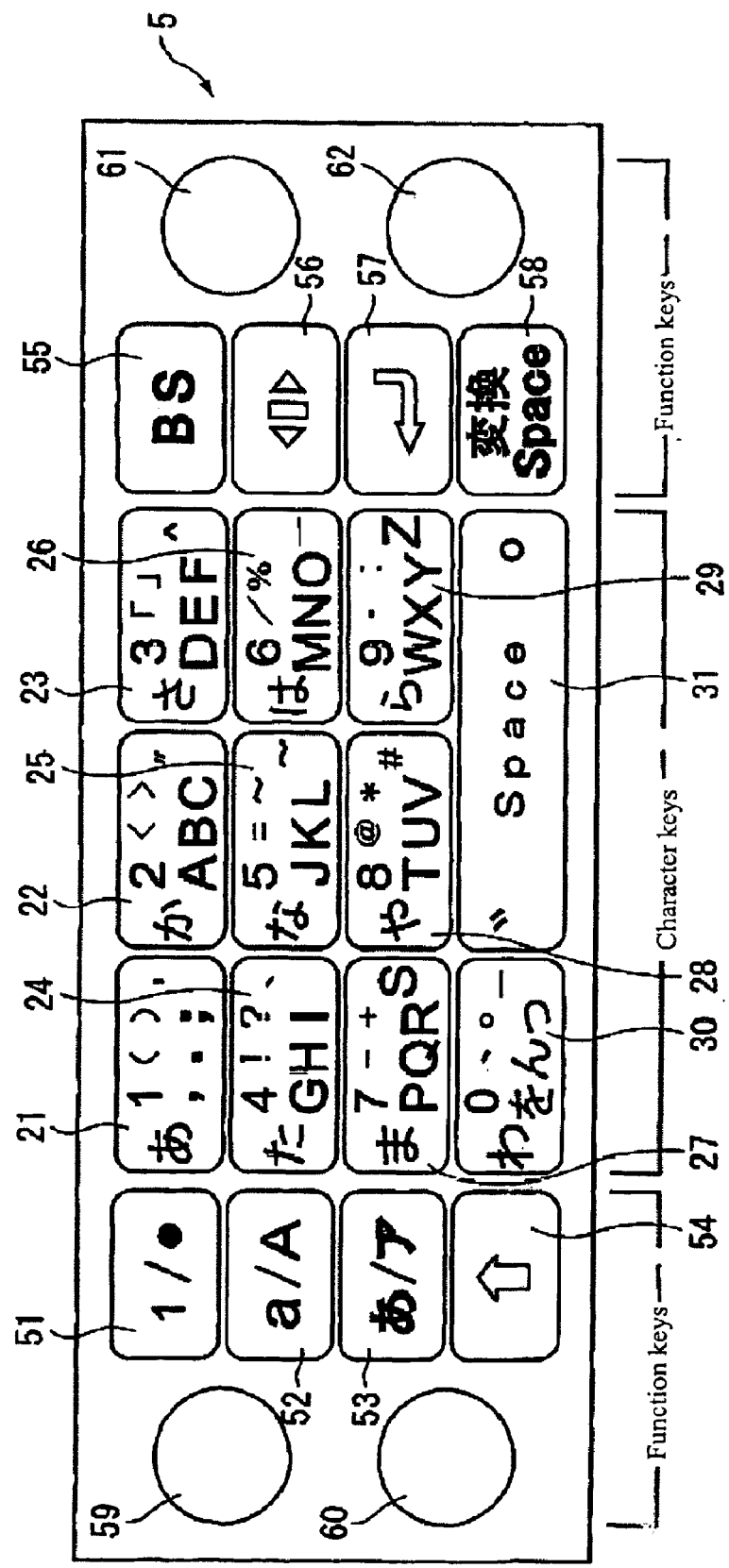
FIG. 47 is a plan view of a press key arrangement in an alternative example of the invention.
Figure 48:
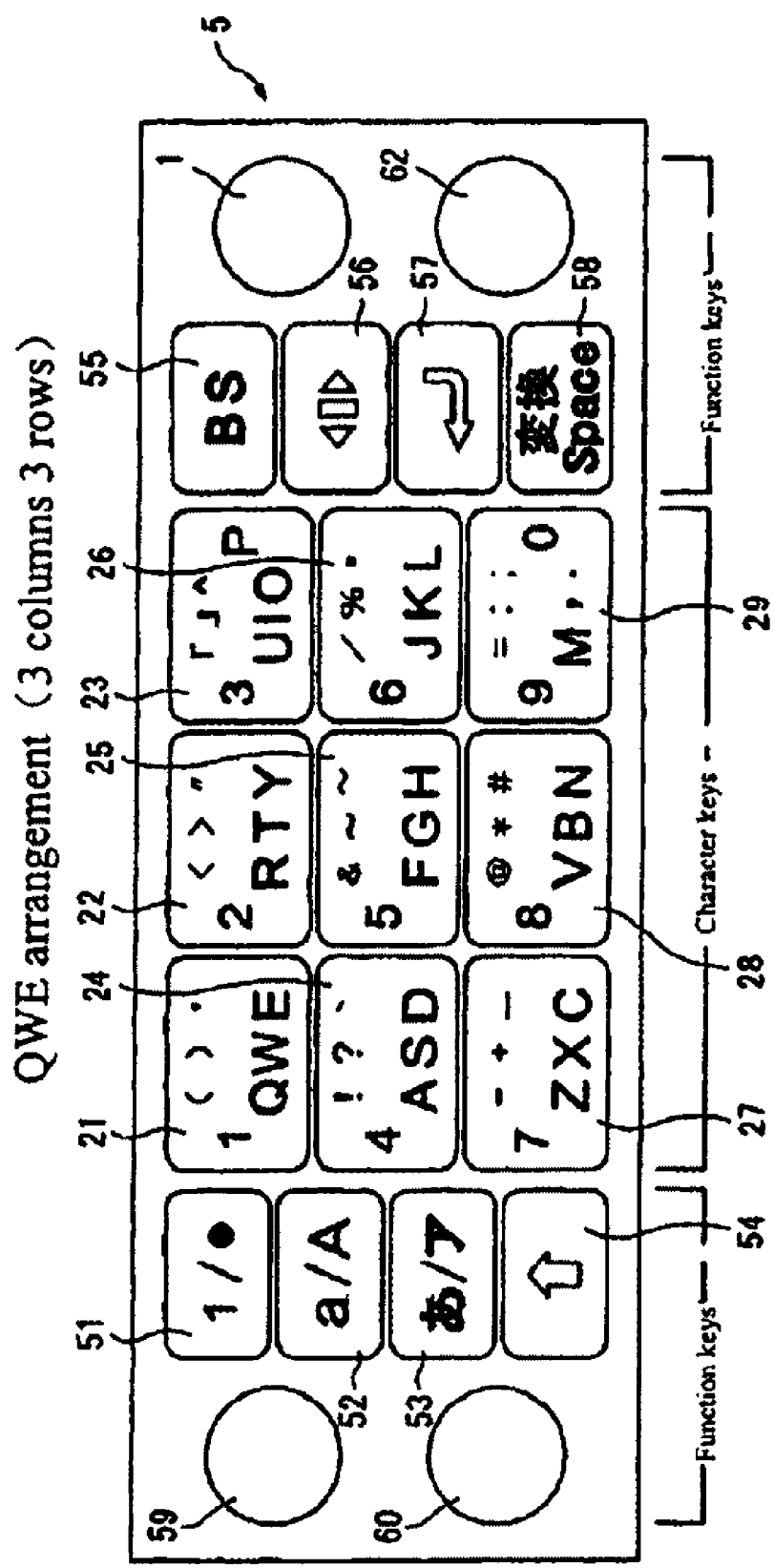
FIG. 48 is a plan view of a press key arrangement in an alternative example of the invention.

For example, the keyboard piece 5, which can be used by PDA (the touch press key input device 1) to input Japanese in Japan, can also select the kana arrangement as shown in FIG. 45, QWE arrangement as shown in FIG. 46, the portable telephone set arrangement (the imaginary arrangement of Japanese letter table) as shown in FIG. 47 and QWE arrangement (3 columns and 3 rows) as shown in FIG. 48 to use according to requirements, besides the standard arrangement (AIU arrangement) as shown in FIG. 40 and the kana·QWE arrangement (the imaginary arrangement of Japanese letter table).

Figure 49:
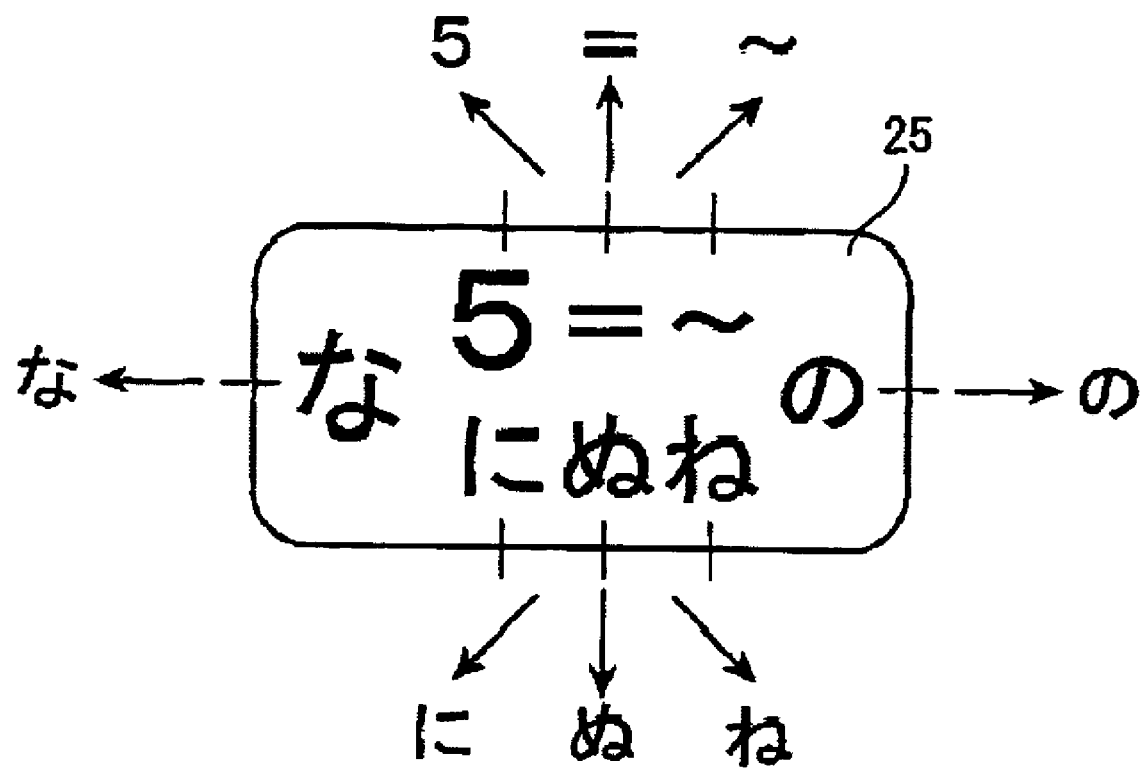
FIG. 49 is a schematic diagram of a press key input column in an alternative example of the invention.

The kana arrangement as shown in FIG. 45 is same as that of the eighth embodiment, that is, English alphabets are not set on the character keys 21–32, but kana are set in accordance with Japanese letter table. Its input method is same as the draw-line touch input method in the kana input mode of the kana·QWE arrangement as shown in FIG. 35. That is, as shown in FIG. 49, the kana ([あ] etc.) in ア column and in every row is input by draw-line touching the left direction, the kana (Πに] etc.) in イ column and in every row is input by draw-line touching the left-down direction, the kana ([ぬ] etc.) in ウ column and in every row is input by draw-line touching the down direction, the kana ([ね] etc.) in エ column and in every row is input by draw-line touching the right-down direction, and the kana ([の] etc.) in オ column and in every row is input by draw-line touching the right direction. Further, if the left-up, up and right-up directions are touched, the numbers ([5] etc.) and symbols ([=, ∽] etc.) set in the corresponding directions can be input respectively.

The QWE arrangement as shown in FIG. 46 corresponds to the kana·QWE arrangement which is not exist in the ninth embodiment, and English alphabets, numbers and symbols can be input by the draw-line input method in various directions. In the portable telephone set arrangement (the imaginary arrangement of Japanese letter table) as shown in FIG. 47, the arrangement of English alphabets is same as that as shown in FIG. 22 (the fifth embodiment) and is same as the arrangement for the portable telephone set, the kana characters are same as the kana·QWE arrangement of the [kana input mode] as shown in FIG. 35.

The QWE arrangement (3 columns and 3 rows) as shown in FIG. 48 is that English alphabets shown in FIG. 46 are set on 9 character keys 21–29 and that the number [0] set on the character key 30 in FIG. 46 are changed to be set in the right direction of the character keys 29 so as to input by draw-line touch. In this type, only the arrangement manner of 9 character keys 21–29 is compared with the arrangement manner of 12 character keys, and though fewer characters can be set, the sizes of the character keys 21–29 are increased, thereby making the input operation easy and the input efficiency high.

Figure 50:
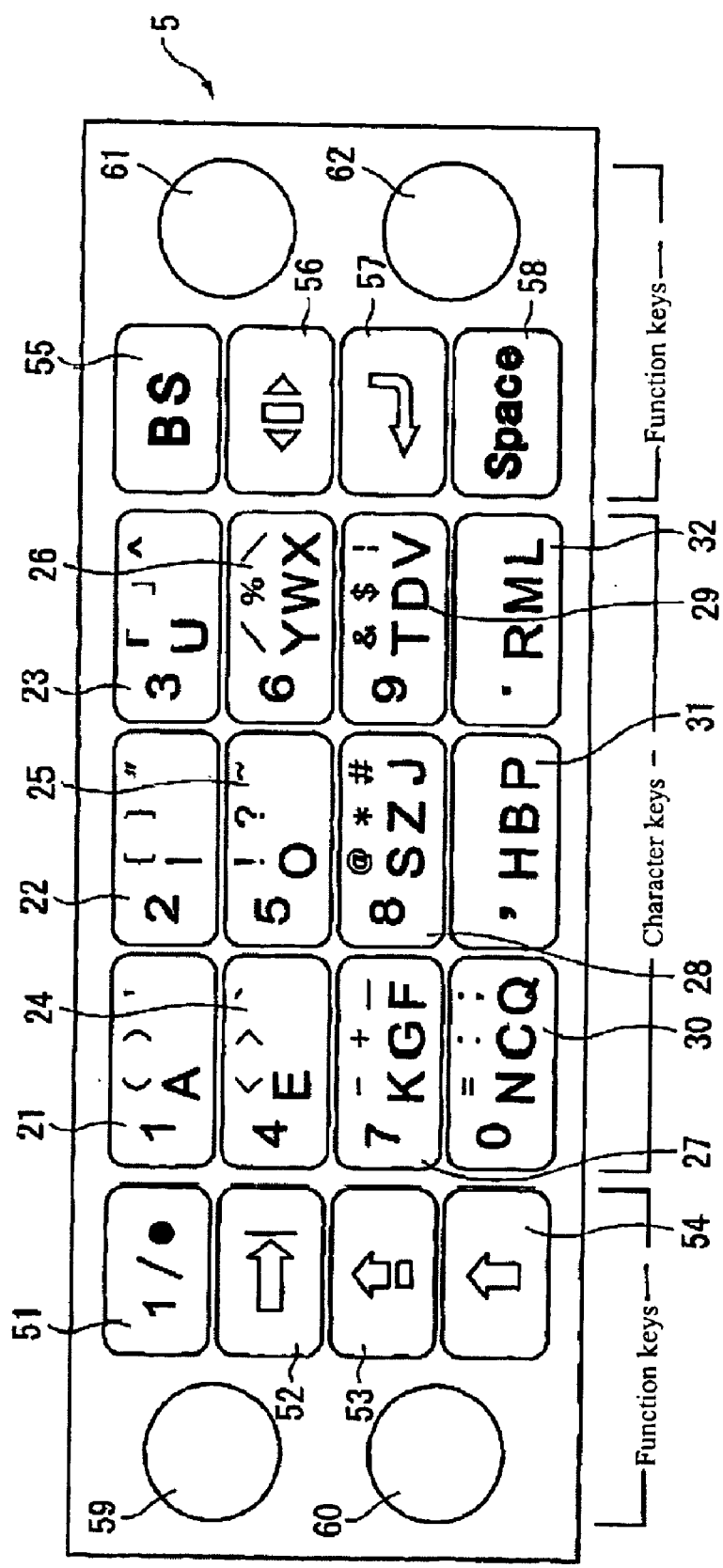
FIG. 50 is a plan view of a press key arrangement in an alternative example of the invention.
Figure 51:
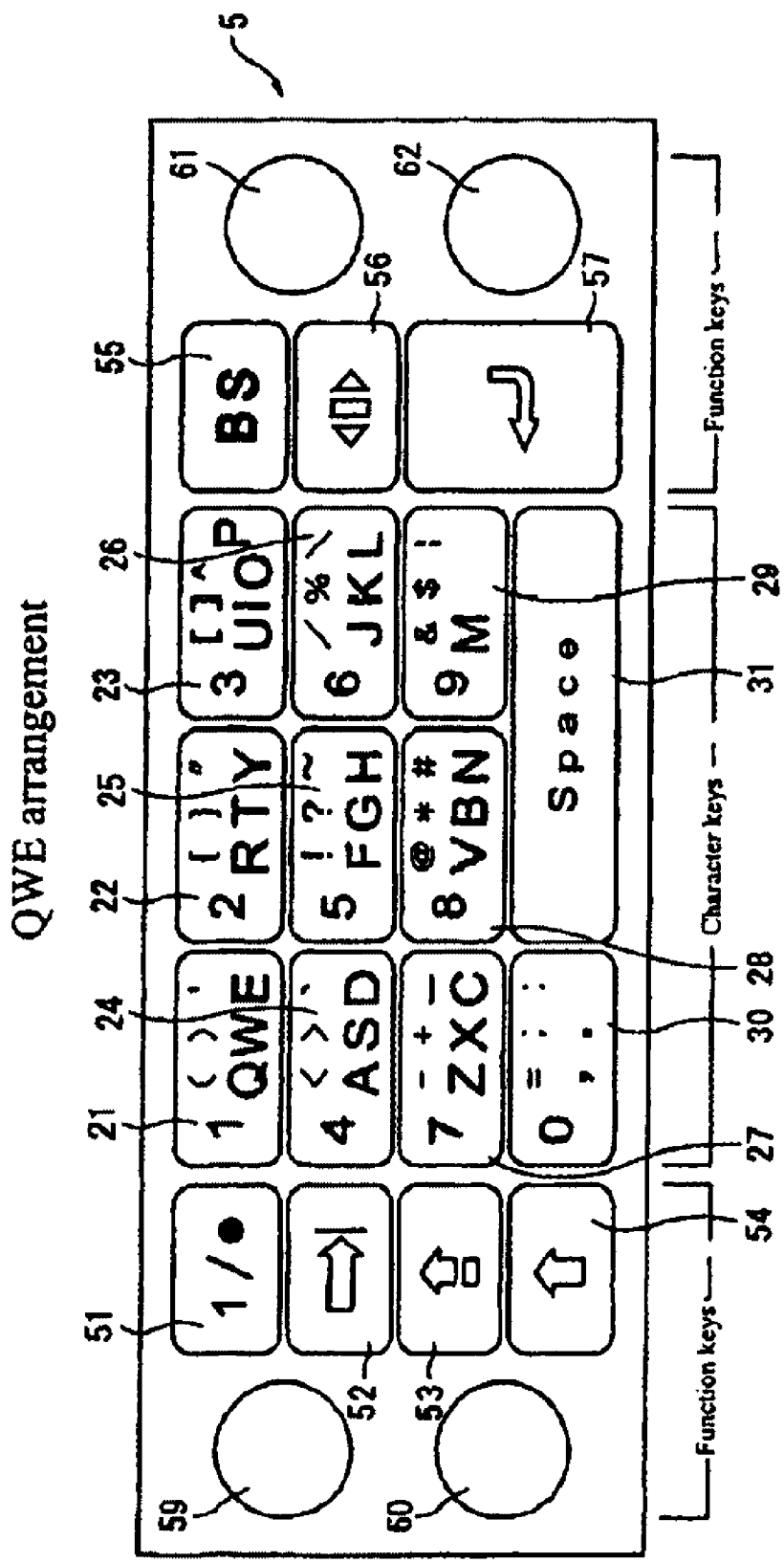
FIG. 51 is a plan view of a press key arrangement in an alternative example of the invention.
Figure 52:
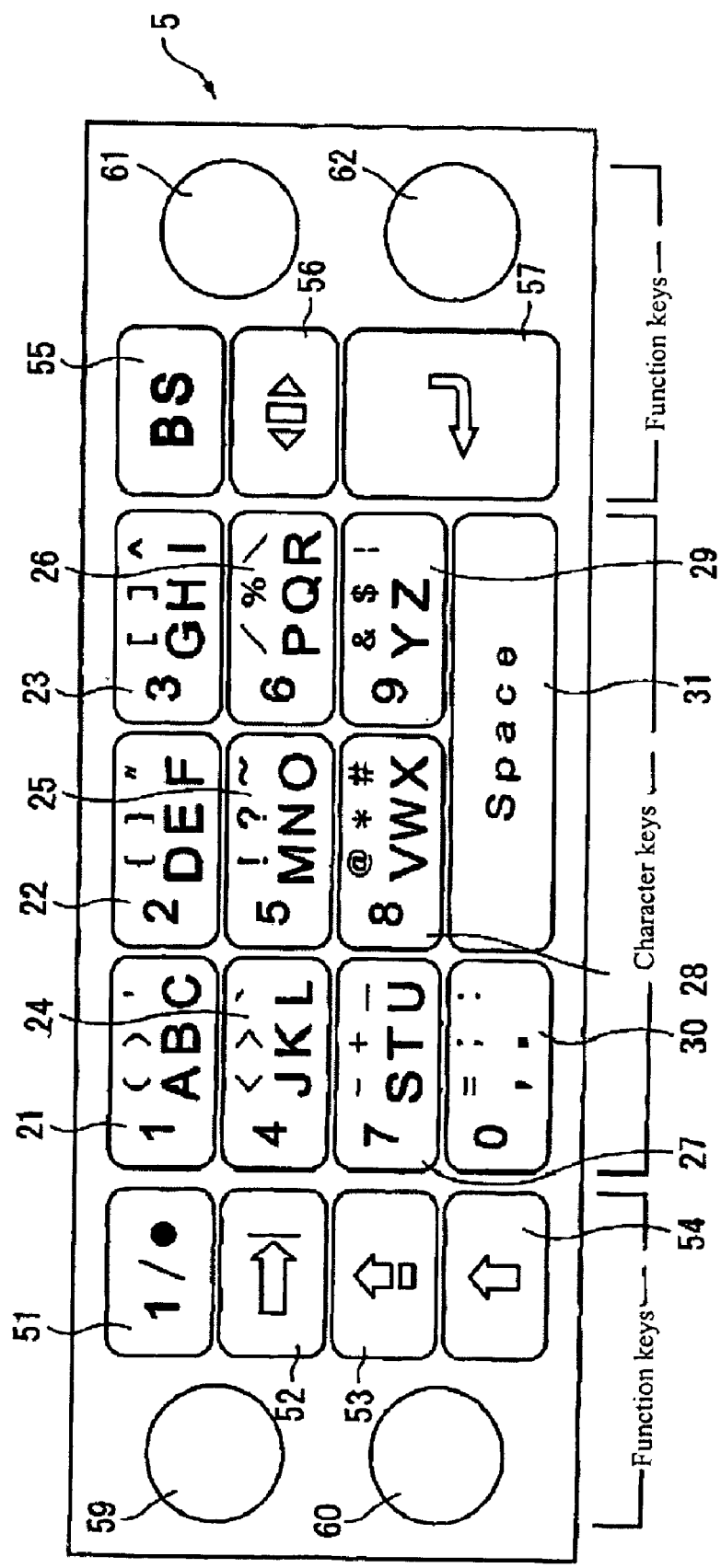
FIG. 52 is a plan view of a press key arrangement in an alternative example of the invention.
Figure 53:
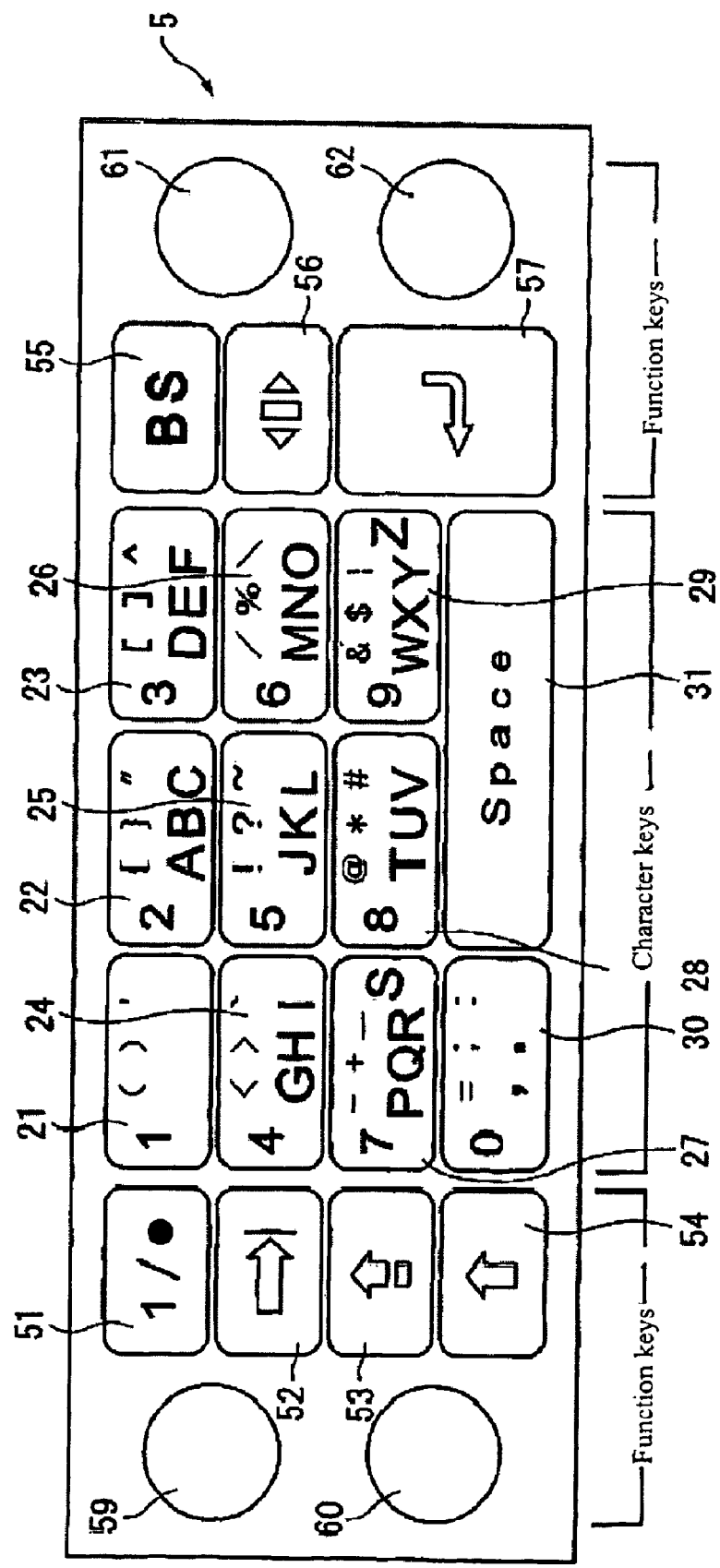
FIG. 53 is a plan view of a press key arrangement in an alternative example of the invention.
Figure 54:
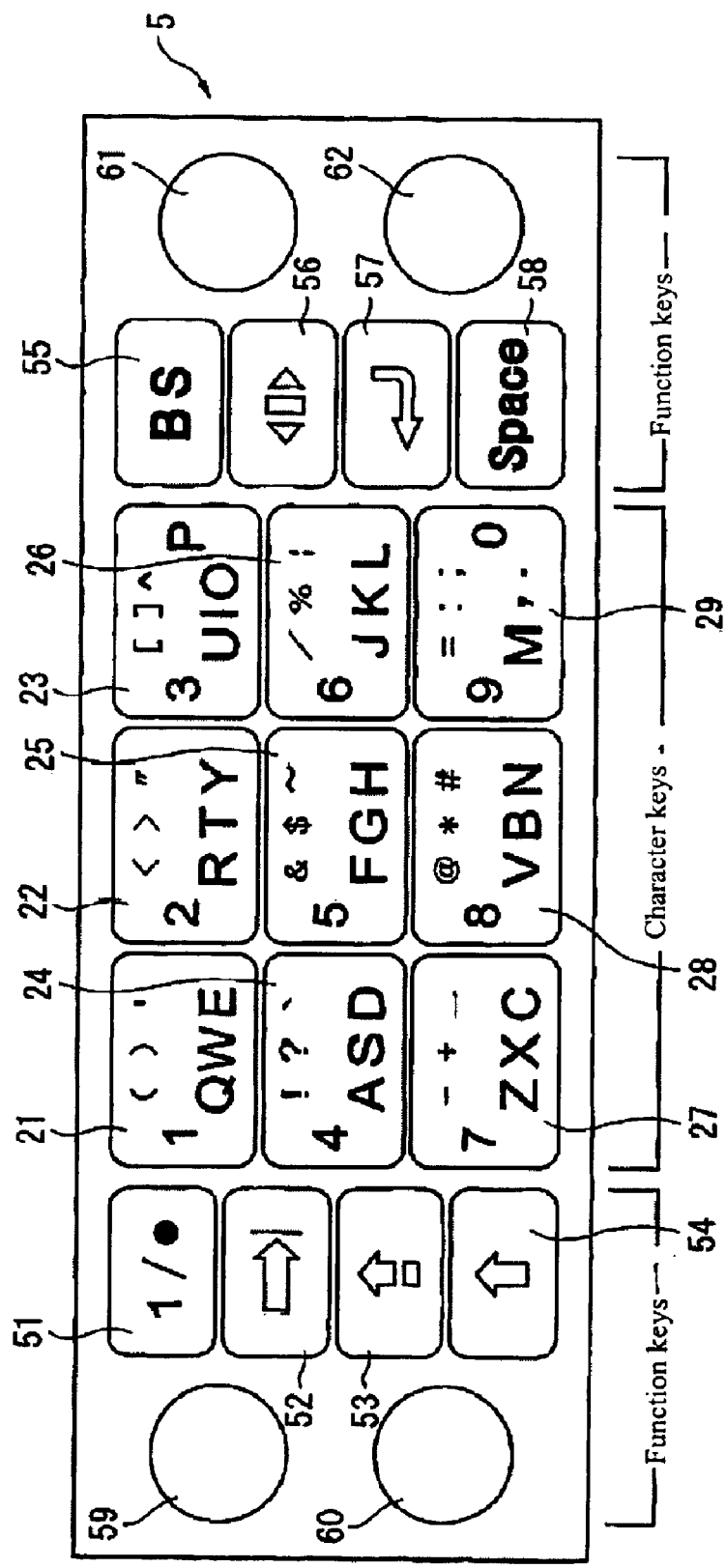
FIG. 54 is a plan view of a press key arrangement in an alternative example of the invention.
Figure 55:
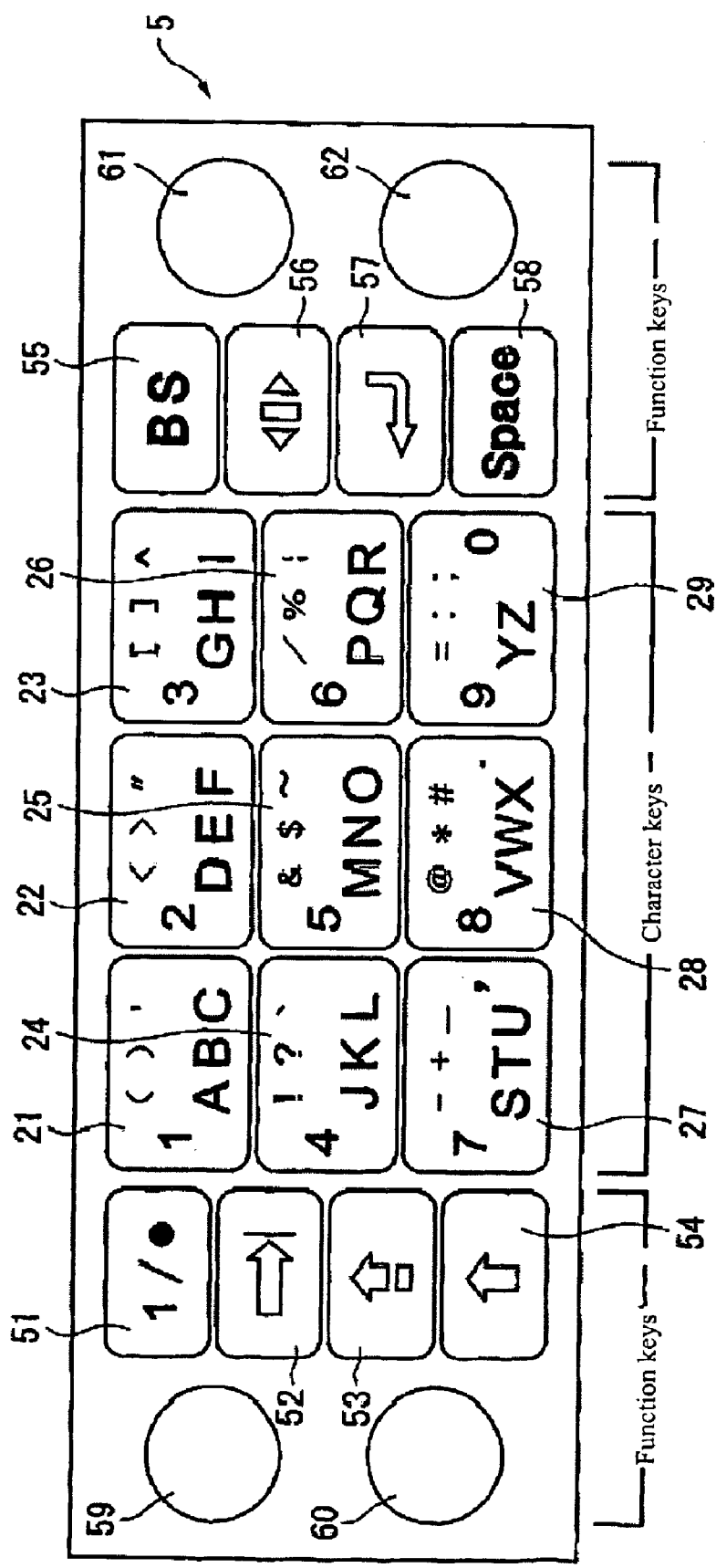
FIG. 55 is a plan view of a press key arrangement in an alternative example of the invention.

To PDA (the touch press key input device 1) for English input, the keyboard piece 5, according to requirements, can select and use the standard arrangement (AIU arrangement) as shown in FIG. 50, QWE arrangement as shown in FIG. 51, the ABC arrangement as shown in FIG. 52, the portable telephone set arrangement as shown in FIG. 53, QWE arrangement (3 columns and 3 rows) as shown in FIG. 54, and the ABC arrangement (3 columns and 3 rows) as shown in FIG. 55.

By employing various kinds of the keyboard piece 5 above, the English alphabets, numbers and symbols marked on the surfaces of the press keys are input by the draw-line touch input method in directions of the character keys 21–32. Further, the arrangement manner of the above press keys facilitates to the high speed input as the ninth embodiment.

In tenth and eleventh embodiments, 3 methods of draw-line touch input for the input region are used at the same time to input various characters, numbers and symbols, and various characters, numbers and symbols can be input by 2 times of draw-line touch on the input regions 501–503. That is, the first draw-line touch action is to select the character keys 21–32, and the second draw-line touch action is able to select various English alphabets, kana characters, numbers and symbols on the character keys 21–32.

The blind-bar-touch draw-line touch input employing the input regions 501–503 is applicable to not only the arrangement manners of the press keys of the tenth and eleventh embodiments, but also the arrangement manner of the press keys as shown in FIGS. 45–55.

Figure 56:
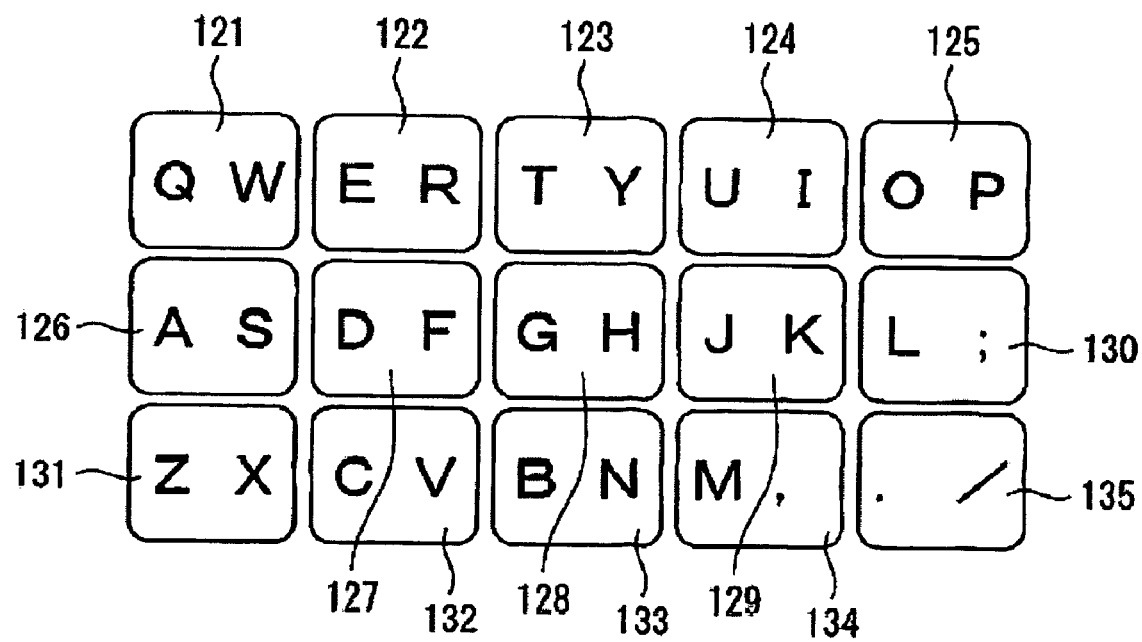
FIG. 56 is a plan view of a press key arrangement in an alternative example of the invention.
Figure 57:
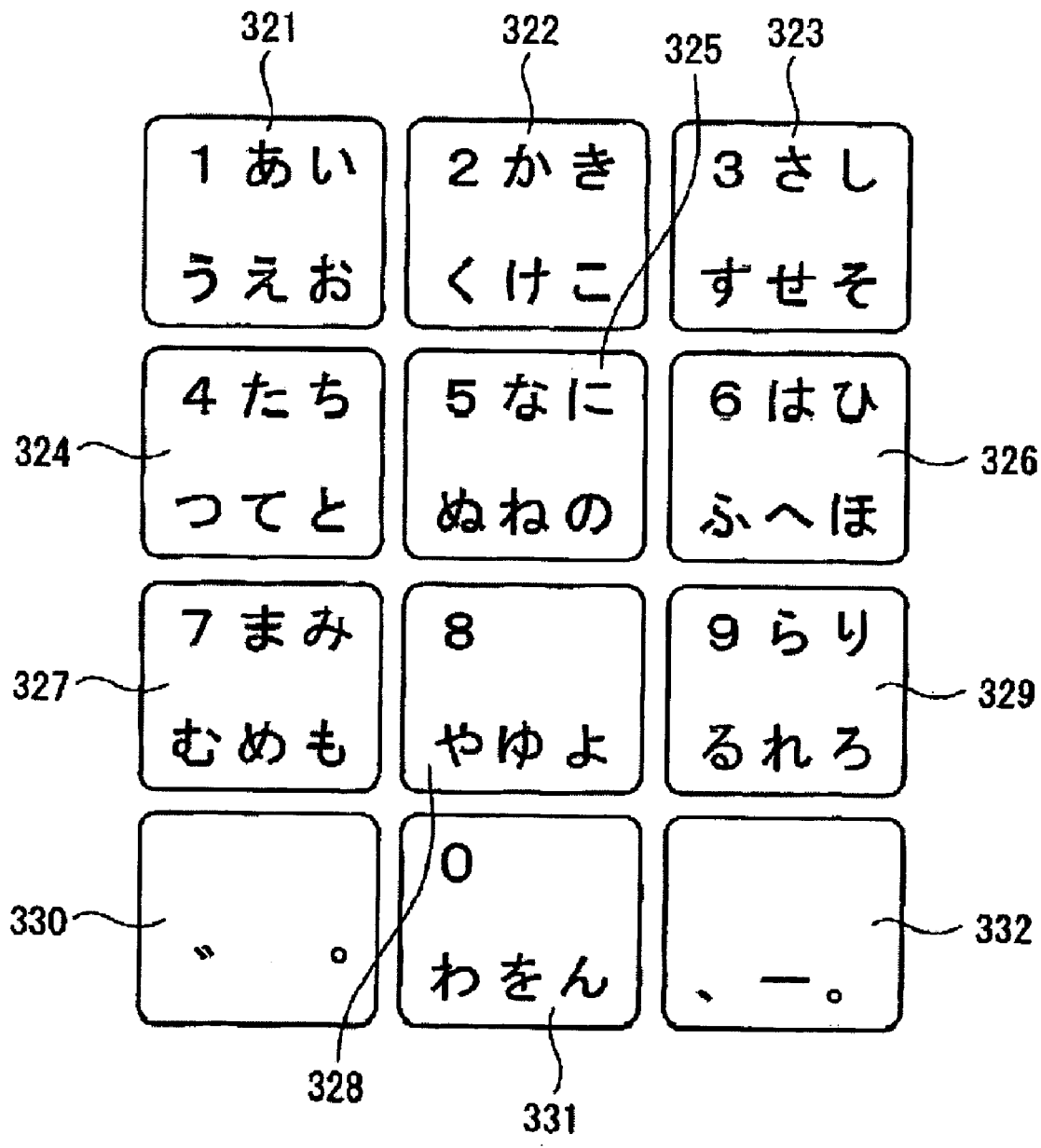
FIG. 57 is a plan view of a press key arrangement in an alternative example of the invention.

In addition, the character types marked on the character keys and the arrangement manners are not only limited to the preceding embodiments and alternative embodiments, for example, in order to obtain the QWERT arrangement of the sixth embodiment, as shown in FIG. 56, the characters in every row of the common keyboard are set on the character keys 121–135 from left to right in a manner of each key with two characters. It is also possible that 2 characters on both ends of each row or 2 characters of the second key on both ends are reset onto a character.

In the preceding embodiments, there are English alphabets and symbols marked on the down portions and the up portions of the surfaces of the character keys 21–32, further there are numbers marked on the left portions of the surfaces of the character keys 21–30, and furthermore there are numbers marked on the down portions of the surfaces of the press keys, English alphabets and kana characters marked on the up portions of the surfaces of the press keys, symbols marked on the right portions of the surfaces of the press keys and so on, thereby it can be seen that the marked positions of the characters (numbers, English alphabets, kana characters, symbols and so on) on the character keys 21–32 can be properly changed according to requirements.

However, English alphabets or kana characters used most frequently are preferred to be set on the down portions of the press keys, and because the writing actions of the characters are consistent with the draw-line touch input actions in directions, this can be accustomed to more easily In the preceding embodiments, the moving directions of the draw-line touches are set into 8 directions: the left-down direction, the down direction, the right-down direction, the left-up direction, the up direction, the right-up direction, the left direction and the right direction, and actually these 8 directions can also be divided in other manners.

In the preceding embodiments, 8 directions and 4 directions are listed of the directions of the draw-line touch actions which can be judged, and actually the draw-line touch actions in 2 directions, 3 directions, 5 directions, 6 directions, 7 directions and even 9 directions can be judged by proper setting.

The moving directions of the draw-line touch can be set in conjunction with the characters on the character keys, and particularly when the draw-line touch input is performed, if 8 directions are set and the angle range of the each direction is 45 degree, they can be easily distinguished by the user. On the base of the 8 directions, if the number of the characters is lower than 8, this means that the draw-line touch input is performed in the directions not marked with characters, that is, the characters in adjacent directions can be input. That is, the moving directions of the draw-line touch input can be set in conjunction with the number of the set characters.

For example, if 5 characters are set on each of the character keys 21–32, what needed is that the moving directions of the draw-line touch actions can be set to be 5.

In addition, same as the second embodiment, the character types (for example, English alphabets, numbers and symbols) set on the character keys 21–32 can be distinguished by means of the moving directions of the draw-line touch actions, and if many characters in same type can be set on one press key, the characters to be input can be selected according to the number of the draw-line touch in their directions.

In summary, the draw-line touch input method of the invention is to select and output the characters displayed in the moving directions of the character keys, and both marked characters themselves and the character strings not marked completely can be input.

In the preceding embodiments, the liquid crystal screens 3 and 13 can detect the contents of the touch input, and the keyboard piece 5 pasted on the up portions or right portions and other positions of the liquid crystal screens 3 and 13 can display the soft keyboard 15 and the input characters. Therefore, the placement positions of the keyboard piece 5 or the soft keyboard 15 can be changed according to applications so as to make the operations more convenient. In addition, according to the present invention, whether the character keys are displayed on the liquid crystal screens 3 and 13, whether the keyboard is pasted and whether the soft keyboard is displayed, can all be set according to requirements.

In the third and fourth embodiments, an auxiliary arrangement which can perform a shorten input, is set, and taking the fourth embodiment as an example, 4 types of character strings: the vowel urgent sound character strings, the vowel voiced character strings, the compound vowel character strings and the nose sound character strings, can be input by draw-line touching 4 directions of the vowel keys 21–25, that is, the symbols marked on the surfaces of the press keys can be input by draw-line touching the right-up direction, and the other 3 types of character strings can be input by draw-line touching the other 3 directions. The above 4 types of character strings can be set according to requirements, and all the types need not be set.

In the fourth embodiment, the character strings set in advance can be input by performing the draw-line touch in the directions not displaying characters, and the instance is not limited to what shown in FIG. 20 and FIG. 21 and other types of setting can be performed according to requirements.

These character strings, same as other English alphabets, are marked on surfaces of the press keys, and the character strings at the corresponding positions can be input by the draw-line touch in their existing directions (positions). Of course, same as the fourth embodiment, only characters, symbols and numbers are marked on the surfaces of the press keys while the character strings are concealed, so that the number of characters marked on the surfaces of the press keys can be reduced, so as to make the size of the characters and to facilitate to the judgment.

The characters and functions set on the character keys 21–25 and function keys 51–65 can be set in a manner different from those of the preceding embodiments, as long as the touch press keys input device facilitates the input.

Exempt for the sixth embodiment, in all other embodiments the numbers are marked on the character keys, and of course, either same as the sixth embodiment, not numbers, but only English alphabets and kana characters are marked, or the numbers can be marked on the character keys in the sixth embodiment. In summary, the character types marked on the character keys are set generally according to the applications of the touch press key input device.

In addition, the arrangement manners of kana characters and English alphabets on the character keys can use the kana arrangement and Dvorak arrangement in the general keyboard for reference.

The Other Embodiments of the Invention

The touch press key input device of the invention is characterized in that: total 12 character keys 21–32 in 4 right and left rows and 3 up and down columns are contained, and at least 2 types of 3 kind of character types of numbers, English alphabets and symbols are marked on each press key; the input judging means 72 is employed, which can detect the touch actions of the character keys and judge the moving directions of the draw-line touch actions above a specific length in the regions of the character keys; and the character selecting and outputting means 73 is also employed, which can select and output the characters displayed in the moving directions (relative to the center positions of the character keys) responding to the moving directions judged by the input judging means.

The touch press key input device of the invention can be said to be characterized in that: total 12 character keys 21–32 in 4 right and left rows and 3 up and down columns are contained, and at least 2 types of 3 kind of character types of numbers, English alphabets and symbols are marked on each press key; the input judging means 72 is employed, which can detect the touch actions on the character keys and judge the moving directions of the draw-line touch actions above a specific length in the regions of the character keys; and the character selecting and outputting means 73 is also employed, which can select and output the characters displayed in the moving directions (relative to the center positions of the character keys) responding to the moving directions judged by the input judging means. At the same time, the characters, which are set on the character keys in advance but are not marked on the surfaces of the character keys, can be selected and output by use of the draw-line touch input method.

5 vowel alphabets 「A」, 「I」, 「U」, 「E」 and 「O」 are set on 5 character keys 21–25 of the 12 press keys individually, and the other 21 consonant alphabets are set on the other 7 character keys 26–32 with 3 alphabets on each key. Thus, the characters at positions (directions) on the character keys 21–32 can be selected and output by the character selecting and outputting means. That is, 3 English alphabets can be selected and output by draw-line touching 3 directions 106–108 of the character keys 26–32; 5 vowel alphabets 「A」, 「I」, 「U」, 「E」 and 「O」 can be selected and output by draw-line touching directions 106 of the character keys 21–25; the characters set in the corresponding directions in advance can be selected and output by draw-line touching the second directions 107 and the third directions 108 of the character keys 21–25.

This arrangement is actually a manner of one vowel on one press key and 3 consonants on one press key, and in order to distinguish different English alphabets, 3 draw-line touch directions (the left-down directions 106, the down directions 107, and the right-down directions 108) are set. If 5 vowel alphabets can be selected and output by draw-line touching the first directions 106 of the character keys 21–25, by draw-line touching the second directions and the third directions the characters set in these directions in advance can be selected and output. It can be seen that besides 5 vowels marked on the surfaces of the press keys, other 10 characters can be input by use of the same draw-line touch input method, and the input efficiency is high.

When the draw-line touch input is performed, the characters, which are set on the character keys in advance but are not marked on the surfaces of the character keys, can be selected and output by the character selecting and outputting means responding to the language input modes.

For example, in Japanese input mode, if the urgent sounds, the nose sounds, the compound vowels, the awkward sounds and so on can be set in advance, the input efficiency can be improved. In English input mode, if the words (such as [an], [is], [on] and so on) appeared frequently are set in advance, or the characters input by use of the draw-line touch input method can be set in advance at the positions not marked with characters, the input efficiency of English can be improved.

For French, German, Italian, Russian, Chinese, Korean, Japanese and other languages other than English, the preset characters can be set likewise according to their own characteristics so as to improve the input efficiency. By use of the touch press key input device of the invention, the characters can be set at the positions not marked with characters by the user.

Thus, the characters used frequently can be set in accordance with the requirements of the users, so that the touch press key input device are made to be suitable for various users, and it has specific characteristics after being set by the users themselves, and the input efficiency is higher.

At least 2 English alphabets are marked on every character key, and when the input judging means judges that there are English alphabets displayed in the draw-line touch input directions, the character selecting and outputting means can select and output such English alphabets.

Since at least 2 English alphabets are set on one character key, English alphabets need 13 character keys at most. Therefore, comparing with the common keyboard, the number of the character keys is reduced greatly, and they can be widely used for a portable telephone set, PAD and other small machines.

Numbers or kana characters and so on are often marked on the character keys, and if the input judging means judges that numbers are displayed in the moving directions, the character selecting and outputting means can select and output numbers. If English alphabets or kana characters are displayed, the character selecting and outputting means can select and output English alphabets or kana characters.

If numbers, English alphabets and kana characters are set on the character keys at the same time, numbers, English alphabets and kana characters can be input at the same time. Such press key arrangement device is mounted to a portable telephone set, so as be capable of inputting telephone numbers and facilitate to write email.

INDUSTRIAL AVAILABILITY

The touch press key inputting device of the invention inputs characters marked on press keys in a manner of directly touching the press keys by use of a pen, a finger tip and so on, and can be widely used for a portable telephone set, a personal digital assistant (PDA), a small personal computer, which need the press input.

What is claimed is:

1. A touch press key inputting device, characterized in that said device includes many character keys, on each of which at least two characters are set, input judging means being capable of detecting touch actions of said character keys and judging a moving direction of a draw-line touch input action which maintains the touch state to move longer than a specific length since the first touch point in said character key area, and character selecting and outputting means being capable of selecting and outputting characters displayed in said moving direction relative to a center position of said character key, corresponding to said moving direction judged by the input judging means, wherein:

English alphabets are marked on left-down portion or down portion or right-down portion of the surface of said character keys; symbols are marked on left-up portion or up portion or right-up portion of the surface of said character keys; numbers are marked on left portion or right portion of the surface of said character keys; said input judging means at least can judge moving directions of these 3 draw-line touch input actions of the up direction, the down direction and the left direction; said character selecting and outputting means selects and outputs said characters when performing said draw-line touch input in a direction in which the numbers in said right direction or left direction are displayed; said character selecting and outputting means selects and outputs said characters set on said character keys in the order of the left-up portion, the up portion and right-up portion according to the times of the draw-line touch input actions, when performing said draw-line touch input in the up direction; said character selecting and outputting means selects and outputs said characters set on said character keys in the order of the left-down portion, the down portion and right-down portion according to the times of the draw-line touch input actions, when performing said draw-line touch input in the down direction.

2. A touch press key inputting device according to claim 1, characterized in that total 12 character keys in 4 up and down rows and 3 right and left columns or in 3 up and down rows and 4 right and left columns are set.

3. A touch press key inputting device according to claim 1, characterized in that if characters are preset in the direction of the surfaces of the character keys marked no characters, said character selecting and outputting means selects and outputs the preset characters.

4. A touch press key inputting device according to claim 1, characterized in that at least 12 said character keys are set, in which 5 keys are used to set these vowel alphabets [A], [I], [U], [E] and [O], and the other 7 keys are used to set the other 21 consonant alphabets in a manner of each key with 3 alphabets.

5. A touch press key inputting device according to claim 1, characterized in that at least 9 said character keys are set, on which [QWE], [RTY], [UIOP], [ASD], [FGH], [JKL], [ZXC], [VBN] and [M] are set respectively to distribute respective English alphabets.

6. A touch press key inputting device according to claim 1, characterized in that at least 9 said character keys are set, on which [ABC], [DEE], [GHI], [JKL], [MON], [PQRS], [TUV] and [WXYZ] are set respectively to distribute respective English alphabets.

7. A touch press key inputting device according to claim 1, characterized in that said input judging means is capable of judging a reciprocating draw-line touch input action which, after maintaining the touch state movement for a specific length since the first touch point in said character key area, moves towards the original position in reverse direction for a specific length, and the moving direction thereof, when performing reciprocating draw-line touch input, said character selecting and outputting means is capable of selecting and outputting characters preset in the moving direction.

8. A touch press key inputting device according to claim 1, characterized in that said input judging means is capable of judging a right-curved draw-line touch input action which, after maintaining the touch state movement for a specific length since the first touch point in said character key area, curves rightwards to move for a specific length, a left-curved draw-line touch input action which curves leftwards to move for a specific length, and the moving directions from touch points to right-curved and left-curved points in said right-curved and left-curved draw-line touch input actions; said character selecting and outputting means, when performing the right-curved and left-curved draw-line touch input actions, is also capable of selecting and outputting characters preset in the moving directions according to the right-curved and left-curved draw-line touch input actions and the moving directions from touch points to right-curved and left-curved points.

9. A touch press key inputting device according to claim 1, characterized in that said character key system is marked on a keyboard piece; the keyboard piece is pasted on a touch input sensing area, which can sense the touching of the touch input means; said input judging means can judge an area in which each character key pasted on the keyboard piece exists, and can judge the moving direction at the time of said draw-line touch inputting on the area corresponding to respective character keys.

10. A touch press key inputting device according to claim 1, characterized in that said character key system is displayed in writing manner; said input judging means can judge an area in which said character keys displayed in writing manner exist, and can judge the moving direction at the time of said draw-line touch inputting on the area corresponding to respective character keys.

* * * * *